United States Patent [19]
Yokoyama et al.

[11] Patent Number: 5,481,417
[45] Date of Patent: Jan. 2, 1996

[54] TAPE TENSION CONTROL FOR A MAGNETIC RECORDING AND REPRODUCING APPARATUS THAT ADJUSTS SPACING ERROR BASED ON THE REPRODUCED SIGNAL ENVELOPE

[75] Inventors: Eiji Yokoyama; Masato Nagasawa, both of Kyoto, Japan

[73] Assignee: Mitsubishi Denki Kabushiki Kaisha, Kyoto, Japan

[21] Appl. No.: 249,745

[22] Filed: May 26, 1994

Related U.S. Application Data

[62] Division of Ser. No. 882,016, May 13, 1992, Pat. No. 5,395,066.

[30] Foreign Application Priority Data

May 13, 1991 [JP] Japan ................................ 3-107581
May 24, 1991 [JP] Japan ................................ 3-120514

[51] Int. Cl.$^6$ ................................................ G11B 15/43
[52] U.S. Cl. ................................. 360/73.08; 360/71
[58] Field of Search ................................. 360/71, 73.04, 360/73.05, 73.08, 77.13, 77.16, 73.01, 73.07

[56] References Cited

U.S. PATENT DOCUMENTS 5,153,785  10/1992  Muranushi et al. ....................... 360/75

FOREIGN PATENT DOCUMENTS

| | | |
|---|---|---|
| 62-184652 | 8/1987 | Japan . |
| 278049 | 3/1990 | Japan . |
| 3-46114 | 2/1991 | Japan ................................ 360/75 C |
| 3168955 | 7/1991 | Japan . |

OTHER PUBLICATIONS

Introduction of Magnetic Recording Technology by Yokoyama, published by Sogo Denshi Shuppansha, p. 187.
"Noiseless Trick–Play Techniques Using Piezoelectric Ceramic Actuator for VTR's" by M. Kobayashi et al National Technical Report, vol. 28, No. 3, Jun. 1982, pp. 419–425 and 427–428.

*Primary Examiner*—Aristotelis Psitos
*Assistant Examiner*—James L. Habermehl

[57] ABSTRACT

It is an object of the invention to realize a DTF control in a wide frequency range and a noiseless high-speed replay at several tens of times the normal relay speed without degradation of picture quality. It is also an object to provide an optimum contact between the head and the tape at all times by performing the tension control with high precision and in wide frequency range.

A pair of supply side stationary pins $10a_1$, $10a_2$ and a supply side movable pin 9a driven by a supply side tape actuator 11a are provided on the magnetic tape supply side of the head cylinder that has a rotary head H. By controlling the supply side tape actuator 11a to move the movable pin 9a, the tension of the magnetic tape T at the head cylinder can be controlled. When the tape is replayed at speed different from the recording speed, the supply side tape actuator 11a and a takeup side tape actuator are operated differentially from each other to perform a good tracking.

31 Claims, 52 Drawing Sheets

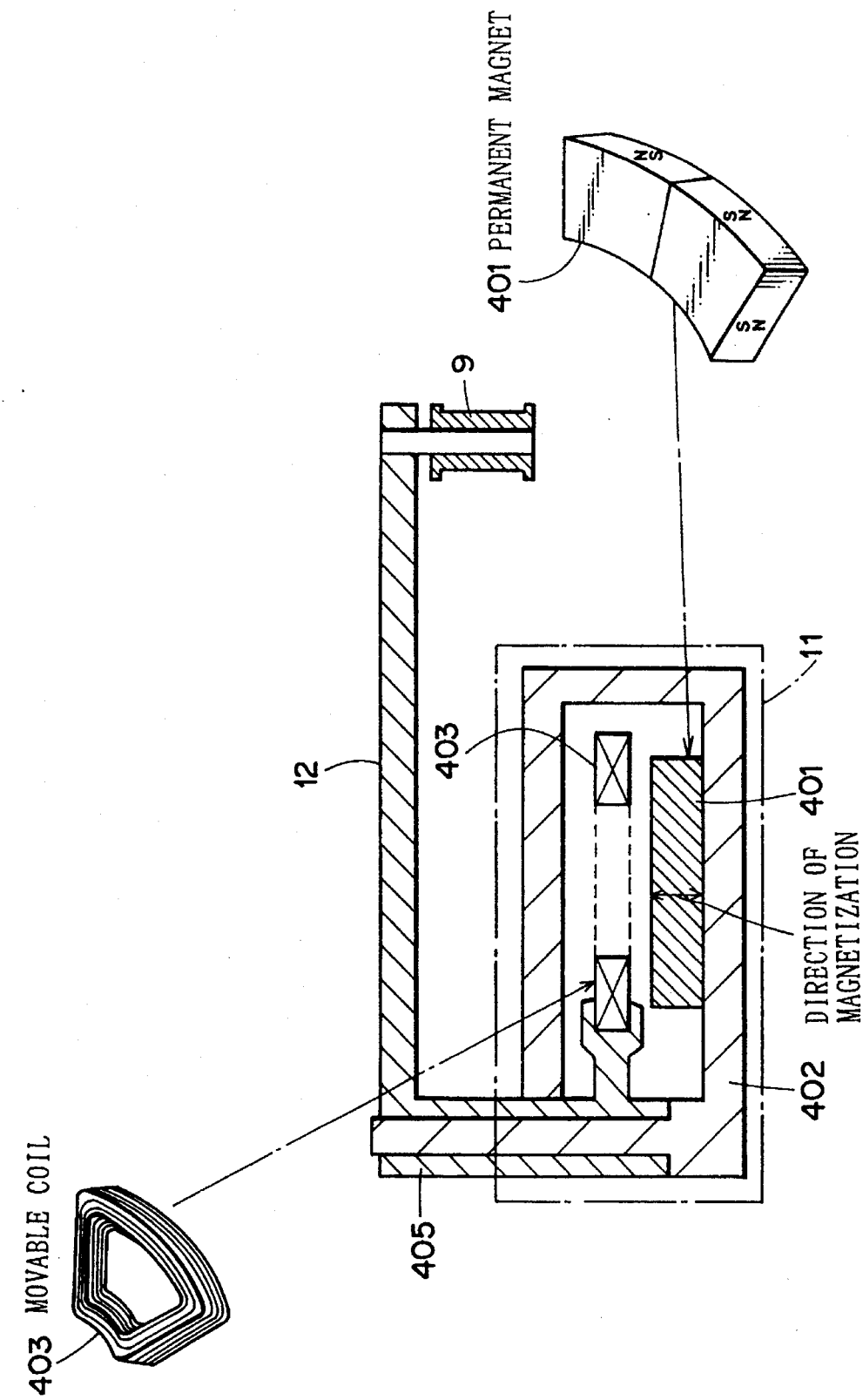

F I G. 6
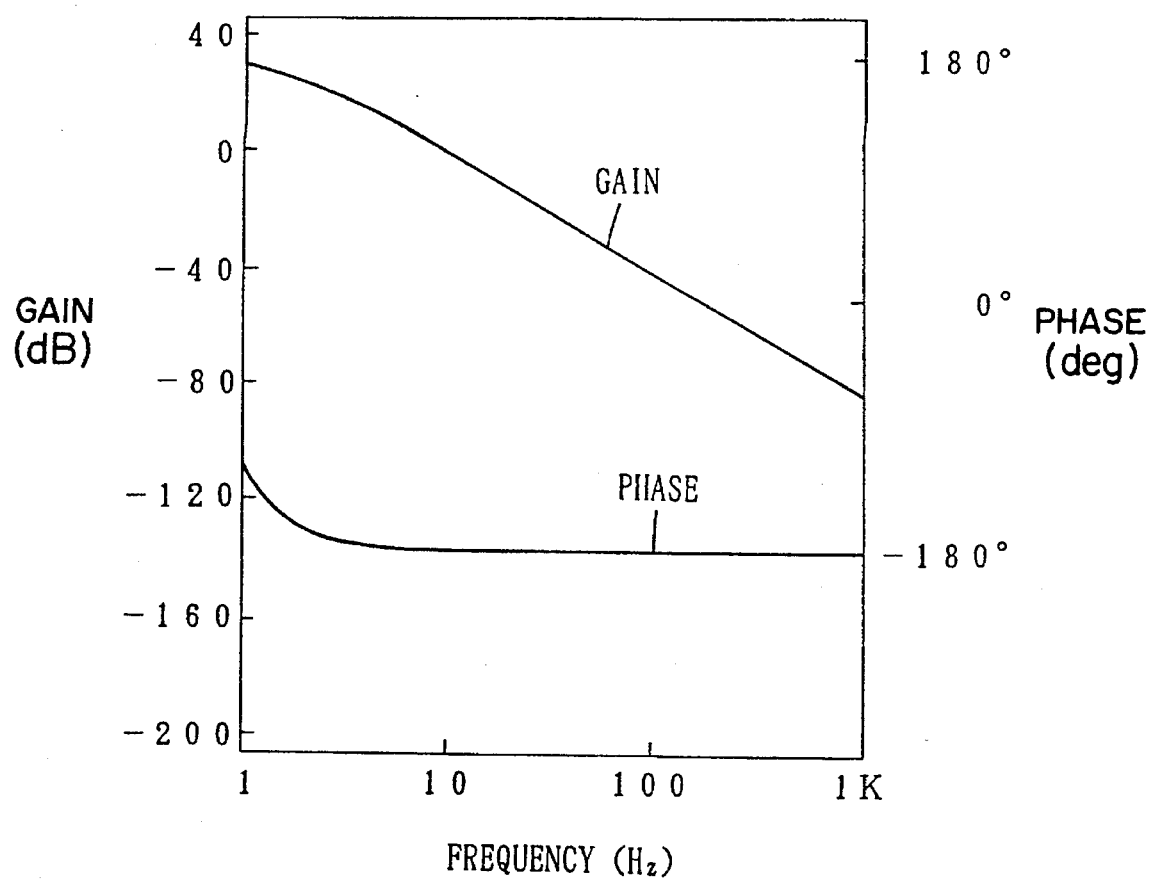

FIG.19c ○ ─────────────────
        0 - - - - - - - - - - - - - - -

UNLOADED TRAVEL PERIOD →     UNLOADED TRAVEL PERIOD ←

(SPACING ERROR SIGNAL)

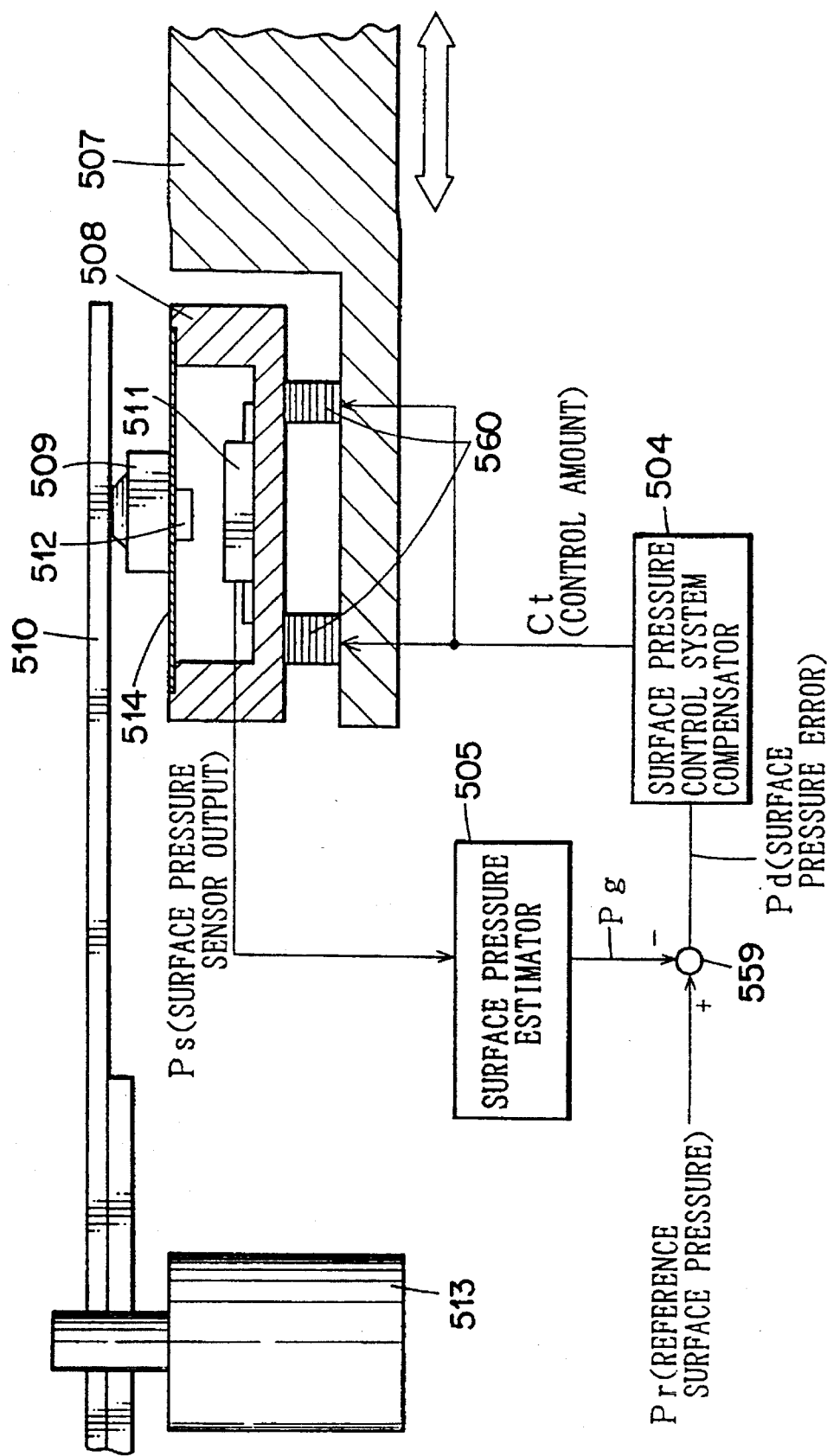

TAPE TENSION CONTROL FOR A MAGNETIC RECORDING AND REPRODUCING APPARATUS THAT ADJUSTS SPACING ERROR BASED ON THE REPRODUCED SIGNAL ENVELOPE

This application is a divisional of application Ser. No. 07/882,016 filed on May. 13, 1992, now U.S. Pat. No. 5,395,066, the entire contents of which are hereby incorporated by reference.

BACKGROUND OF THE INVENTION

1. Field of the Invention

The present invention relates to a magnetic recording and reproducing apparatus of a type that uses a magnetic tape and a rotary head, such as video tape recorders, and more particularly to a means for controlling the tape tension and tracking as well as the amount of spacing between the magnetic head and the magnetic tape to permit high-density recording and high-speed replay.

2. Description of the Background Art

FIG. 48 shows the outline construction of a general tape driving system in a rotary head type magnetic recording and reproducing apparatus, such as video tape recorder (VTR) cited in "Jiki Kiroku Gijutsu Nyumon (Introduction of Magnetic Recording Technology)" (by Yokoyama, published by Sogo Denshi Shuppansha, page 187).

The path in this tape drive system through which the magnetic tape T travels consists of the following components:

a supply reel 15; a back tension post 36 to detect the tension of the magnetic tape T running through the path; a full-width erase head 37 to erase the information recorded by the rotary head on at least a part of the magnetic tape T; an impedance roller 55 and a guide roller 17 to stabilize the movement of the magnetic tape T; an inclination post 18 to give a certain inclination to the magnetic tape T fed onto the circumference of the head cylinder D made up of an upper cylinder $D_1$ and a lower cylinder $D_2$; a circumferential edge of the head cylinder D having a rotary head (not seen in this figure because of the magnetic tape T obstructing the sight); an inclination post 20 to relieve the magnetic tape T leaving the head cylinder D of the inclination; a guide roller 21; an impedance roller 70; an erase head 73 to erase information including voice and control information recorded on the linear track formed parallel to the edge of the magnetic tape T; a record and reproduce head 74 for recording and reproducing information such as voice information and control signal to and from the linear track; a pinch roller 75 to hold the magnetic tape T with a constant pressure between it and a capstan 22, which is driven by a capstan motor not shown to drive the magnetic tape T at a specified speed; a guide roller 80; and a takeup reel 23.

In the above construction, the magnetic tape T is gripped by the pinch roller 75 and the capstan 22 rotating at a specified speed and is pulled by the rotating force of the capstan 22 so that it is driven from the supply reel 15 through the back tension post 36 to the guide roller 80 and finally wound on the takeup reel 23. In a part of this tape passage, the magnetic tape T is wound helically on the head cylinder D at a specified angle to allow the rotary head that rotates with the upper cylinder $D_1$ to magnetically record or reproduce information to/from the helical track on the tape.

In this part of the tape passage, the recording and reproducing or erasing is also carried out by the full-width erase head 37, erase head 73 and record and reproduce head 74 in addition to the rotary head. That is, when all the information to be recorded on the magnetic tape, such as the video signal, audio signal and control signal, is new, the information present in the full width of the magnetic tape T is erased by the full-width erase head 37 and then the video, audio and control signals are recorded by the rotary head and the record and reproduce head 74. During the after-recording of voice or during the rewriting of only the control signal, only the linear track area of the magnetic tape is erased by the erase head 73 and then new voice and control information is recorded in the linear track by the record and reproduce head 74.

The record format used in recording such video, audio and control signals in helical track or linear track can be made compatible with video signal recording schemes generally known as VHS and β systems and a digital voice signal recording scheme generally called DAT.

In this kind of magnetic recording and reproducing apparatus, high density recording and reproducing requires keeping the spacing between the magnetic head and the tape at a constant value. Further, to perform special reproduction such as high-speed replay and still replay without generating noise requires an additional control of making the magnetic head follow the recorded helical track.

That is, to record, reproduce or erase the magnetic tape with good characteristic in a high frequency range in the magnetic recording and reproducing apparatus, it is necessary to keep spacing between the magnetic head gap portion and the magnetic tape at a small constant value. If this requirement is not met, a desired characteristic cannot be obtained. This is a known fact.

In the magnetic recording and reproducing apparatus shown in FIG. 48, when the tension of the magnetic tape T between a tape portion held by the impedance roller 55 and the guide roller 17 and another tape portion held by the capstan 22 and the pinch roller 75 is increased, the air gap or spacing between the magnetic tape T and the rotary head, erase head and record and reproduce head becomes smaller, improving the high-frequency characteristic. But when the tension is reduced, the gap between the magnetic tape T and these magnetic heads increases, deteriorating the high-frequency characteristic.

However, when the spacing becomes so small that the magnetic tape T directly contacts the magnetic heads, the wear of the magnetic heads increases deteriorating their working life or damaging the tape. Too small a spacing also poses a problem of degrading the magnetic tape during the still replay because the still replay reproduces the same track continuously.

It has therefore been required that the spacing between the magnetic tape and the magnetic head be kept constant. As one means of meeting this requirement, there is a known method for controlling the back tension of the magnetic tape.

FIG. 49 shows an example of the back tension controller applied to the magnetic recording and reproducing apparatus of FIG. 48. This back tension controller controls the back tension of the tape to keep the spacing constant. The force required to draw out the magnetic tape T from the supply reel 15 mounted on the supply reel mount 15a, i.e., the back tension, is controlled to keep the tension of the magnetic tape T at a specified constant value. The supply reel 15 and the back tension post 36 are also shown in FIG. 48.

A band brake 76 with one end fixed is provided to the circumference of the supply reel mount 15a to restrict the rotation of the reel mount. The other end is engaged with a pin 77b on a tension control arm 77 that is pivotable about a shaft 77a.

The other end of the tension control arm 77 opposite to the shaft 77a is fitted with the back tension post 36 with which the magnetic tape T engages. The intermediate portion of the tension control arm 77 is formed with a connector portion 77c, to which a tension spring 78 is attached at one end, with the other end connected to the tip of a tension adjust lever 79.

The tension adjust lever 79 can be rotated about its shaft 79a. By rotating the lever 79 to change the pulling force of the tension control arm 77 through the tension spring 78, it is possible to adjust the reference tension of the tension controller.

In the tension controller of FIG. 49, as the tension of the magnetic tape T increases, the tension control arm 77 rotates clockwise against the pulling force of the tension spring 78. The pin 77b—to which the free end of the band brake 76 mounted around the circumference of the supply reel mount 15a is attached—moves toward the right in the figure loosening the band brake 76, with the result that the force restricting the rotation of the supply reel mount 15a becomes smaller, increasing the feed of the magnetic tape T and reducing its tension.

Conversely, when the tension of the magnetic tape T decreases, the tension control arm 77 is rotated counter-clockwise by the force of the tension spring 78. The pin 77b—to which the free end of the band brake 76 mounted around the circumference of the supply reel mount 15a is attached—moves toward the left in the figure increasing the braking force of the band brake 76, with the result that the feed of the magnetic tape T is reduced and the tension of the tape is increased.

The basic or reference tension can be adjusted by rotating the adjust lever 79, as mentioned above.

In the conventional magnetic recording and reproducing apparatus, the tension of the magnetic tape is adjusted by the mechanism described above to absorb moderate variations of the tape tension at the tape supply position, thereby holding the spacing between the magnetic tape and the head constant.

Such a conventional system does not relate the spacing between the magnetic tape and the head to the tape tension in the control of the spacing. The control of the spacing at a constant value for securing the steady head contact is achieved by making the surface accuracy of the magnetic tape uniform and by performing a strict quality control during manufacturing process on the head cylinder's surface smoothness and the window shape as well as on the shape and the amount of projection of the magnetic head.

However, it is very difficult to control the spacing with a precision required for high density recording on the magnetic tape. In apparatuses that perform special replay in which the replay and search is made while feeding the magnetic tape at high speed, the variations in the tape speed increase producing temporary tensions in the tape. This makes it practically impossible to keep the tape tension and spacing at constant values by a mechanical control system.

In other words, the control of the spacing making use of such a mechanical system may be applicable to systems that require only a low-frequency control range or not-so-high recording density. The above control method poses a problem when the line recording density is increased.

As the magnetic tape in recent years has increasingly fine surface smoothness as with the vapor deposition tape, the spacing accuracy or the precision required of the contact head also increases, raising the requirement of the control accuracy and making it increasingly difficult to deal with this problem by the mechanical control of the head contact.

During the special replay such as high-speed search, tape speed variations become large, causing temporary tension in the tape. In such a case, it is difficult to keep the tape tension and therefore the spacing at constant values by a mechanical control system. Hence the head contact inevitably deteriorates.

Next, we will explain the tracking process in which the magnetic head traces the helical track.

In the normal speed (1-time speed) replay, the magnetic head tracing on the magnetic tape is done by keeping the tape speed and the rotating speed of the rotary head equal to those during the recording, so that the angle between the magnetic head trace and the edge of the magnetic tape becomes equal to the angle of the track being recorded.

However, if the replay is performed by changing only the magnetic tape speed from that during the recording, with the rotating speed of the rotary head set equal to that during the recording, the angle in which the magnetic head traces does not match the angle of the recording track, causing deviations from the track (or simply referred to as an inclination error) and therefore noise on the reproduced picture.

In the helical scan type VTR mentioned above, the conventional auto-tracking reproducing apparatus which matches the locus of the magnetic head with that of the recording track normally has a video signal reproducing magnetic head mounted on an electro-mechanical conversion element (referred to as a head actuator). During replay, the head actuator drives the magnetic head in a direction perpendicular to or in a direction having a vertical component with respect to the movement of the recording track to make the magnetic head automatically trace the recording track.

Various kinds of auto-tracking control techniques for automatically tracing the recording track by the magnetic head mounted on the head actuator have been proposed and already put into practical use.

As to the detection of tracking error, as is known with the 8 mm VTR format, several kinds (four example, four) of low-frequency tracking pilot signals outside the video signal frequency band are superimposed on the video signal and recorded over several tracks (four tracks) so that different pilot signals are adjacent to each other. With this pilot signal method, a tracking error signal may be detected according to the difference in cross-talk level between the left and right tracks during the replay.

As to the wobbling method employed in the 1-inch VTR of Anpex Corp. and the D-2 format digital VTR DVR-10 of Sony Corp., the magnetic head is forcibly subjected to fine vibrations at a constant frequency or so-called wobbling frequency in the track width direction. The reproduction envelope signal from the magnetic head at this time is synchronously detected at the wobbling frequency to produce a tracking error signal.

As to the so-called mountain climbing method employed in NV-10000 VHS-VTR of Matsushita and HV series and F75 VHS-VTR of Mitsubishi Electric, the reproduction envelope signal from the magnetic head is sample-held at the center of the field read out. Then, the voltage applied to the actuator or the rotating phase of the capstan motor is changed one step(for example, increased one step), and the envelope level of the frame is compared with the sample-held value. This series of operations is continued until the next frame envelope level is smaller.

Then, if the next frame envelope becomes smaller, the direction of applied voltage is reversed and the similar operation is continued to converge the reproduction envelope toward the maximum value.

The conventional auto-tracking reproduction apparatus utilizes the above-mentioned various tracking error detection methods whereby tracking errors are detected and fed back to the head actuator incorporated in the head cylinder.

Such movable heads are generally used not only for the DTF control to correct the tracking error at times of normal speed replay but also frequently used for special replays such as high-speed replay, slow replay and still replay.

FIG. 50 shows the outline of a system, published in the National Technical Report Vol.28, No.3 (June, 1982), page 41, as one example case where such a movable head is applied for noiseless special replay.

The process of high-speed special replay according to the conventional technique is briefly explained below. In the block diagram of FIG. 51, the rotating magnetic head H is driven by the head actuator 14 in a direction perpendicular to the direction of the tape travel. The reproduction envelope signal from the magnetic head H is fed to the tracking error detector 16, which detects the amount of tracking error.

The inclination correction pattern generator 18 uses the tape speed information from the frequency generator representing the rotating speed of the capstan to generate an inclination correction pattern that causes the magnetic head H to trace the track in such a way that the angle at which the magnetic head H scans over the tape is equal to the angle of the recording track.

The tracking error signal from the tracking error detector 16 and the inclination correction pattern from the inclination correction pattern generator 18 are added up by an adder 410 to produce a head actuator drive signal that causes the magnetic head to move in the direction of the magnetic tape travel.

As described in more detail, during the normal speed (1-time speed) replay, the magnetic head H traces on the tape at an angle equal to the angle of the recording track. However, during the replay at different speeds the angle at which the magnetic head H traces over the tape is not equal to the angle of the recording track, resulting in a track shift (referred to as an inclination error) and generating noise on the reproduced picture.

FIGS. 52 and 53 show the relationship between the recording track pattern on the magnetic tape and the locus of the magnetic head. The rotating speed of the rotary head remains the same as that during the recording. The tape is driven in the forward direction in FIG. 52 and in the backward direction in FIG. 53, at a 5-times replay speed, which means the tape is driven and replayed at 5 times the recording speed.

Reference numeral A in FIG. 52 shows the locus of the magnetic head at times of recording and normal replay. When the magnetic tape is driven at 5 times the normal speed in the forward direction, the angle of the magnetic head locus becomes large as shown at B so that the magnetic head crosses five tracks (1)–(5) in the same period that it crosses the magnetic tape widthwise.

FIG. 53 shows the locus of the magnetic head when the magnetic tape is driven at 5 times the normal replay speed in a direction reverse to the locus of the magnetic head that was described during the normal replay. It describes a locus C that intersects the tracks –(1) to –(5) at a small angle.

To realize noiseless replay of the reproduced picture also during the special replay mode in which the magnetic tape is driven at speeds different from that for recording, as in the 5-times speed replay, the loci B, C must be corrected so that they trace the recorded tracks.

FIG. 54 shows the outline of inclination error patterns produced in a so-called guard bandless recording scheme VTR which separates signals of adjacent tracks from each other that have no space therebetween. These inclination error patterns are produced during an n-times speed replay (n is an arbitrary real number) by a reproducing apparatus that uses a rotary head having two magnetic heads arranged at opposite positions 180 degrees apart.

Let T stand for one-half period of the rotary head rotation and tp for track pitch. Then, the inclination error during the n-times speed replay is given by $tp(n-1)$. The value of the inclination error is expressed as a function that has a replay speed ratio n as a parameter. In other words, the inclination error changes according to the tape travel speed.

The inclination correction pattern generator 18 in FIG. 51 may use, for example, an FG signal from the capstan frequency generator as the tape speed information to generate the inclination correction pattern.

When the inclination correction pattern is fed to the head actuator 14 of FIG. 51, the locus of the magnetic head H is corrected in its inclination so that the magnetic head moves parallel to the recorded track even during replay at other than the normal replay speed.

However, simply displacing the magnetic head H according to the angle of the recorded track cannot avoid deviation of the head from the track because of the difference in linearity between the recording track and the magnetic head H or because of the phase shift of the track. For the purpose of preventing this track shift, normally a closed-loop auto-tracking control system, shown enclosed by dotted line in FIG. 51, is added.

The control methods for the auto-tracking control system include the pilot scheme, wobbling scheme and mountain climbing scheme. To produce a quality picture even during replay at other than normal replay speed, it is necessary to make the magnetic head follow the non-linearity of the recorded track (track bend). It is therefore preferred that the pilot scheme and wobbling scheme that can offer relatively wide control frequency range be adopted. The control method and operation of the auto-tracking control system are known and hence their explanation is omitted.

In digital VTRs that digitally record and reproduce Hi-Vision signal, video signal and audio signal, the amount of information on the signals to be recorded is very large. To permit long hour recording on a limited-size cassette tape, a high-density recording and high-precision DTF control are essential for the reproducing technique.

The DTF device in conventional VTRs has only a movable head with the tracking error correction means mounted on the head cylinder, so that the DTF control performance is determined by the performance of the head actuator that drives the movable head.

A desirable head actuator for the DTF control having high precision and wide frequency range should have no phase shift in a relatively high frequency range of, for example, between 1 kHz and several kHz. To suppress phase shift in a frequency range up to high frequency, a mechanical characteristic that does not resonate up to high frequency is necessary.

The first-order resonance frequency of the actuator mechanical characteristic is given by taking a square root of an actuator spring constant divided by the movable portion mass and dividing the square root by $2\pi$. So, to increase the first-order resonance frequency, it is common practice to reduce the movable portion mass or increase the actuator spring constant.

As mentioned earlier, the movable head is generally used not only for the DTF control during the normal speed replay but also for special replays. The high-speed noiseless reproducing apparatus in the conventional VTR corrects the tracking error by moving the magnetic head in the widthwise direction of the recorded track by the head actuator. Hence, the amount of tracking error that can be corrected is limited to the movable range of the head actuator.

In the conventional construction, therefore, the head actuator must be incorporated into the head cylinder whose outer diameter is determined by industrial standard. This requires the size of the head actuator to be reduced. Further, since the head actuator is required to have high spring stiffness suited for high resonance frequency essential for wide band DTF, the movable range of the head actuator is necessarily limited, lowering the performance of the high-speed special replay.

As mentioned above, the conventional apparatus has the problem that it is physically impossible to realize both the high-precision wide-band DTF control having a control band of several hundred Hz and the noiseless high-speed reproducing performance at as high as several tens of times the normal replay speed.

Since the tape tension control mechanism in the conventional magnetic recording and reproducing apparatus is constructed as described above, no special tape tension control is performed during high-speed tape feeding except that a constant load is applied to the tape in a direction opposite to the tape feed direction. Thus, the tape tension control mechanism cannot correctly respond to the temporary tension variations, causing damage to the tape. Another drawback of this mechanism is that changes in the contact state between the magnetic head and the tape due to the tension variations result in output variations, easily degrading the information.

Further, the conventional tension control mechanism has a narrow tension control frequency band and thus can suppress tension variations only at several Hz or lower. Therefore, with the VTRs that perform high-density recording and reproducing like digital VTRs, it is impossible to keep the spacing between the magnetic head and the magnetic tape at an optimum value at all times, rendering the good recording and reproduction difficult.

While the conventional magnetic recording and reproducing apparatus with the above construction can hold the tape tension and secure the head contact in the low frequency band on the tape supply side, it cannot remove variations in the tape tension at the head cylinder caused by load variations in the tape drive system. The variations in the spacing between the magnetic tape and the head resulting from tape tension variations at the cylinder head hinders the high-density recording and causes damage to tape and head wear.

The spacing variations are also produced by the deviation of the head cylinder, which compounds the problem. In the magnetic disk apparatuses, too, spacing variations resulting from the plane vibrations of the disk pose a serious problem. In the conventional magnetic recording and reproducing apparatuses, therefore, the important task to be addressed is to keep the spacing constant, enable high-density recording and at the same time improve reliability of the apparatus and recording mediums.

SUMMARY OF THE INVENTION

This invention has been accomplished to overcome the above-mentioned problems and it is an object of the invention to provide a magnetic recording and reproducing apparatus which can perform high-speed DTF control in a wide control range of several hundred Hz and at the same time realize a noiseless high-speed replay at several tens of times the normal replay speed without degrading the picture quality.

Another object of the invention is to provide a magnetic recording and reproducing apparatus which ensures an optimum contact between the head and the tape at all times by a high-precision, wide-band tension control, thereby providing a good recording and reproduction.

A further object of the invention is to provide a magnetic recording and reproducing apparatus which controls at a constant value the surface pressure that the magnetic head receives from the recording and reproducing medium in order to regulate the spacing between the magnetic head and the medium at a constant value, thereby realizing the high-density recording and substantially improving reliability of the apparatus and recording medium.

FIG. 1 shows a concept of one fundamental principle of this invention. In a head cylinder having a rotary head H (in the figure only the rotating surface of the rotary head is shown by reference numeral 1), a pair of stationary pins $10a_1$, $10a_2$ and a movable pin $9a$ are provided on the magnetic tape T supply side. On the takeup side of the head cylinder are installed two stationary pins $10b_1$, $10b_2$ and a movable pin $9b$.

The supply side movable pin $9a$ is attached with a supply side tape actuator $11a$ to change the distance of the supply side movable pin $9a$ from the line connecting the stationary pins $10a_1$, $10a_2$. Likewise, the takeup side movable pin $9b$ is attached with a takeup side tape actuator $11b$ to change the distance of the takeup side movable pin $9b$ from the line connecting the stationary pins $10b_1$, $10b_2$.

By controlling the supply side tape actuator $11a$ to move the supply side movable pin $9a$, the tension of the magnetic tape T at the head cylinder can be controlled.

When the tape is replayed at a speed different from the recording tape speed, the supply side tape actuator $11a$ and the takeup side tape actuator $11b$ are differentially operated to perform tracking.

A very precise control can be performed by using a control system that includes a state estimator which simulates the characteristics of the supply side tape actuator $11a$ and the takeup side tape actuator $11b$ for the control of these actuators.

In a case where the magnetic head can be moved perpendicularly toward the recording surface of the medium, a surface pressure estimator is provided to estimate the surface pressure of the magnetic head from the displacement of the magnetic head. A surface pressure control signal is produced according to the difference between the estimated surface pressure given by the surface pressure estimator and the reference surface pressure. Based on this surface pressure control signal, the surface pressure of the magnetic head can be controlled.

Detailed description will be given in the following example embodiments as to the operation and configuration of the control system for controlling the constitutional elements of the invention, particularly those of the state estimator for simulating the tape actuator characteristics and of the surface pressure estimator for estimating the surface pressure of the magnetic head.

The head cylinder of this invention may include various known types, such as one which consists of a rotatable upper cylinder attached with a magnetic head and a non-rotatable lower cylinder; one having a rotating drum or disk fitted with a fixed magnetic head and arranged between two non-rotatable cylinders; or one having a rotatable head cylinder attached with a magnetic head.

As the stationary pin 10 and movable pin 9, rollers may be used.

Returning again to FIG. 1, if the two tape actuators 11a, 11b are operated non-differentially, i.e., if only the supply side tape actuator 11a is driven, with the takeup side tape actuator 11b left idle, it is obvious that the magnetic tape tension at the head cylinder changes according to the direction and amount of vertical displacement of the supply side movable pin 9a. By controlling the magnetic tape tension, it is possible to perform the head touch control and correct the acceleration applied to the magnetic recording and reproducing apparatus.

When the supply side tape actuator 11a and the takeup side tape actuator 11b are driven differentially, i.e., in vertically opposite directions, the magnetic tape T at the head cylinder between the two loops is moved forward and backward in a longitudinal direction to change the tape running speed at the head cylinder without affecting other regions of the tape drive system. Hence, by differentially driving the tape actuators 11a, 11b according to the amount of tracking error, it is possible to correct the tracking error.

As described in more detail, when the magnetic tape is running at a speed $V_C$, the supply side and takeup side movable tape pins 9a, 9b may be moved differentially, that is, the supply side movable tape pin 9a is moved at a speed $V_B$ upwardly ($+V_B$) or downwardly ($-V_B$) while the takeup side movable tape pin 9b is moved at the same speed $V_B$ downwardly ($-V_B$) or upwardly ($+V_B$). The speed of the tape between the two rollers, i.e., the tape speed $V_A$ at the head cylinder is expressed by a linear relationship as shown at the equation (1).

$$V_A = V_C + 2V_B \tag{1}$$

According to the equation (1), the supply side and takeup side movable tape pins 9a, 9b are controlled in an open loop and forcibly driven in a differential manner by triangular or saw tooth waveforms of frequency $F_S$ in synchronism with the rotation frequency of the magnetic head. This increases or reduces the tape speed at the head cylinder periodically from the normal reproducing speed V in the range of $V \pm V_B$, thus providing a period T when the tracking is maintained during the special replay operation. When a triangular waveform is used, which is an ideal case, the period T is one-half the triangular waveform or $F_S/2$.

Let us consider a case where this period T is set smaller than $F_S/2$ for safety by taking into account the limit of the tape actuator response speed. In one period T in which the triangular waveform rises and the tracking is maintained, a signal for at least one frame of picture is reproduced and stored in the image memory. In the next period in which the triangular waveform goes low and in which the tracking cannot be established, i.e., the reproduction cannot be done, the video signal from the image memory is output to the screen to permit a good signal reproduction although the reproduced picture shows a somewhat intermittent motion.

With this method, the range in which the replay speed can be changed is determined by the strokes of the supply side and takeup side movable tape pins 9a, 9b and the frequency of the triangular wave (or cycle frequency) $F_S$.

For instance, in the case of a tape format where one frame of picture data is read out during one rotation of the rotary head in a multi-head, the following relationship holds between the reproduction speed multiplier N, the stroke t of the supply and takeup side movable tape pins 9a, 9b and the cycle frequency $F_S$, with the period T taken as $F_S/4$ for safety.

$$N = (4F_S \cdot X_{P-P}/V) + 1 \tag{2}$$

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention and wherein:

FIG. 4 is a cross section of the tape actuator used in the embodiment;

FIG. 6 is a graph showing the "displacement angle/frequency" characteristic of the tape actuator;

FIGS. 19a–19e are waveform diagrams of signals produced in the head touch control circuit of FIG. 18;

FIG. 46 is a schematic diagram showing the outline configuration of the thirteenth embodiment having the surface pressure control system of this invention applied to the magnetic disk apparatus;

DETAILED DESCRIPTION OF PREFERRED EMBODIMENT

[Outline of First Embodiment]

A first embodiment of the invention will be described by referring to a block diagram in FIG. 2.

Figure 1:
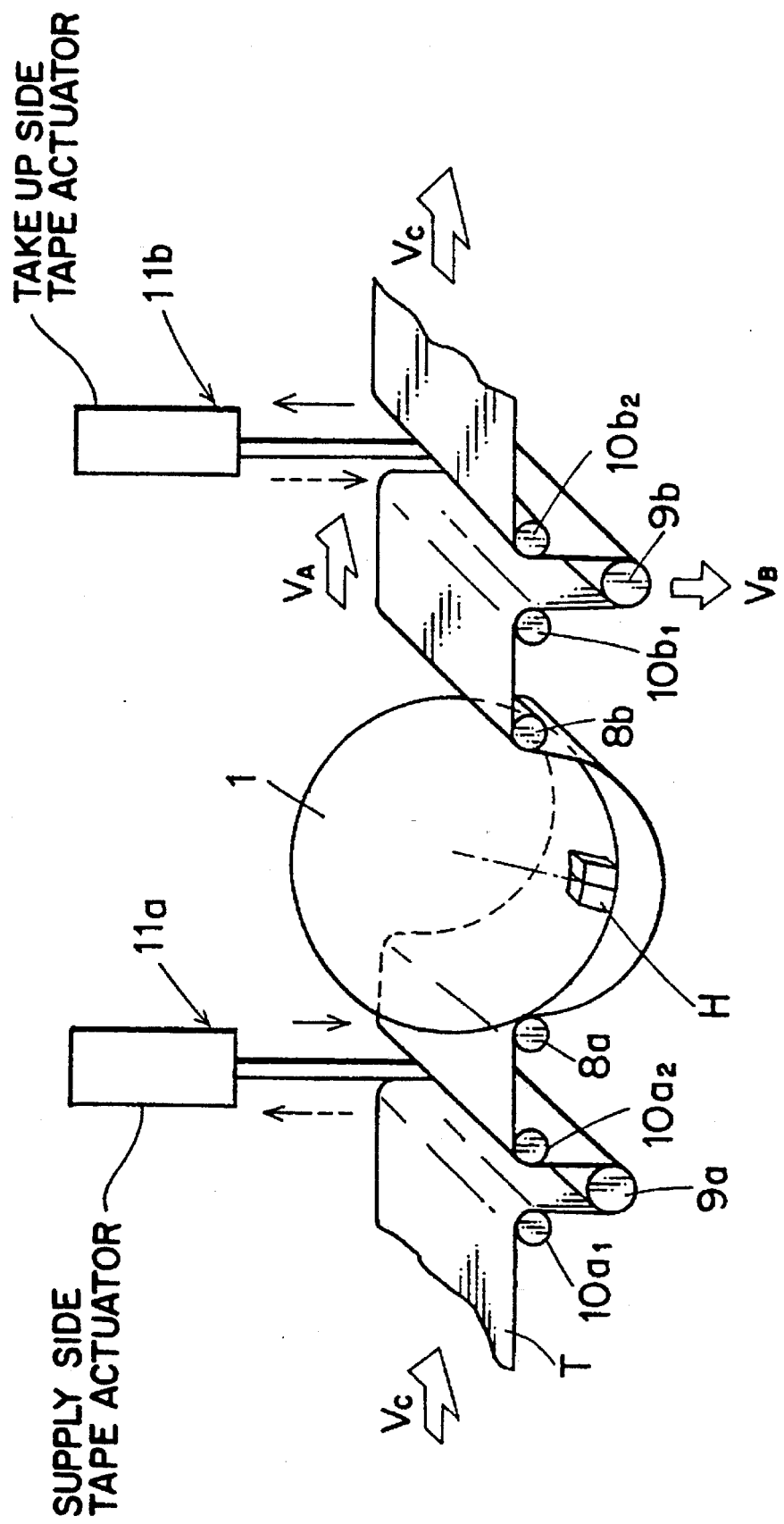
FIG. 1 is a concept showing one fundamental principle of this invention.
Figure 2:
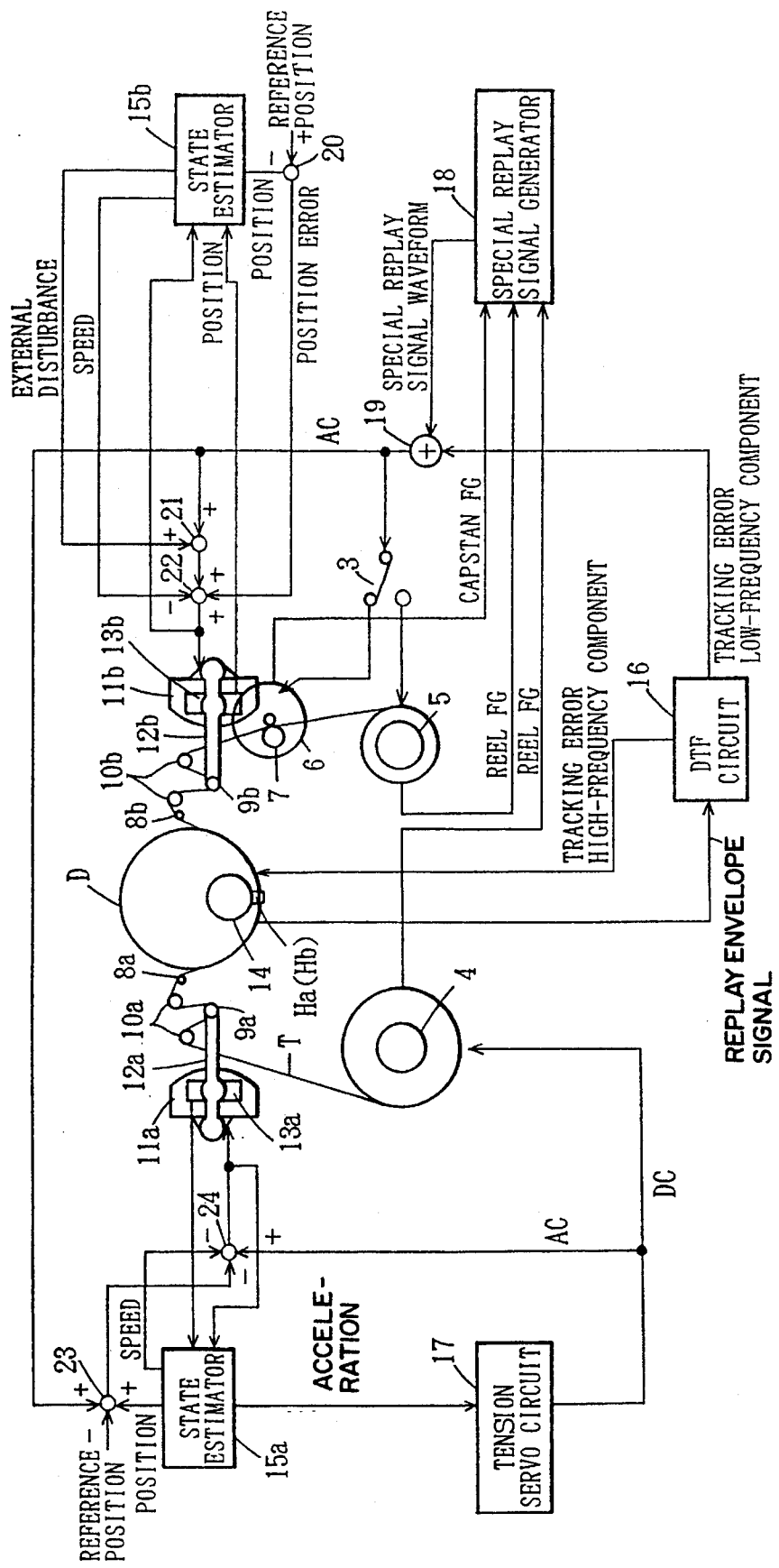
FIG. 2 is a block diagram of a first embodiment.

In FIG. 2, reference symbol D represents a head cylinder; T a magnetic tape; Ha, Hb one or two magnetic heads mounted to the head cylinder D; 4 a supply reel motor for feeding the magnetic tape T to the head cylinder D; 5 a takeup reel motor for taking up the magnetic tape T from the head cylinder D; 6 a capstan motor to drive the capstan for feeding the magnetic tape T in its longitudinal direction at a constant speed; 7 a pinch roller pressed against the capstan to transfer the drive torque of the capstan motor 6 to the magnetic tape T in order to feed the magnetic tape T in its longitudinal direction; 8a a slant pole on the tape supply side of the head cylinder D; and 8b a slant pole on the tape takeup side of the head cylinder D.

A switch 3 is used to bring either the capstan motor or the reel motor under the DTF control. That is, during the normal recording and replay or during the replay at several times the normal speed, the tape feeding is performed by the capstan motor. But during the replay at several tens of times the normal speed, the capstan cannot feed the tape at such a high speed and thus the tape is fed by the reel motor on the takeup side.

In other words, the object to be controlled by the DTF control system in correcting the tracking error is the capstan motor in the tape speed range of up to several times the normal speed. At speeds higher than several tens of times the normal speed, the reel motor on the takeup side is controlled. Hence, the switch 3 selects between the capstan motor and the reel motor for the DTF control.

At several tens of times the normal speed, the capstan and the magnetic tape separate from each other, so that power need not be supplied to the capstan motor. The reel motor is always fed with dc power according to the operation mode such as recording and reproducing. In this figure, the dc power supply circuit is not shown to avoid complexity.

Denoted 9a is a supply side movable tape pin installed on the magnetic tape supply side of the head cylinder D. Designated 10a are two supply side stationary tape pins facing each other on the tape supply side of the head cylinder D. The two stationary tape pins 10a are so mounted that the interval between them is slightly larger than the maximum diameter of the supply side movable tape pin 9a and that the locus of the movable pin 9a changes its distance from a line connecting the two stationary tape pins 10a.

Likewise, designated 10b are two takeup side stationary tape pins facing each other on the tape takeup side of the head cylinder D. They are mounted so that the distance between them is slightly larger than the maximum diameter of the takeup side movable tape pin 9b and that the locus of the movable pin 9b changes its distance from a line connecting the two stationary tape pins 10b.

Denoted 11b is an actuator (referred to as a takeup side tape actuator) to drive the takeup side movable tape pin 9b; 11a an actuator (referred to as a supply side tape actuator) to drive the supply side movable tape pin 9a; 12a an arm to move the movable tape pin 9a by the rotation of the supply side tape actuator 11a; 12b an arm to move the takeup side tape pin 9b by the rotation of the takeup side tape actuator 11b; 13b a position sensor to detect the rotating angle of the takeup side tape actuator 11b; 13a a position sensor to detect the rotating angle of the supply side tape actuator 11a; and 14 a head actuator to move the magnetic head H in the direction of width of the magnetic tape T (in the vertical direction in the figure).

In FIG. 2, the state estimator 15a electrically simulates the "displacement/input voltage" transfer characteristic that represents the relationship between the input voltage and the displacement rotary angle of the supply side tape actuator 11a. From the input voltage and displacement angle of the supply side tape actuator 11a, the state estimator estimates the tension force applied to the supply side movable tape pin 9a, i.e., the acceleration, speed and position of the supply side tape actuator 11a. The state estimator 15b that receives inputs from the takeup side tape actuator 11b have virtually the same configuration and function as the state estimator 15a for the supply side tape actuator 11a.

A DTF circuit 16 generates a tracking error signal from a replay envelope signal reproduced by the magnetic head Ha (Hb). The high-frequency component of the tracking error signal (shown "AC" in the figure) is used to drive the head actuator 14 and the low-frequency component of the signal (shown "DC" in the figure) is used to drive the takeup side tape actuator 11b.

A tension servo circuit 17 outputs a control signal to the reel motor 4 and the supply side tape actuator 11a to control at a constant reference value the acceleration of the supply side tape actuator 11a fed from the supply side state estimator 15a.

A special replay signal generator 18 receives signals (reel motor FG signals) from the reel motor revolution frequency generator representing the revolution speeds of the reel motors 4, 5 and a signal (capstan FG signal) from the capstan revolution frequency generator representing the revolution speed of the capstan motor 6. The special replay signal generator 18 either processes the reel motor FG signal or performs frequency-voltage conversion on the capstan FG signal to produce the tape speed and, based on the tape speed, generates a triangle waveform signal that differentially operates the tape actuators 11a, 11b to control the tracking during the special replay such as a double-speed replay.

An adder 19 adds up a control signal for the takeup side tape actuator 11b supplied from the DTF circuit 16 and a triangular waveform signal for special replay supplied from the special replay signal generator 18. A subtractor 20 compares the reference position signal with an estimated position signal of the takeup side tape actuator 11b from the state estimator 15b and produces a position error signal. An adder 21 adds up the DTF signal to the takeup side tape actuator 11b and the estimated acceleration from the state estimator 15b. An adder/subtractor 22 adds the position error signal from the subtractor 20 to the output of the adder 21 and at the same time subtracts the estimated speed sent from the state estimator 15b from the sum. An adder 23 adds the DTF signal of the takeup side tape actuator 11b and the estimated position signal from the state estimator 15a to an inverted reference position signal of the supply side tape actuator 11a. An subtractor 24 subtracts the signal from adder 23 and the estimated speed signal from the state estimator 15a from the tension control signal that is supplied from a tension servo circuit 17 to the supply side tape actuator 11a.

Figure 49:
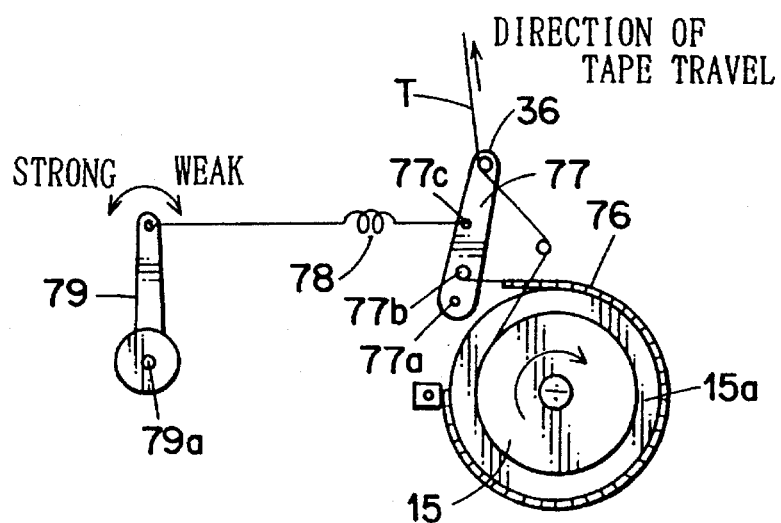
FIG. 49 is a schematic diagram showing an example construction of the conventional back tension controller.
Figure 50:
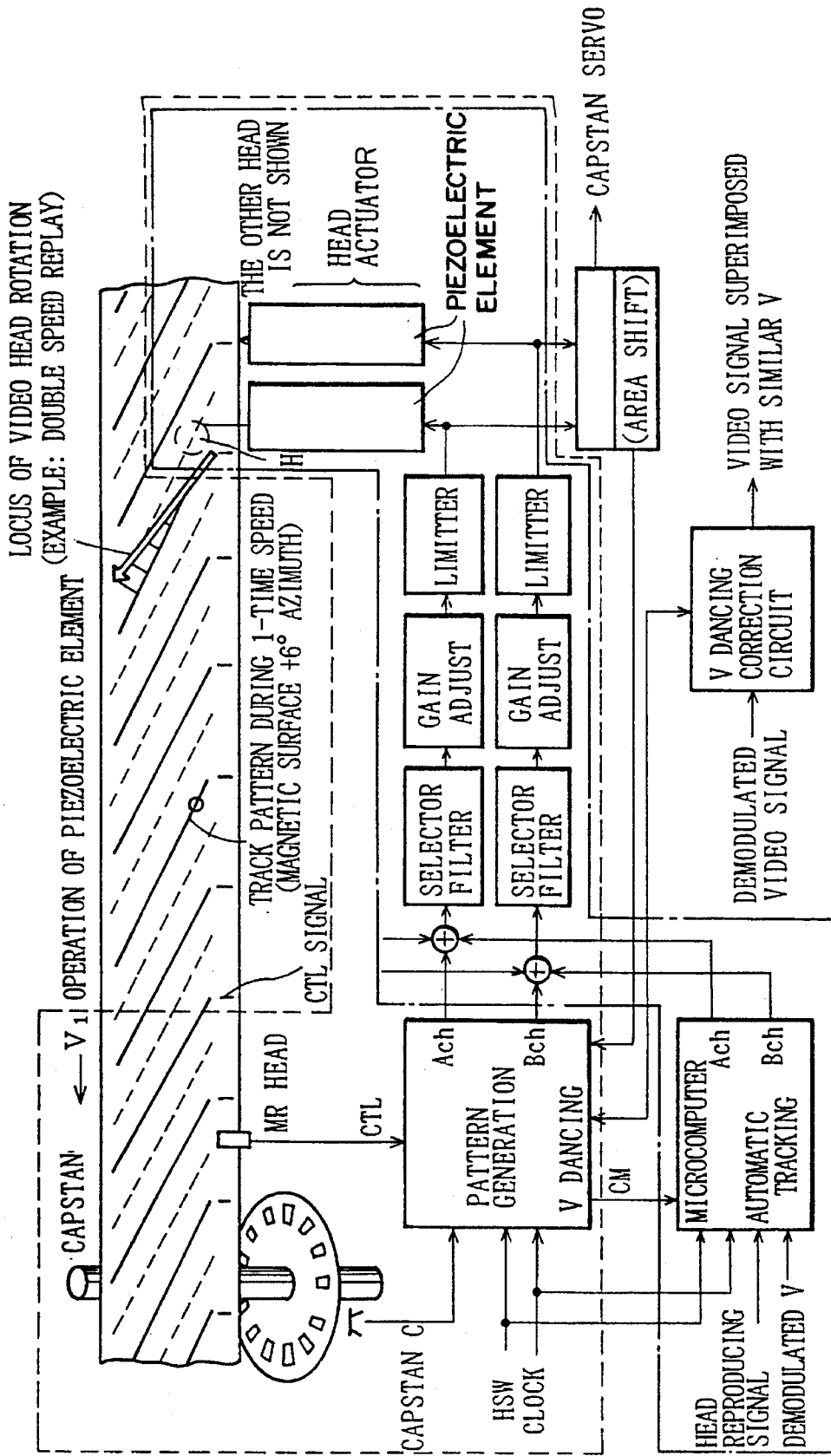
FIG. 50 is a schematic diagram showing the outline configuration of the system in which the movable head is used for the noiseless special replay.
Figure 51:
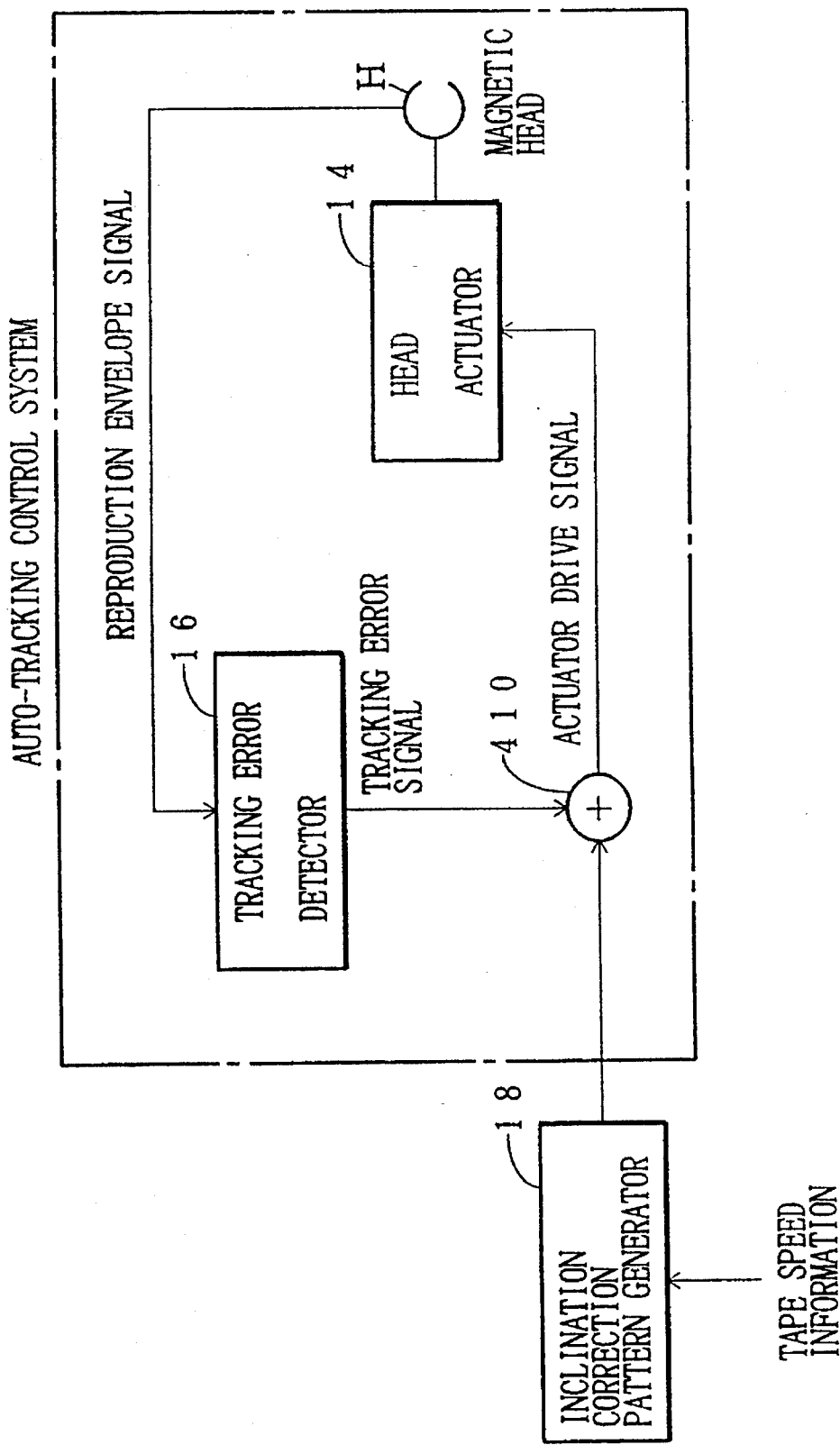
FIG. 51 is a block diagram showing an example method of high-speed special replay using a conventional technique.
Figure 52:
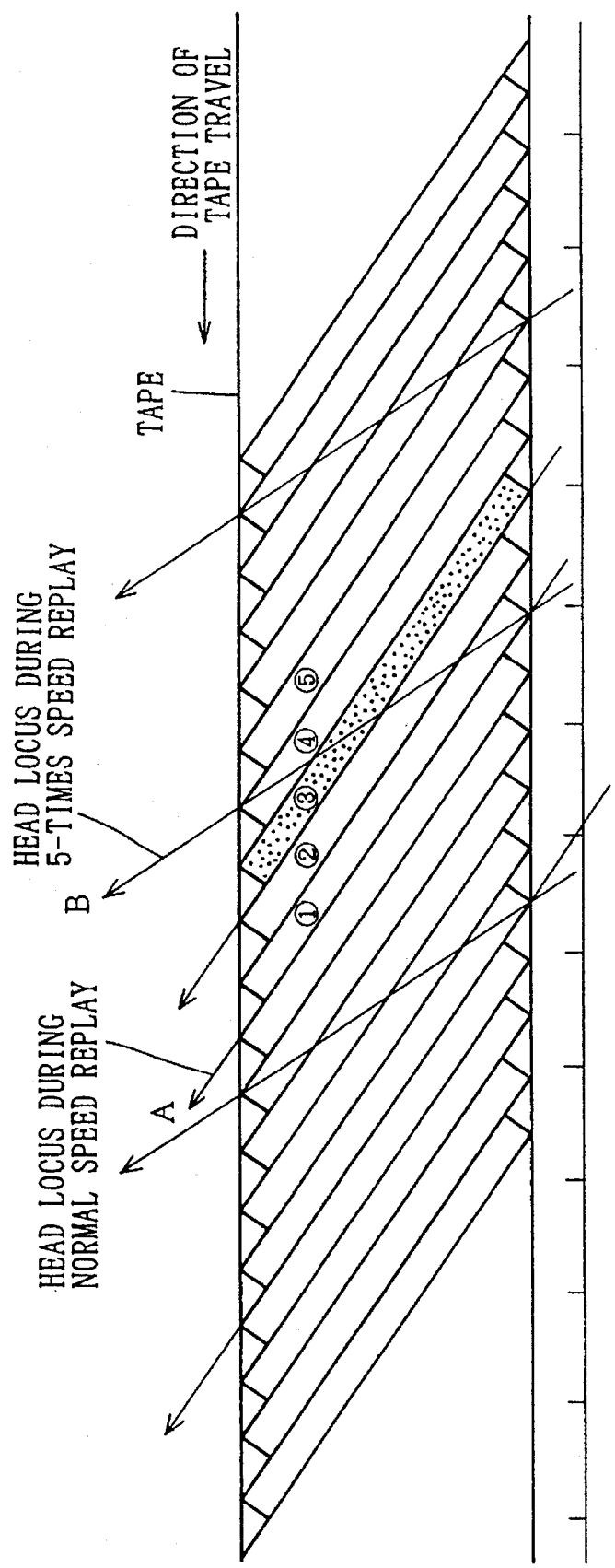
FIG. 52 is a diagram showing the operation of a five-times speed replay in forward direction.
Figure 53:
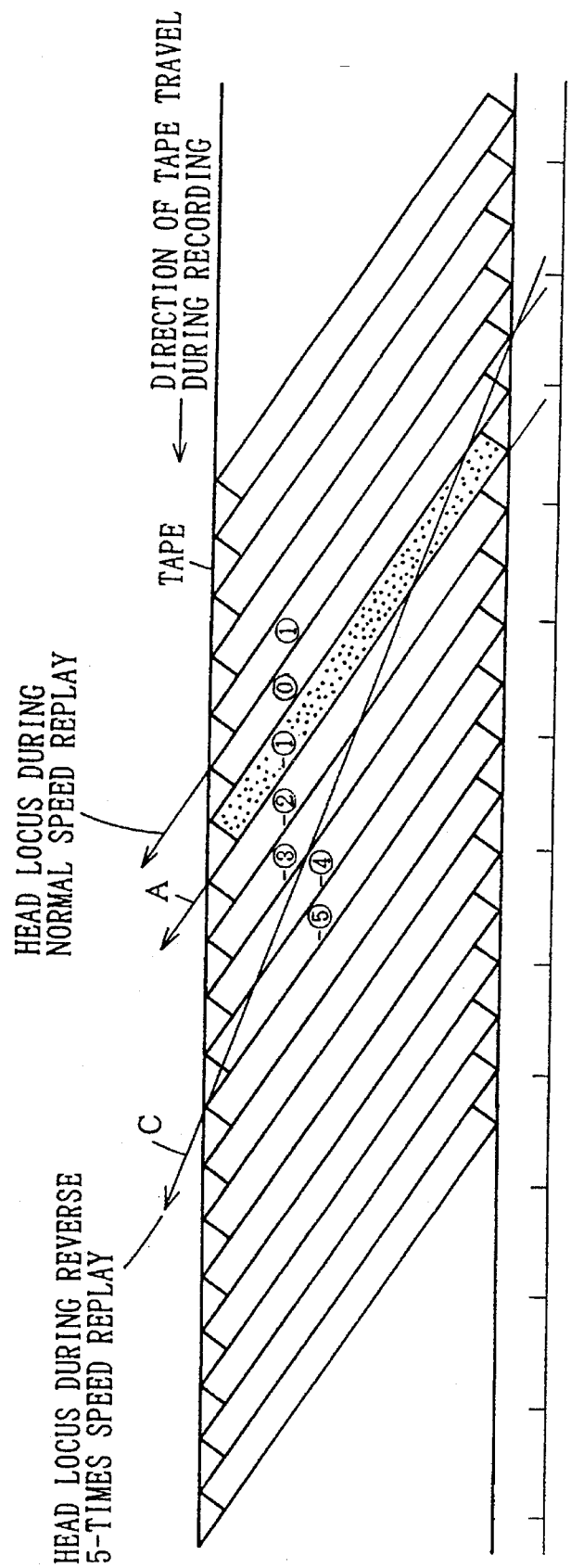
FIG. 53 is a diagram showing the operation of a five-times speed replay in backward direction.
Figure 54:
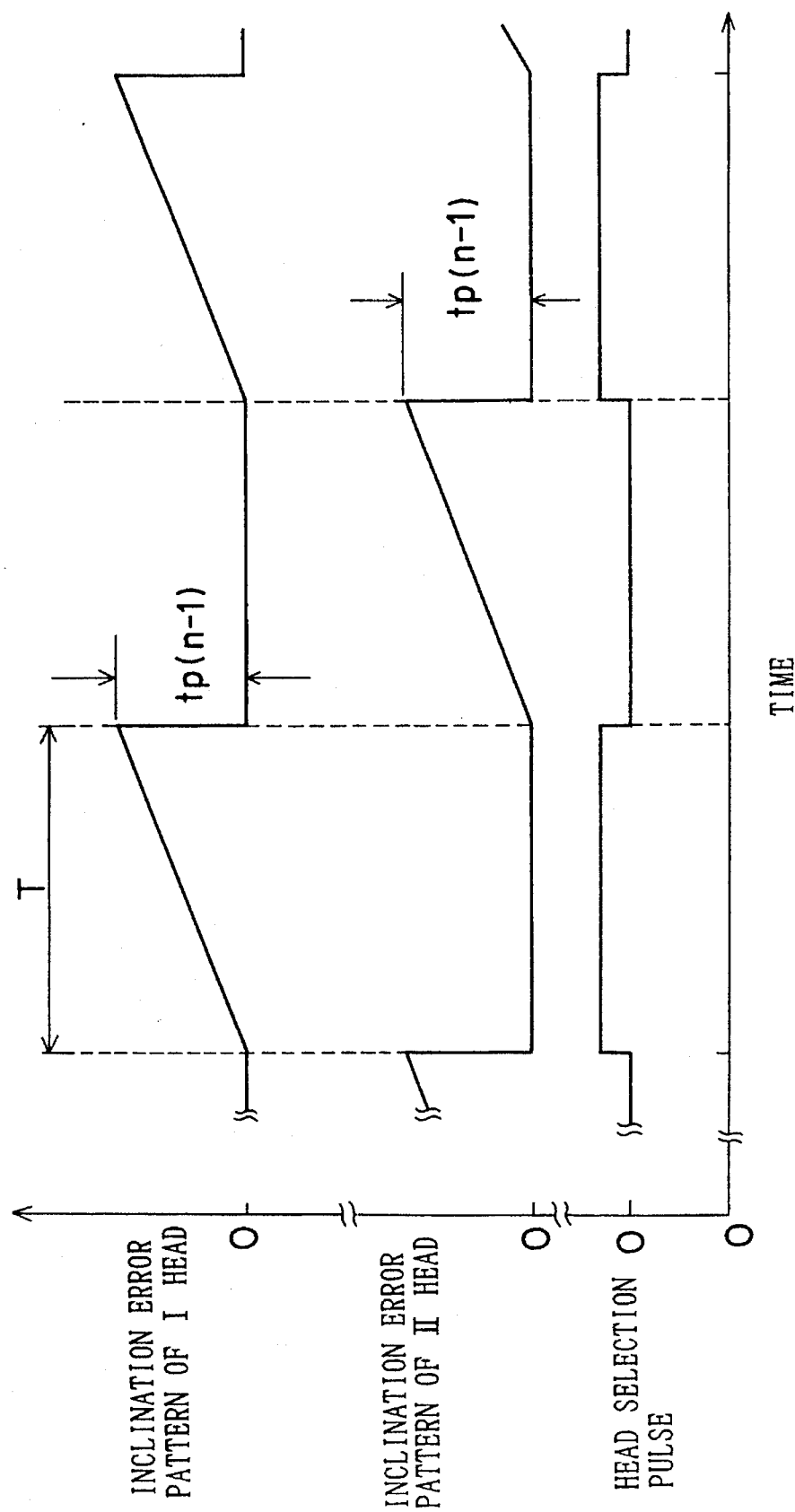
FIG. 54 is an outline diagram showing the inclination error pattern during the n-times speed replay.

The reference position voltages supplied to the adder 23 and subtractor 20 are a fixed voltage such as 0 V and used to define the reference positions of the supply and takeup side tape actuators 11a, 11b since these tape actuators are not spring-supported and hence have no fixed reference positions. This means that an electrical means is used, rather than a mechanical means like a spring support, to perform the position control of the tape tension control arm 77 (FIG. 49).

[Description of Tape Actuator]

Figure 3:
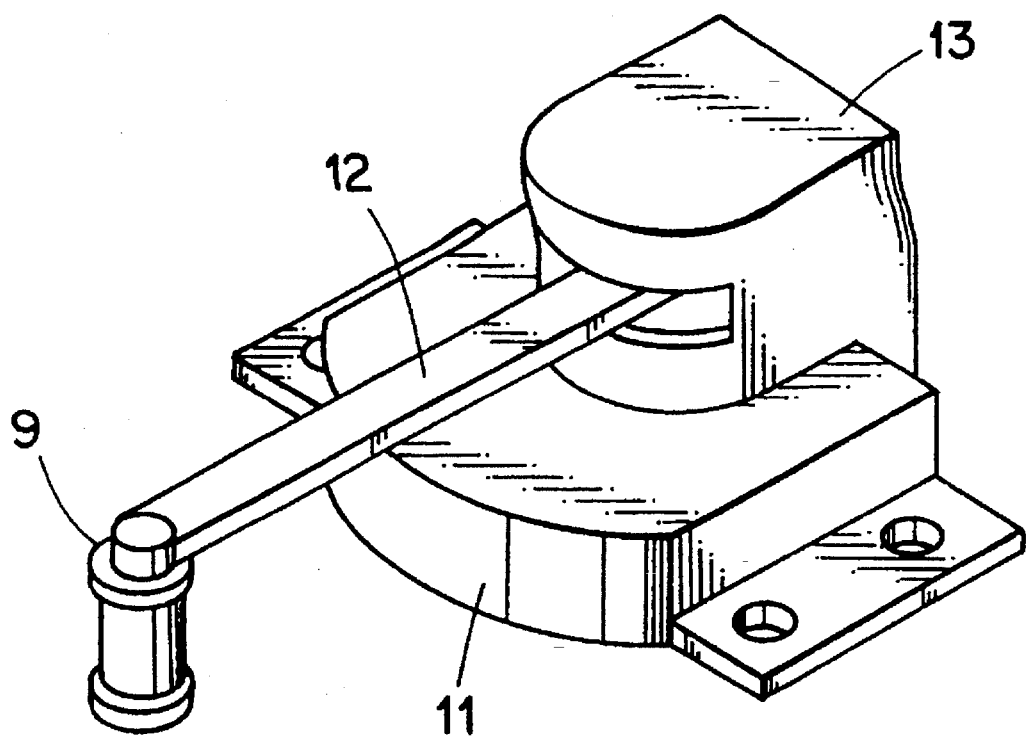
FIG. 3 is a perspective view of the tape actuator used in the embodiment.
Figure 5A:
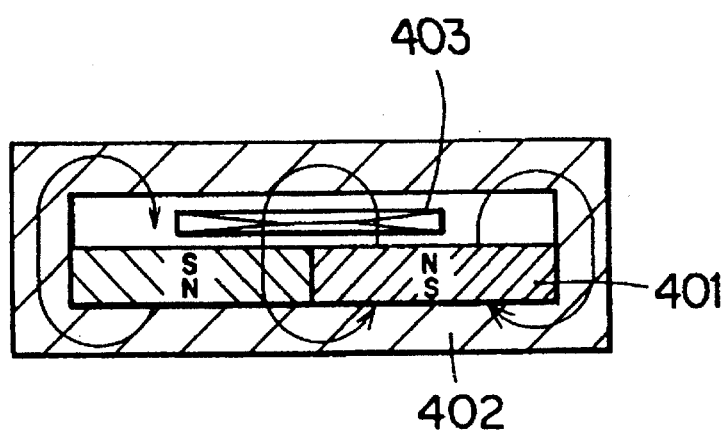
FIGS. 5a and 5b are outline views showing the driving principle of the tape actuator.

FIG. 3 is an outline perspective view of the tape actuator used in the embodiment of the invention. FIG. 4 shows the cross section of FIG. 3. FIG. 5 shows the operating principle of the tape actuator, in which components identical with those of FIG. 2 are given like reference numerals.

This tape actuator is of a voice coil type which has no spring support and is similar in construction to a swing arm actuator or a tracking actuator used in the hard disk drive.

In these figures, reference numeral 11 represents a solenoid-driven tape actuator driving section to rotate the arm 12 attached with the movable tape pin 9. Denoted 401 is a permanent magnet which is magnetized in the direction of extension of the rotating axis and whose magnetization on the right side is reverse to that on the left side. Designated 402 is a yoke made of soft magnetic material and 403 a movable coil that rotates about the rotating axis.

Figure 5B:
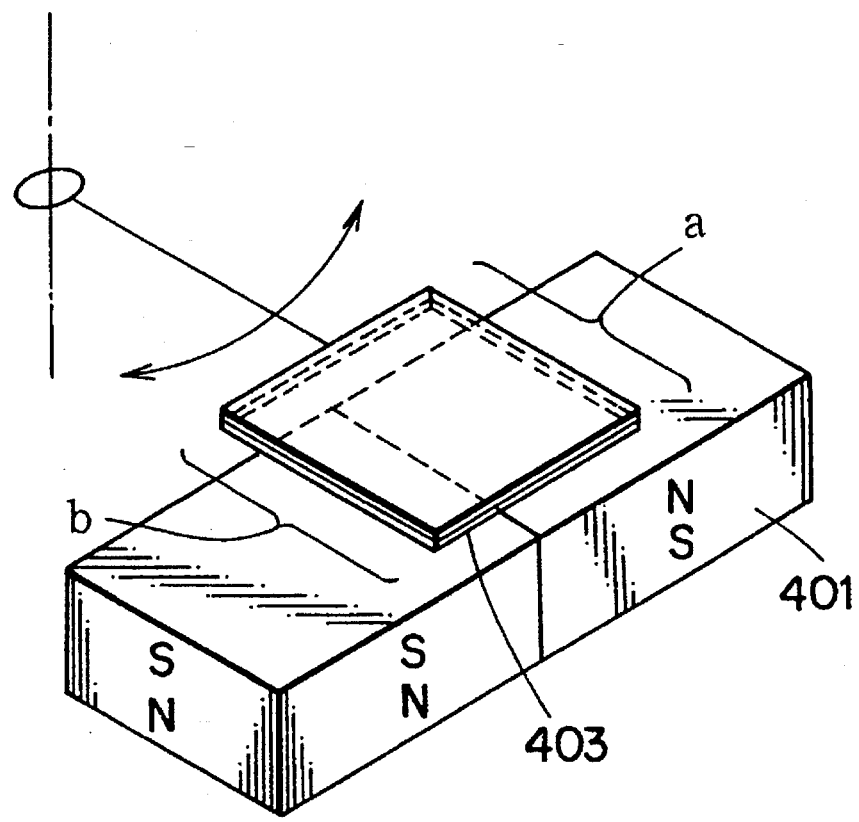

As shown in FIG. 5b, the voice coil type solenoid-driven actuator has a magnetic circuit which is closed by the permanent magnet 401 and the yoke 402, the permanent magnet 401 being magnetically divided in two areas with respect to the rotating plane of the movable coil 403, these areas being magnetized in two opposite directions perpendicular to the rotating plane of the movable coil 403. This arrangement generates a high flux density in a direction perpendicular to the rotating plane of the movable coil 403 arranged parallel to the permanent magnet 401.

When a current is applied to the movable coil 403, a force is produced at the side edge of the movable coil 403 as shown at a, b in FIG. 5b by the Fleming's left-hand rule. This force causes the movable coil 403 to turn about its rotating axis.

The tape actuator of this construction has a "displacement angle/frequency" characteristic as shown in FIG. 6. In the diagram, the ordinate represents gain and phase and the abscissa represents frequency.

As is seen from the figure, this actuator has no mechanical resonance up to high frequency and thus provides good controllability. However, since it has no definite mechanical reference position, it is necessary to supply a signal that defines the reference position, as explained in FIG. 2.

While the above embodiment shows the construction in which the movable pin 9 is driven by the voice coil type solenoid-driven actuator, it is also possible to use a piezoelectric bimorph and other driving means to rotate or linearly move the movable pin 9.

[Description of Actuator Displacement Measuring Means]

Figure 7:
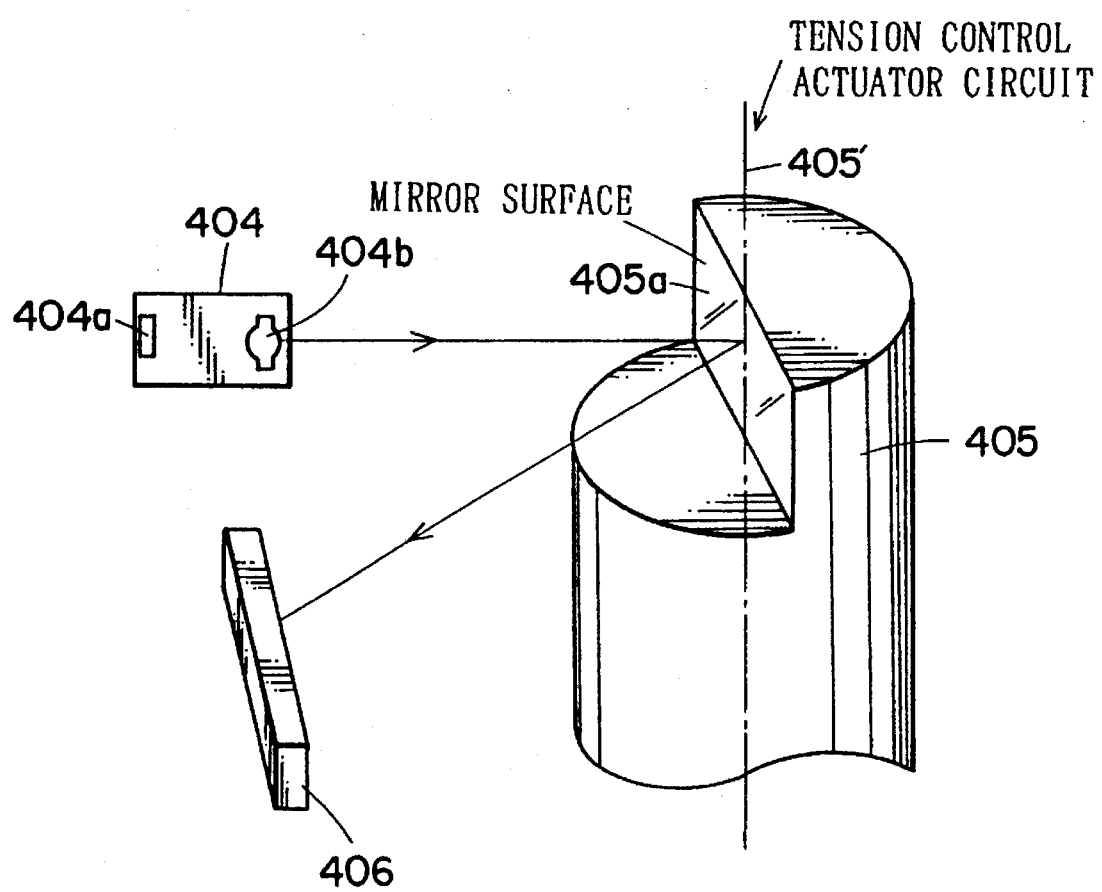
FIG. 7 is a schematic perspective view showing an optical sensor that measures the displacement of the arm of the tape actuator.

FIG. 7 shows an example of an optical sensor that measures the displacement of the arm 12 of the tape actuator 11 to determine the displacement (rotating angle) of the movable tape pin 9.

Designated 404 is a light emitting section, in which light generated by a laser diode 404a is collimated by a collimator lens 404b into a parallel-ray beam whose diameter is then restricted by a throttle. Denoted 405a is a reflecting section with a mirror surface, which is made by cutting the shaft 405 along the plane including the rotating axis 405' of the tape actuator 11; and 406 a light receiving section made up of a linear position sensor that detects the position of the light spot. The rotating axis 405' may be provided as an extension of the shaft 405 of FIG. 4 or as a rotating axis supported by external bearings.

The optical sensor 406 shown in FIG. 7 is expensive though appropriate in cases where the rotating range of the tape actuator 11 is large. Where the rotating range is small, the light source may employ an LED which is less expensive than the laser diode or the linear position sensor may be replaced with a less expensive light receiving element which is divided in two to determine which of the divided two portions the light spot strikes.

Figure 8A:
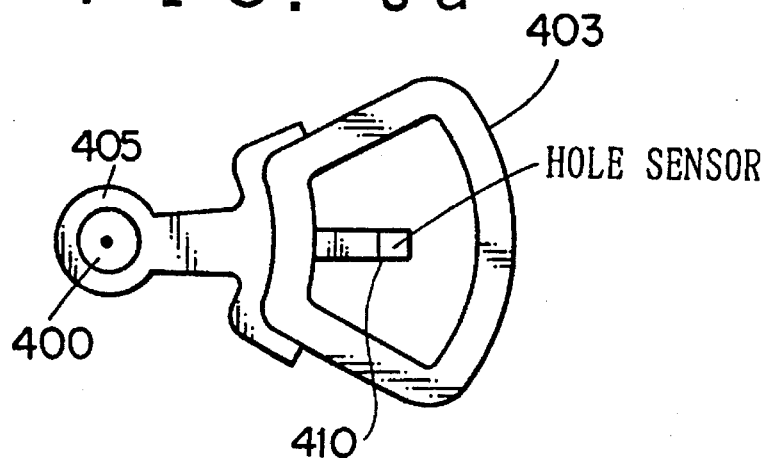
FIGS. 8a and 8b are outline views of a magnetic unit to measure the displacement of the arm of the tape actuator.
Figure 8B:
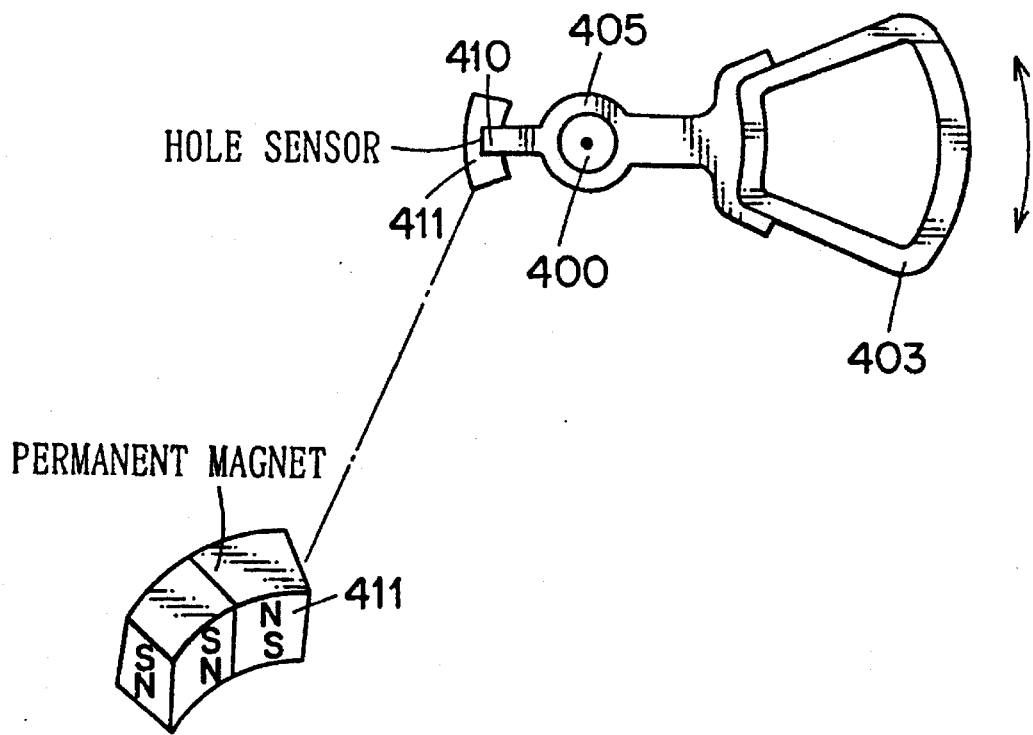

That is, when the rotating range of the tape actuator 11 is small, an inexpensive magnetic means as illustrated in FIGS. 8a and 8b can be used. In this means a hole sensor 410 is provided to the rotating shaft 405 of the movable coil 403 in the voice coil type solenoid-driven actuator of FIGS. 3 to 5 so that it rotates with the shaft. A permanent magnet 411 with two oppositely magnetized regions is mounted to the base plate so that it faces the sensor 410. According to the output of the hole sensor 410 the rotating position of the tape actuator 11 can be detected.

[Description of DTF Control System in the First Embodiment]

Returning to FIG. 2, we will explain about the DTF control system of the invention.

In this embodiment, since the rotary type tape actuators mentioned above are used, the paths through which the supply and takeup side movable tape pins 9a, 9b are driven by the tape actuators 11a, 11b are arcs rather than linear. This requires the DTF control system to absorb the non-linear errors for performing high-precision tracking.

Hence, it is necessary to use a feedback control system that has a higher precision, a wider frequency band and a wider dynamic range than does the conventional DTF control. An open-loop control will theoretically produce non-linear errors and thus a feedback control must be performed.

With this embodiment, therefore, the DTF control according to the low-frequency component of the tracking error signal is mainly performed by the takeup side tape actuator 11b which has a wide movable range and a higher gain in the low-frequency region.

The DTF control according to the high-frequency component of the tracking error signal—which is produced by the non-linearity of the moving path of the movable tape pin 9b—is carried out by the head actuator 14 that drives the magnetic head in a direction perpendicular to the recording track on the magnetic tape.

In this way, the DTF control is performed in a two-step operation by the takeup side tape actuator and the head actuator and the dc component is dealt with by the capstan motor 6 or reel motor 5. This realizes a stable, highly precise DTF control having a wide operation range.

Figure 9:
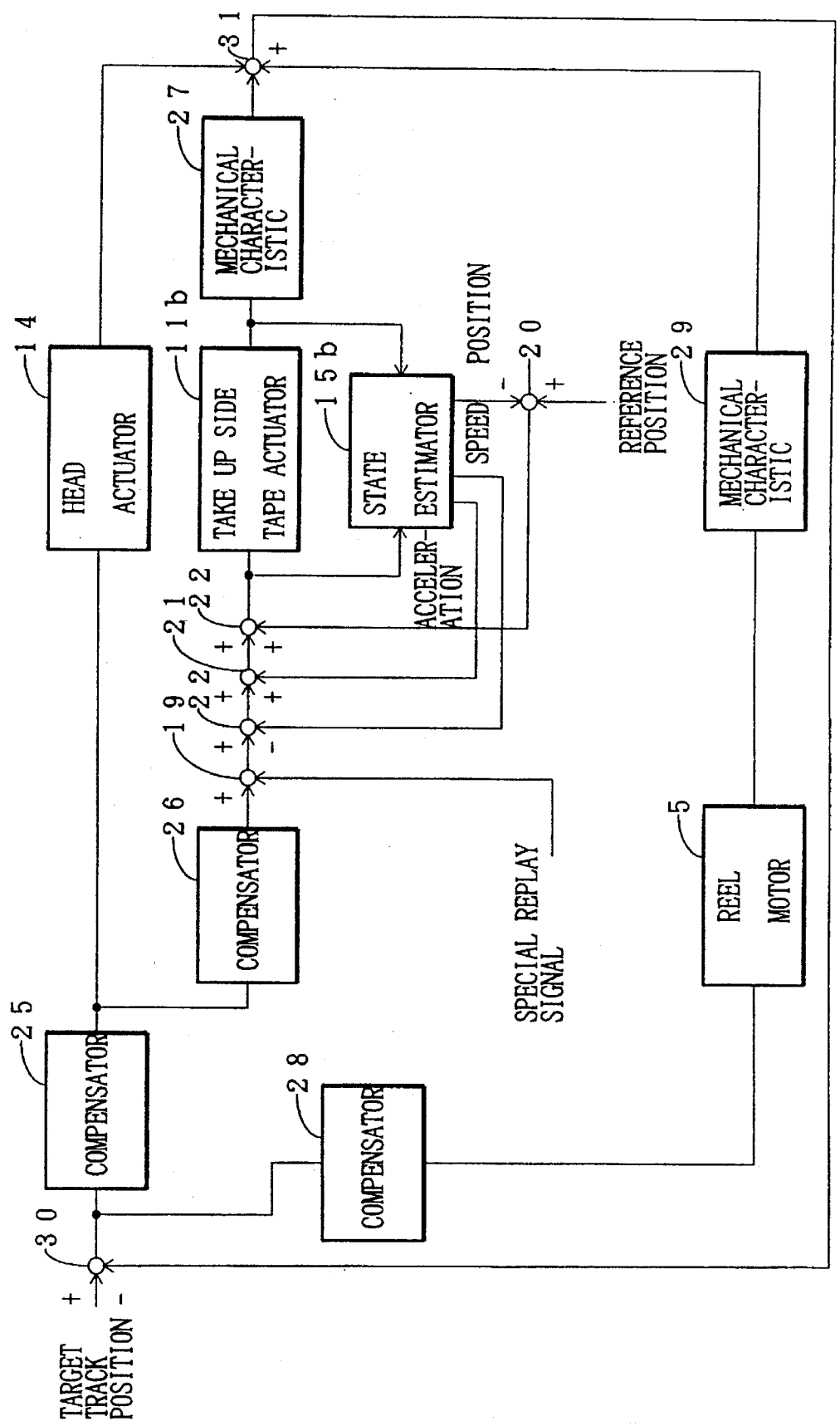
FIG. 9 is a schematic diagram of a tracking control system in the first embodiment shown according to the flow of physical quantities.
Figure 10:
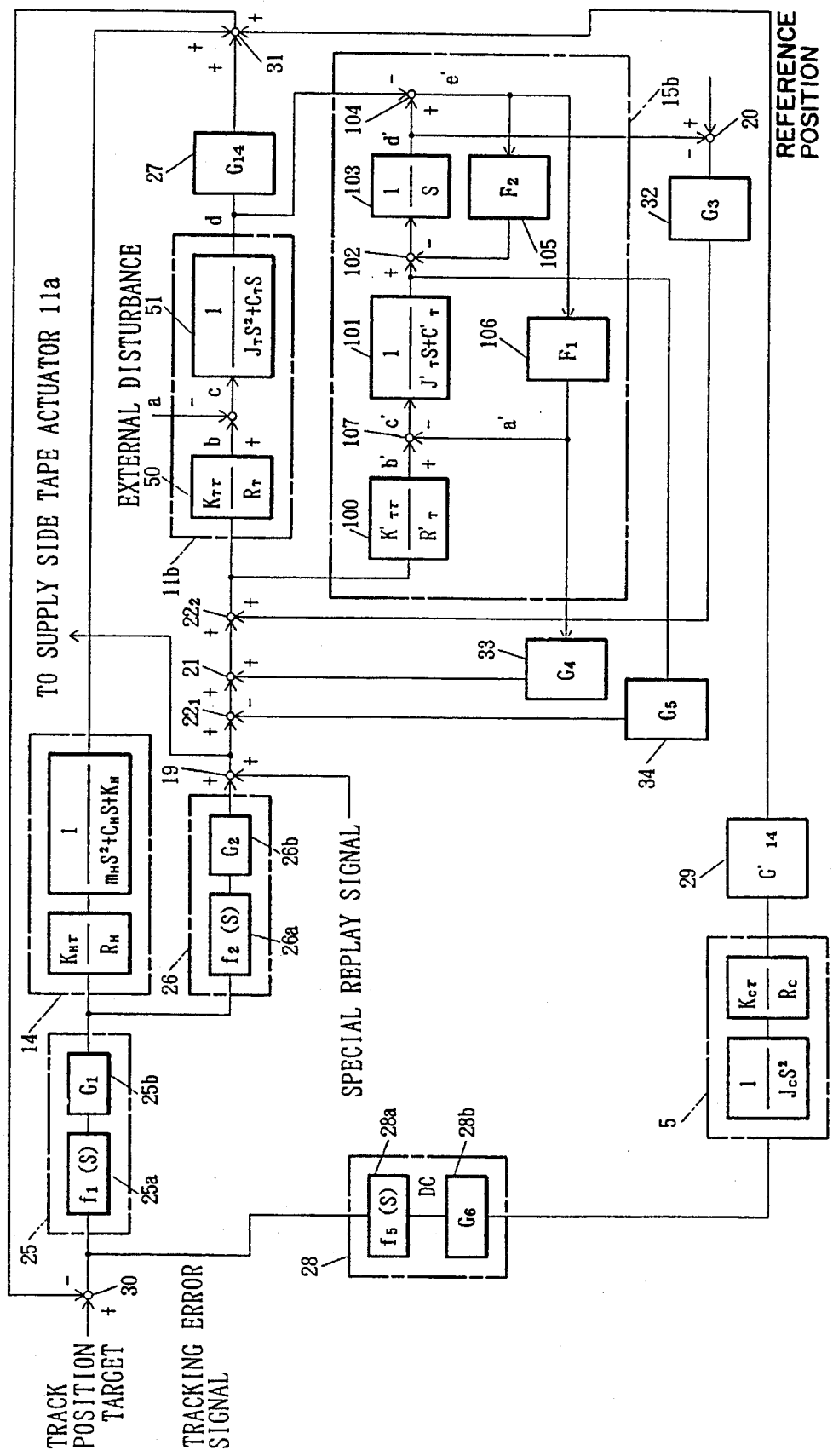
FIG. 10 is a block diagram representing the tracking control system of the first embodiment in terms of transfer functions of control logic.

FIG. 9 is a block diagram showing the flow of physical quantities in the tracking control system of the embodiment of FIG. 2. FIG. 10 represents the block diagram of FIG. 9 in terms of transfer functions of control logic. Referring to these figures, we will explain about the operation of the DTF control system of the invention.

In FIGS. 9 and 10 elements corresponding to those in FIG. 2 are assigned like reference numerals. Symbol S in FIG. 10 represents a Laplacean.

An element 25 is a compensator to make the head actuator 14 perform a stable tracking control. A band-pass filter 25a in the compensator 25 (FIG. 10) cuts the dc component of the tracking error signal and in the high-frequency range represents a first-order integration characteristic. An amplifier 25b, another component of the compensator 25, determines the control band of the tracking control system.

An element 26 is a compensator to make the takeup side tape actuator 11b perform a stable tracking in cooperation with the head actuator 14. A function 26a (FIG. 10), a part of the transfer function of the compensator 26, represents a transfer function of the secondary filter that electrically simulates the "displacement/voltage" frequency characteristic of the head actuator 14. Denoted 26b is a transfer function representing a gain of the amplifier.

An element 28 is a compensator made up of a secondary low-pass filter. Denoted 28a (FIG. 10) is a transfer function representing the characteristic of the low-pass filter that passes only the low-frequency component of the tracking error. Denoted 28b is a transfer function representing a gain.

These compensators 25, 26, 28 are contained in the DTF circuit 16 of FIG. 2.

An element 27 indicates a mechanical characteristic representing the displacement ratio between the longitudinal displacement of the magnetic tape and the displacement of the widthwise direction of the recording track. An element 29 is a mechanical characteristic representing the displacement ratio between the rotating angle of the reel motor 5 and the displacement in the widthwise direction of the recording track.

The element 29 is a transfer function representing the ratio between the rotating angle of the reel motor 5 (or displacement angle of the takeup side tape actuator 11b) and the magnetic tape displacement in the widthwise direction of the recording track.

The element shown as the head actuator 14 in FIG. 9 is a "drive voltage-displacement" characteristic of the head actuator 14. In FIG. 10, this is represented by a transfer function, where $K_H\tau$ is a torque constant, $R_H$ is a coil resistance, $m_H$ is a movable portion mass, $C_H$ is a viscosity coefficient, and $R_H$ is a modulus of elasticity.

An element 11b in FIG. 9 indicates a displacement angle (displacement/drive voltage) characteristic of the takeup side tape actuator 11b—which includes arm 12b and movable tape pin 9b (FIG. 2)—when actually applied with a drive voltage. In FIG. 10, this characteristic is represented by transfer functions. Denoted 50 is a transfer function indicating the "torque/voltage" characteristic of the tape actuator; and 51 a transfer function representing the "displacement angle/torque" characteristic of the tape actuator where $K_T\tau$ is a torque constant, $R_T$ is a coil resistance, $J_T$ is an inertia of the rotating portion, and $C_T$ is a viscosity coefficient of the rotating portion.

A subtractor 20 compares the estimated position from the state estimator 15b with the reference position of the takeup side tape actuator 11b to produce a position error signal. This comparison is taken for the following reason. Since the takeup side tape actuator 11b is not spring-supported, the application of the dc component to the capstan 6 and reel motor 5 of FIG. 2 will leave the actuator position during the DTF operation undecided. Hence the position control system is formed to compare the reference position and the actual position of the takeup side tape actuator 11b, thereby electrically fixing the position of the actuator.

An element 15b is a state estimator constructed of an equal-dimension observer of modern control logic that electrically simulates the frequency characteristic and dynamic characteristic of the "displacement angle/drive voltage" of the takeup side tape actuator 11b. This will be detailed later.

In FIG. 10, an element 32 is a transfer function representing a loop gain of the position control system for the takeup side tape actuator 11b. An element 33 is a transfer function representing a loop gain that forwardly feeds the estimated acceleration from the state estimator 15b. An element 34 is a transfer function representing a loop gain that feeds back the estimated speed from the state estimator 15*b*. Adder/subtractors 19, 21, 22$_1$, 22$_2$ are transfer functions representing addition and subtraction.

An element 5 is a transfer function showing the characteristic of displacement angle with respect to the input voltage for the reel motor 5 or capstan motor 6. In the transfer function, K$_C$τ is a torque constant, R$_C$ is a coil resistance, and J$_C$ is an inertial of the rotating portion.

An adder 31 determines the actuator position in the longitudinal direction of the magnetic tape according to the signals from the head actuator 14, takeup side tape actuator 11*b* and reel motor 5 (or capstan motor 6).

A subtractor 30 shows conceptually the subtracting operation to take a difference between the target track position corresponding to the track position on the magnetic tape to be traced and the tracking position fed from the adder 31. The output of the subtractor 30 can be used as a tracking error signal.

In a two-step coupling system where the DTF control based on the low-frequency component of the tracking error signal is carried out by the takeup side tape actuator 11*b* and the DTF control based on the high-frequency component, produced by the non-linearity of the path of the movable tape pin 9*b*, is performed by the head actuator 14, it is desired that the coupling frequency—a frequency where the gains of the control loops for the takeup side tape actuator 11*b* and head actuator 14 are equal—be set close to the cycle frequency F$_S$ of, for example, 7.5 Hz.

This method is based on the following fact. During the high-speed special replay such as a 5-times-the-normal-speed replay that requires a wide tracking operation range, the fundamental frequency of the tracking error signal containing the non-linear error is the cycle frequency F$_S$, i.e., the drive pattern signal of the tape actuator 11. Hence, it is rational to control the tape actuator itself in correcting the large-amplitude error whose frequency is less than the cycle frequency.

When the coupling frequency is set close to the cycle frequency F$_S$, it is possible to form a two-step coupling system in which the high-frequency component of the tracking error signal is given mainly to the head actuator 14 which has a good follow-up capability for high-frequency signal and in which the low-frequency component is given mainly to the tape actuator 11 which has a large low-frequency torque and a good low-frequency follow-up capability.

In such a two-step coupling system, the two actuators—tape actuator and head actuator—simultaneously follow the one control target and the control capability for following the target is divided in two frequency bands. If at the coupling frequency the two actuator control systems are 180 degrees apart in phase relationship, the overall gain will become −∞ dB (anti-resonance). To avoid this problem, this embodiment employs the state estimator 15*b*, formed by the equal-dimension observer of modern control logic, to estimate the speed of the actuator 11 and feeds it back through a high gain 34, thereby transforming the low-frequency characteristic of the "displacement/voltage" frequency characteristic into a stable first-order form to stabilize the whole system.

In addition, to minimize position variations due to external disturbance or tension torque applied to the takeup side tape actuator 11*b*, the estimated external disturbance torque calculated by the state estimator 15*b* is fed forward in order to assure stable operation at all times regardless of the tape tension.

[Description of the State Estimator]

Now, the state estimator 15*b*, one of the features of the invention, is described by referring to FIG. 10.

The state estimator 15*b* simulates the transfer function and dynamic characteristic of the takeup side tape actuator 11*b* as an equivalent electric circuit. It can estimate the acceleration, velocity, position and external disturbance of the takeup side tape actuator 11*b* with high precision and in wide frequency range.

The state estimator 15*a* (FIG. 2) to control the supply side tape actuator 11*a* for the tension control described later also has a construction similar to that of the state estimator 15*b*.

In FIG. 10, denoted 100 is a transfer function that electrically simulates the transfer function 50 which represents the actual "torque/drive voltage" of the takeup side tape actuator 11*b*. Designated 101 is a transfer function that electrically simulates the transfer function 51—which represents the actual "torque/drive voltage" characteristic of the takeup side tape actuator 11*b*—through the equivalent conversion of control logic and in cooperation with the transfer function 103.

Elements 105, 106 are feedback gain transfer functions of the observer that converge to zero the difference between the reference position signal from the position sensor 13*b* (FIG. 2) corresponding to the output d of the takeup side tape actuator 11*b* and the output of the transfer functions 100, 101, 103, in order that the dynamic characteristic produced by the transfer functions 100, 101, 103, which electrically simulate the characteristic of the tape actuator 11*b*, will match the actual characteristic of the tape actuator 11*b*. Denoted 102, 104, 107 are subtractors.

The operating principle of the state estimator is explained below. The transfer functions of each element in the state estimator 15*b* have the values as shown in FIG. 10. When the drive voltage actually applied to the takeup side tape actuator 11*b* is input to the element 100 that simulates the coil resistance R and force constant K, it produces an output b' representing the estimated drive force b of the takeup side tape actuator 11*b*.

The values of the elements 101, 103 are combined as follows.

$$(1/J'S)\cdot(1/S)=1/(J'S^2) \tag{3}$$

The transfer functions 101, 103 electrically simulate the mechanical characteristic transfer function 51 of the takeup side tape actuator 11*b*. Supplying the output b' of the transfer function 100 to the element 101 will produce an output d' of the element 103 that represents the estimated rotating angle d of the takeup side tape actuator 11*b*.

However, the transfer functions 101, 103 have their own internal integrators, so that even when they provide the same characteristic as that of the transfer function 51 of the takeup side tape actuator 11*b* in terms of frequency characteristic, their dynamic characteristic will not be equal to that of the transfer function 51 because of the difference in the initial values of the integrators.

In this embodiment, therefore, the difference e between the actual displacement d of the takeup side tape actuator 11*b* detected by the position sensor not shown and the estimated value d' given by the state estimator 15*b* is fed back through the gain F$_1$ and F$_2$ so that not only the frequency characteristic but the dynamic characteristic will match the rotation of the real tape actuator.

The configuration of the state estimator 15*b* mentioned above is well known as the configuration of the equal-dimension observer of the modern control logic. In this embodiment, the reason that the two feedback loops including gains F$_1$, F$_2$ are connected to the front of the transfer functions 101, 103 including integrators (1/S in Laplace transform) in the state estimator 15b, an electrical model of the takeup side tape actuator 11b, is to allow the convergence of the observer to be determined freely.

Generally, the equal-dimension observer that receives the drive voltage and displacement of an object to be controlled is used to produce an estimated speed of the object. With the dynamic characteristic and the static characteristic (frequency characteristic) set equal to those of the controlled object, if the observer feedback gains $F_1$, $F_2$ are increased to make the observer pole sufficiently large (a negative real number increases) compared with the pole of the controlled object, the observer can estimate the tension. Since the dynamic characteristic of the observer agrees with that of the controlled object, the following relationship holds between the estimated displacement d' and the actual displacement d.

$$d' \approx d \quad (4)$$

Since the transfer function and its model 100 do not contain an integrator, the following relationship holds between the estimated drive force b' and the actual drive force b.

$$b' \approx b \quad (5)$$

Since the dynamic characteristics of the controlled object and the observer model agree, not only their displacements but also their velocities and accelerations coincide.

It follows therefore that the forces acting on the arm of the tape actuator 11 which are the accelerations multiplied by $J_T$ have the relationship shown below.

$$c' \approx c \quad (6)$$

In the tape actuator 11b, since there is a relationship

"drive force $b$"+"tension-produced torque $a$"="torque $c$ applied to the tape actuator mechanism" (7)

From equations (4) to (7), $$b'+a=c'$$

In other words, $$b'-c'=a' \quad (8)$$

Namely, $$a'=a \quad (9)$$

This means that the signal path a' in the observer represents the external disturbance torque due to tension and, by picking up this signal, it is possible to detect the external disturbance torque.

As mentioned above, the use of the state estimator 15 permits detection of the position, velocity, acceleration, and external disturbance of the tape actuator 11 with high precision and in wide frequency range.

[Description of Operation of DTF Control in the First Embodiment]

Next, the operation of the DTF control system in the first embodiment that forms the above-mentioned state estimator will be explained by referring to FIG. 10.

The tracking error signal output from the subtractor 30 shown at the upper left in FIG. 10 can be obtained from the envelope of the signal reproduced by the magnetic head, by means of the aforementioned known method such as a pilot method.

This tracking error signal is supplied to the compensator 28 where it passes through the low-pass filter 28a with cut-off frequency of several Hz and is then amplified by the amplifier 28b, which has the gain set equal to a gain of the third control loop at the frequency of several Hz. Then, the amplified tracking error signal is fed to a drive amplifier not shown to drive the reel motor 5 or capstan motor 6 according to the speed of the tape. The tracking error signal is further fed to the mechanical characteristic 29, which is determined by the reel diameter and track inclination angle, to move the magnetic tape in the longitudinal direction thereby compensating for the low-frequency error containing the dc component of the tracking error.

The first control loop works to eliminate the tracking error according to the tracking error signal. This control loop forms a closed loop.

The tracking error signal is also supplied to the compensator 25 where it is phase-compensated by the band-pass filter 25a made up of first-order high-pass filter and low-pass filter, whose center frequency is several tenths of Hz, and then is amplified by the amplifier 25b to a specified gain. The amplified tracking error signal is further supplied to a drive amplifier not shown to drive the head actuator 14 to move the magnetic head H in the track width direction. Hence, the second control loop also forms a closed loop as in the case of the first control loop.

In order that the second control loop and the third control loop stably couple together, the output of the amplifier 25b in the compensator 25 is fed to a compensator 26a, which is formed of a phase advance filter that places all the poles of the control system on the left side surface. The signal is amplified by an amplifier 26b so that the gain of the third loop is equal to that of the second loop at a certain frequency. The amplified signal is further fed through a special replay signal adder 19, a speed damping signal subtractor 22 and an external disturbance elimination signal adder 21 to a drive amplifier not shown to drive the takeup side tape actuator 11b to move, via the mechanical characteristic 27, the magnetic tape T in the longitudinal direction, thus compensating for the tracking error.

Therefore, this third control loop is also closed as with the first and second control loops.

Figure 11:
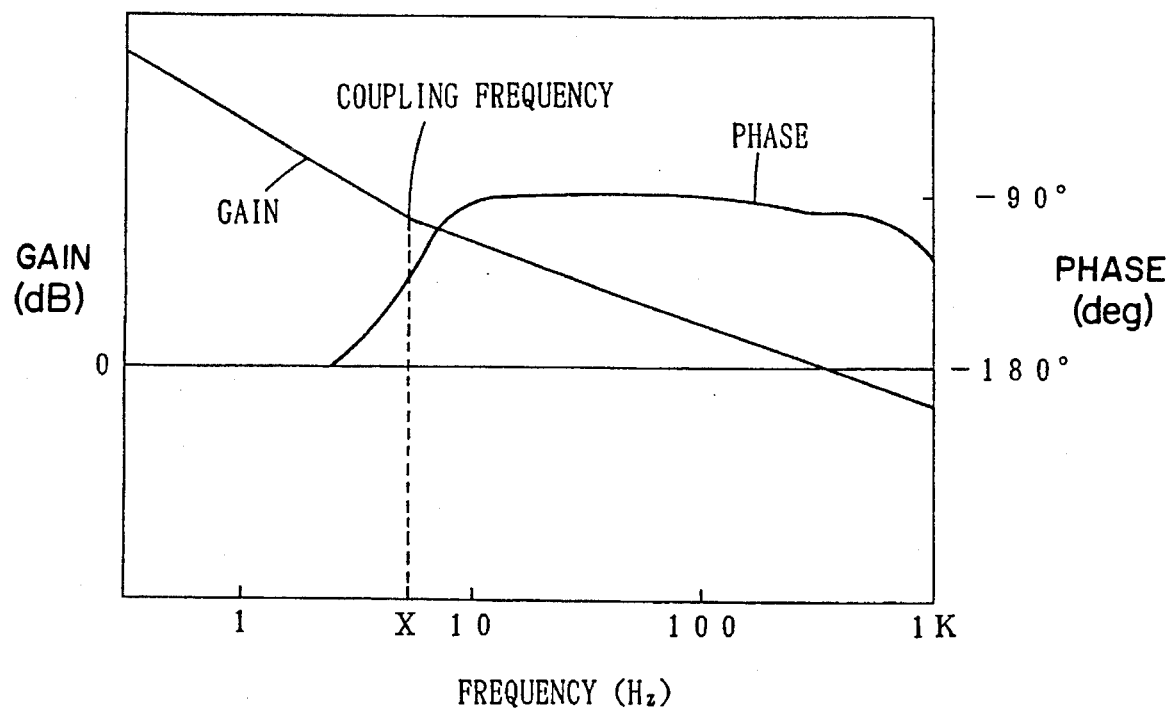
FIG. 11 is a graph showing the open loop characteristic of the DTF control system of the first embodiment.

This embodiment realizes a DTF control having a high precision and wide frequency and dynamic ranges by using three electrically coupled DTF control loops. The open loop characteristic is shown in FIG. 11.

[Description of Tension Control System in the First Embodiment]

However, since in this embodiment the low-frequency component of the tracking error signal is fed back to the takeup side tape actuator 11b to dynamically move the magnetic tape in its longitudinal direction, the tension of the magnetic tape theoretically varies.

In the embodiment therefore, as shown in FIG. 2, the drive voltage for the takeup side tape actuator 11b is added to the reference position signal of the position control loop to differentially operate the two tape actuators 11a, 11b in any operation mode, such as normal replay mode and high-speed special replay mode, to prevent tension variations at the rotary head.

If these two tape actuators 11 have exactly the same electro-mechanical characteristics and the tape path mechanical resistances, the application of equal voltages to the tape actuators 11a, 11b will completely suppress the tension variations. However, in reality there are variations in the electrical and mechanical characteristics and it is therefore impossible to operate the two tape actuators in exactly the same manner even by applying equal voltages to them.

Since the addition of the drive voltage of the takeup side tape actuator 11b to the reference position signal of the position control loop cannot totally eliminate the tension variations, this embodiment employs a closed loop tension control which compensates for tension variations and thereby maintains an optimum tension during any operation mode.

Figure 12:
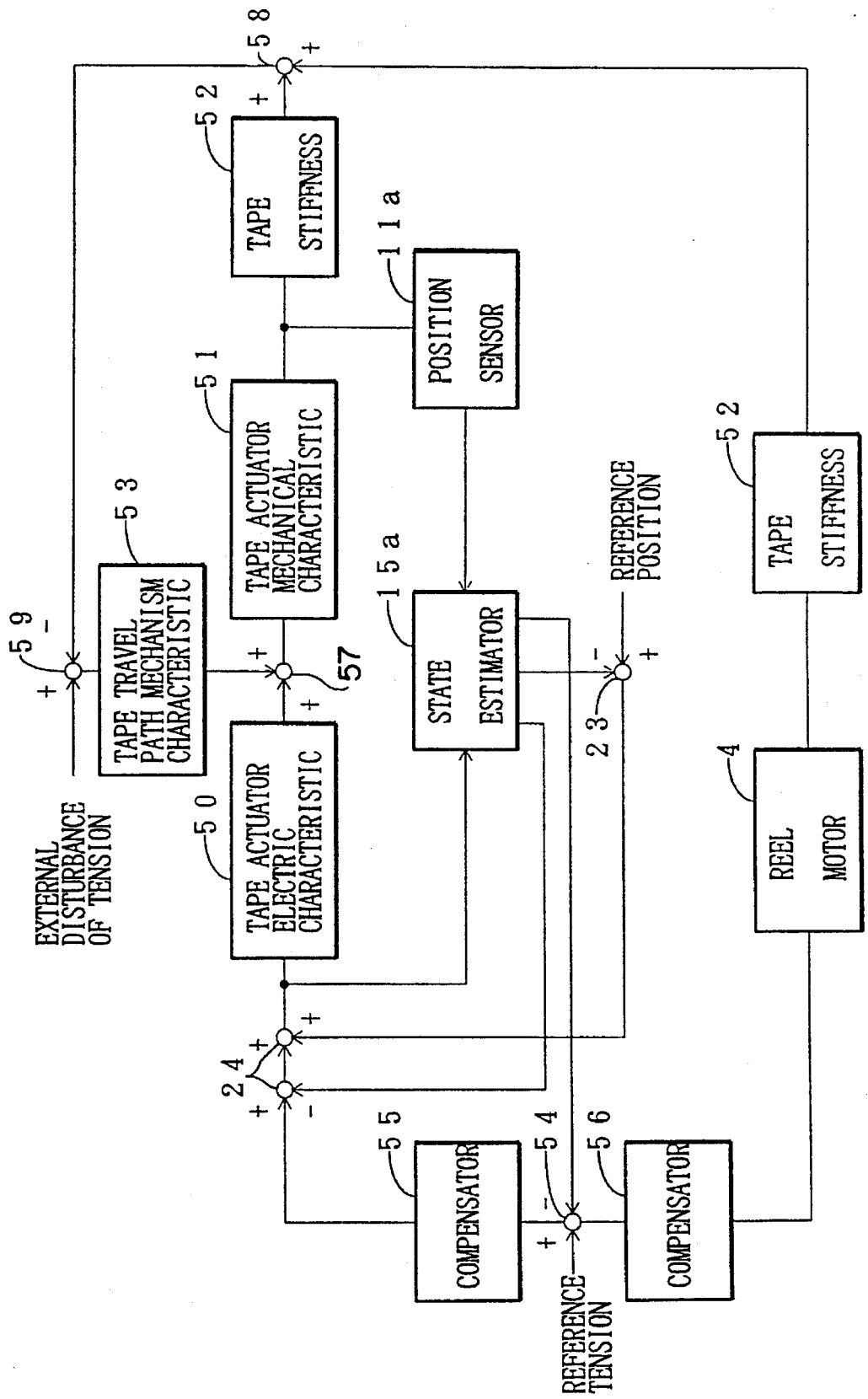
FIG. 12 is a block diagram of the tension control system of the first embodiment shown according to the flow of physical quantities.
Figure 13:
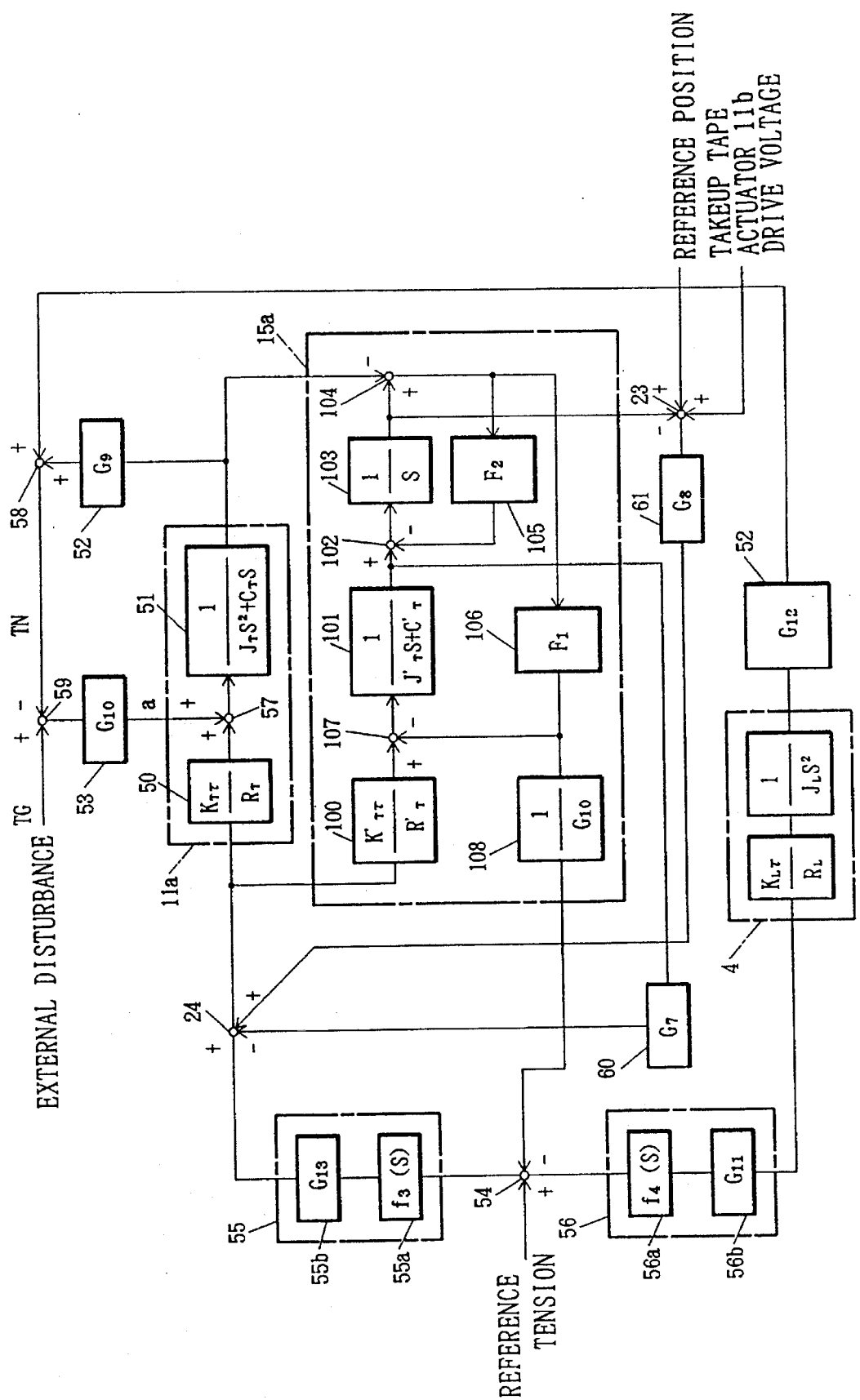
FIG. 13 is a block diagram representing the tension control system of the first embodiment in terms of the transfer function of control logic.

FIG. 12 is a block diagram of the tension control system mentioned above. FIG. 13 represents the tension control system in terms of transfer functions of control logic. Elements in FIGS. 12 and 13 that are identical with those of FIG. 2 are assigned like reference numerals. S in FIG. 13 represents a Laplacean.

In FIG. 12, an element 50 represents an electric characteristic or "generated torque/input voltage" frequency characteristic of the supply side tape actuator 11. An element 51 is a mechanical characteristic or "displacement angle/supply torque" characteristic of the supply side tape actuator 11a. This is the same characteristic as that of the takeup side tape actuator 11b.

Elements 52 indicate a tape stiffness or "stress/strain" characteristic of the tape in the longitudinal direction. An element 53 is a tape path mechanical characteristic, which is determined by the geometrical positional relationship between the stationary tape pin 10a and the supply side movable tape pin 9a, the balance of force between the magnetic tape T and the supply side movable tape pin 9a, and the geometrical positional relationship between the movable tape pin 9a and the rotating shaft of the supply side tape actuator 11a.

An element 15a is a state estimator which electrically estimates the acceleration and speed of the tape from the drive voltage or drive current for the supply side tape actuator 11a and the detected displacement given by the position sensor 13a. Elements 55, 56 are compensators which feed back to the supply side tape actuator 11a and the supply reel motor 4 a difference between the estimated tension from the tension estimator 15a and the reference tension, i.e., an external disturbance-induced tension, in order to stabilize the loop. A tape stiffness 52 indicates the tape stiffness that represents tape tension variation characteristic caused by changes in the rotating angle of the reel motor 4. A subtractor 54 takes a difference between the estimated tension from the state estimator 15a and the reference tension.

Adders 57, 58 and a subtractor 59 represent a balance of physical forces or torque. An adder/subtractor 24 adds and subtracts the estimated speed given by the state estimator 15a and the position error to and from the acceleration control loop.

The magnetic tape tension change detected based on the rotating angle change of the supply side tape actuator 11a is added to the tension change due to the reel motor rotating angle change. This sum of tension changes is added with the tension disturbance (such as dynamic frictions on the tape receiving shaft and head cylinder, tape friction coefficient variations, external disturbing force in the tape longitudinal direction, etc.) to produce a total sum of the tensions in the magnetic tape path, which is used to control the supply side tape actuator 11a.

In FIG. 13 which represents the tension control system with the transfer functions of control logic, a signal TG indicates a external tension disturbance and an element 11a is a transfer function representing the actual "displacement angle/input voltage" characteristic of the supply side tape actuator 11a, which is the same as that of the takeup side tape actuator 11b of FIG. 10.

An element 52 is a transfer function indicating the transfer characteristic of the tape tension variations in relation to the rotating angle change of the supply side tape actuator 11a. An element 53 is a transfer function showing the transfer characteristic of the torque that the tape tension applies to the supply side tape actuator 11a.

An element 15a is a state estimator having the same configuration as the state estimator 15b described in connection with the DTF control system of FIG. 10. This state estimator estimates the position, velocity, acceleration, and external torque of the tape actuator 11a. An element 108 is a transfer function that represents an inverted characteristic of the transfer function 53, the transfer function 53 expressing the transfer characteristic of the torque that the tape tension imparts to the supply side tape actuator 11a.

An element 55a is a transfer function of a band-pass filter, which is a part of the compensator 55, to feed back to the supply side tape actuator 11a a relatively high frequency component in the control band in the tension control system. An element 55b is an amplifier gain transfer function that determines the loop gain of the feedback loop for the supply side tape actuator 11a.

An element 56a is a secondary low-pass filter transfer function, a part of the compensator circuit 56, to feed back to the supply reel motor 4 a relatively low frequency component in the control band in the tension control system. An element 56b is an amplifier gain transfer function that determines the loop gain of the feedback loop for the reel motor 4.

An element 4 is a transfer function including the coil resistance $R_L$, torque constant $K_L\tau$ and rotating portion inertia $J_L$ of the reel motor 4.

An adder/subtractor 23 is a computation element that compares the estimated position signal from the state estimator 15a and the reference position signal and also adds the drive voltage of the takeup side tape actuator 11b. An element 61 is a loop gain transfer function that feeds back the position error signal from the computation element 23. An element 60 is a gain transfer function of the loop that feeds back the estimated speed from the state estimator 15a. An adder/subtractor 24 is a computation element that adds and subtracts the position control loop signal and the speed control loop signal to and from the tension control loop.

In the conventional tension control system of FIG. 49, when the force of the spring 78 and the magnetic tape tension balance each other, stopping the tension control arm 77, the displacement of the arm 77 is taken to correspond to the tension and fed back as the tape tension signal to the reel motor 4.

However, the displacement of the spring-supported tension control arm 77 is proportional to the tension only when the tension variation frequency of the arm 77 is lower than the spring resonance frequency. When the tension variation frequency exceeds the spring resonance frequency, the tension variation applied to the tension control arm 77 deviates in phase from the position variation of the arm 77. In reality, at the spring resonance frequency, the phase deviates 90 degrees. At higher frequencies the phase shift amounts to 180 degrees.

For this reason, the conventional tension control has the control frequency band limited by the phase of the spring-supported system including the tension control arm 77. This means that the tension that can be detected by the tension control arm 77 is less than the spring resonance frequency of the spring-supported system including the tension control arm 77.

A means to raise the spring resonance frequency may include reducing the weight of the tension control arm or increasing the spring constant. However, reducing the weight of the tension control arm has its limitation and the increasing of the spring constant makes the tension control arm 12 more dull in responding to the tension variation, deteriorating the detection accuracy.

Under these circumstances, this embodiment employs an actuator that has no spring support as explained in FIGS. 3 to 5. The subtractor 23 shown at the upper left in FIG. 2 and the subtractor 20 at the right are given voltages that determine the reference positions of the supply and takeup side tape actuators 11a, 11b, thereby performing an electric position control, rather than mechanical control, of the tape tension control arm 77. In other words, the actuator is electrically spring-supported.

This construction permits a wide range detection of tension irrespective of the position control range.

The external disturbance torque signal from the state estimator 15a is the tape tension applied to the supply side tape pin 9a coupled to the supply side tape actuator 11a and thus can be treated as the tension signal.

The frequency range in which the state estimator 15a can estimate the tension is expressed as the following function that depends on two feedback gains $F_1$, $F_2$ when the observer matches the model.

$$aa' = F_1/(J_T S^2 + F_2 J_T S + F_1) \cdot aa \quad (10)$$

By selecting the gains $F_1$, $F_2$ at sufficiently high values the frequency range can be made higher than 1 kHz.

The tension aa' estimated as described above is compared by the comparator 54 with the reference tension TN, which is the optimum value of the tension, to produce a tension error signal TG.

The tension error signal TG is phase-compensated by a compensator 55a, which consists of a first-order band-pass filter with the cut-off frequency of several Hz, sufficiently lower than the control frequency band. The tension error signal is then amplified by an amplifier 55b with a certain gain and supplied through the tape actuator position control signal adder and the speed damping signal subtractor 24 to a drive amplifier not shown to drive the supply side tape actuator 11a.

In this way, the first control loop that uses the tension as a reference value is closed.

At the same time, the tension error signal TG is also fed to a compensator 56a made up of a second-order low-pass filter where it is amplified by an amplifier 56b so that it is stably coupled to the first control loop at several Hz. The tension error signal is further fed to a drive amplifier not shown to drive the reel motor 4 to keep the tension constant. In this way, the second control loop is also closed.

The frequency range is divided as described above because the supply side tape actuator 11a generally has a small mechanical time constant when compared with the reel motor 4 and is thus suited for a control in a high frequency range while at the same time it has a limited control amount and is not suited for a control of large tension variations near dc.

In this embodiment, for the purpose of transforming the characteristic of the supply side tape actuator 11a from the second-order form into a stable first-order form, the estimated speed from the state estimator 15a is amplified by an amplifier 60 and fed back with high gain to the supply side tape actuator 11a, as previously explained in connection with the DTF control. The gain of the amplifier 60 is so set that the frequency band in which the characteristic is transformed into the stable first-order form is approximately equal to or higher than the tension control range.

To fix the position of the supply side tape actuator 11a, the position signal from the state estimator 15a or the position signal from the position sensor 13a is compared with the reference position signal by the subtractor 23 to produce a position error signal, which is then amplified by an amplifier 61 with a gain $G_8$ and fed back to the supply side tape actuator 11a.

The feedback loop gain $G_8$ should preferably be set so that the normal deviation of the position control loop for the supply side tape actuator 11a from the tape tension reference value TN is several tens to several hundred μm.

The reason that the position control loop does not perform the phase compensation is that the characteristic of the supply side tape actuator 11a is improved into the stable first-order form by the speed damping loop.

The tension control by using the above-mentioned tension disturbance estimation method enables a wider range and higher precision detection of the estimated magnetic tape tension than can be detected by the conventional tension detection mechanism.

With this tension control system of the invention, since the high-frequency component of the tension variation is suppressed by the supply side tape actuator 11a and the low-frequency component by the reel motor, the tension control system has an improved tension control precision and a wider frequency range and dynamic range.

According to the first embodiment shown in FIG. 2 to FIG. 13, the DTF control and tension control having high precision, wide frequency range and wide dynamic range are realized, permitting a good replay not only during the normal speed replay but also during the high-speed special replay mode.

[Second Embodiment]

Figure 14:
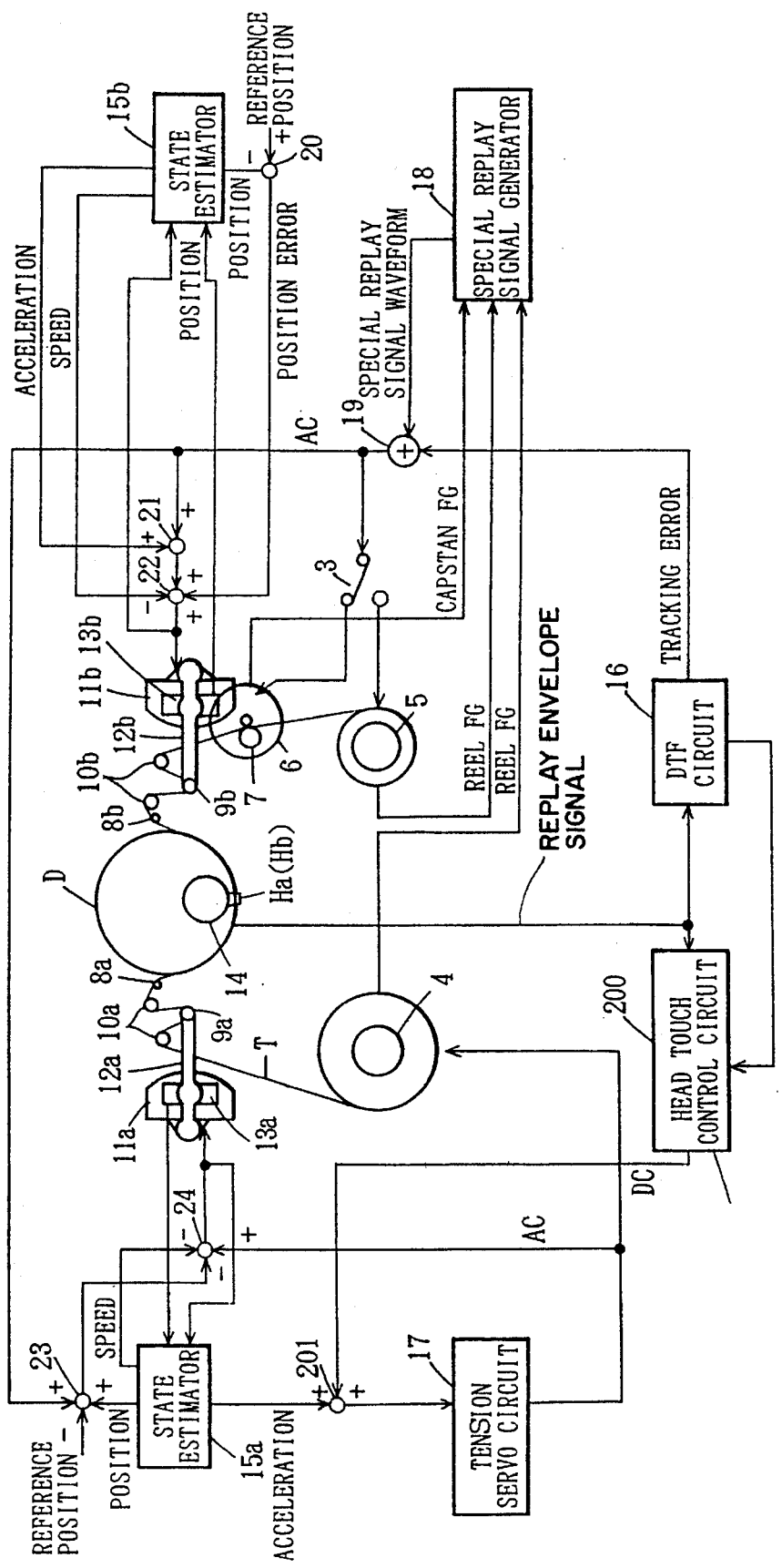
FIG. 14 is a block diagram showing a configuration of the second embodiment.
Figure 15:
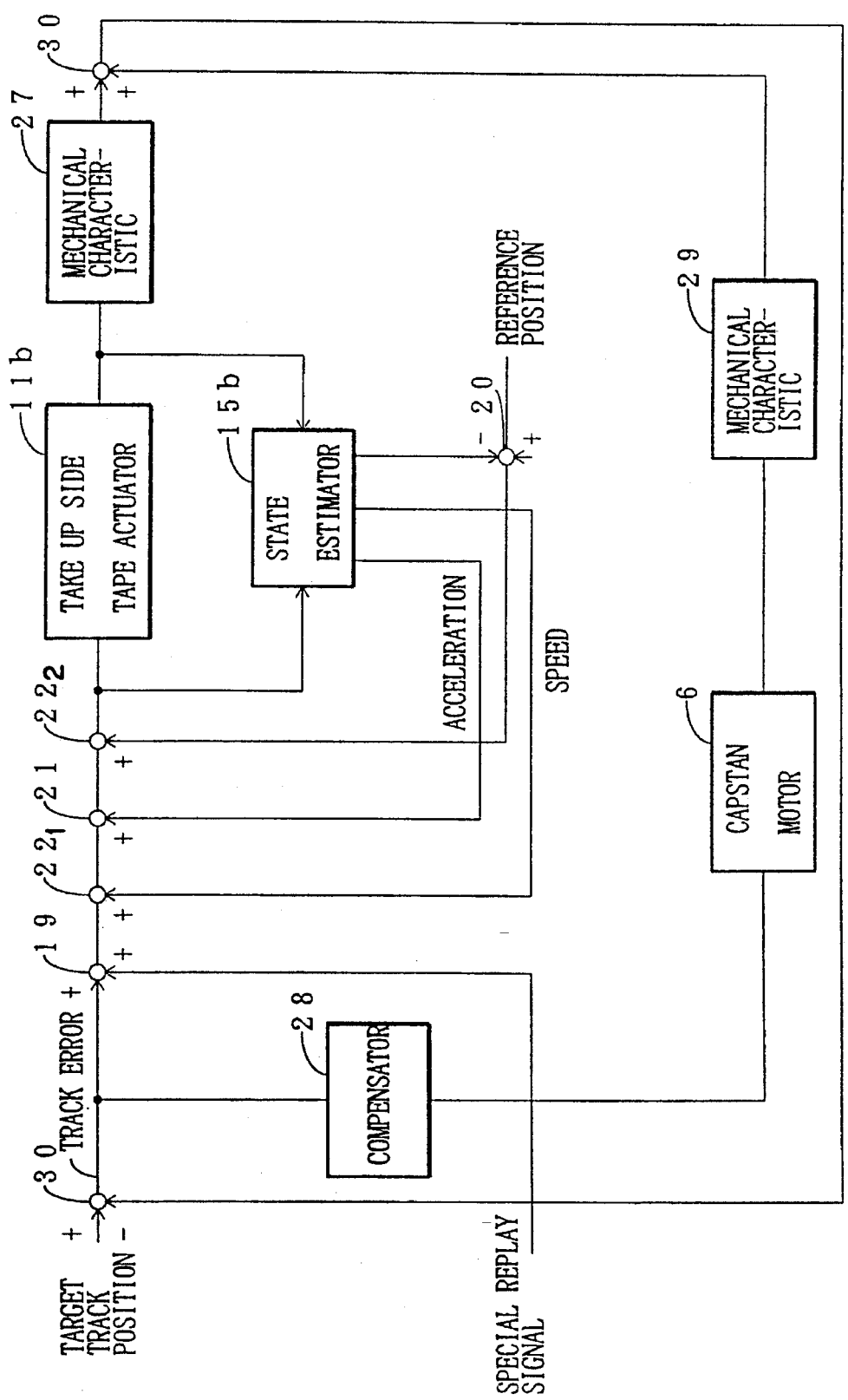
FIG. 15 is a block diagram of the DTF control system of the second embodiment shown according to the flow of physical quantities.
Figure 16:
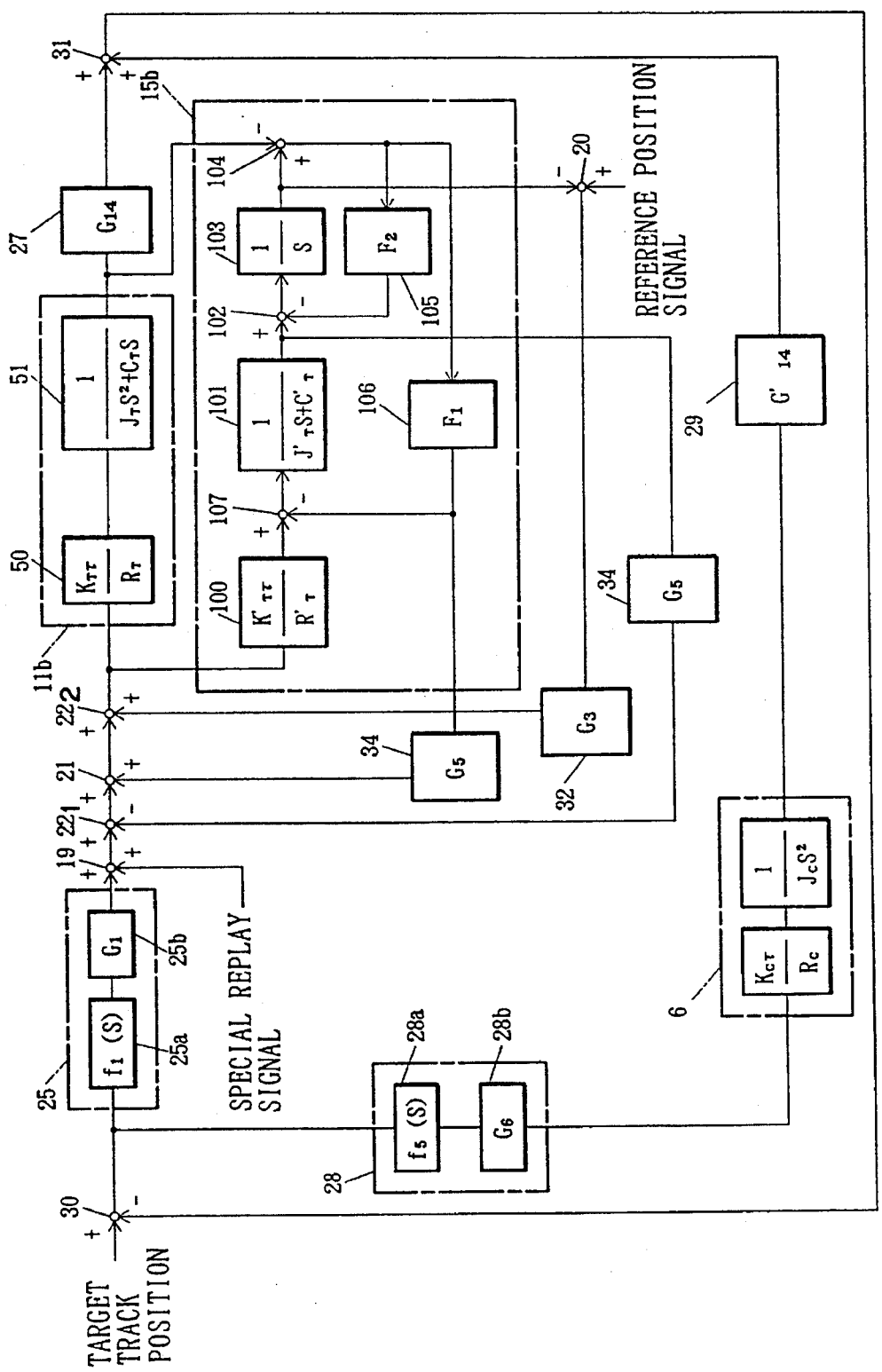
FIG. 16 is a block diagram representing the DTF control system of the second embodiment in terms of the transfer function of control logic.

The second embodiment of FIG. 14 to FIG. 16 has a head touch control circuit 200 to keep the gap or spacing between the magnetic head and the magnetic tape constant; and an adder 201 to add a head touch control signal from the head touch control circuit 200 to an estimated acceleration signal from the state estimator 15a in the tension control loop.

This second embodiment does not include a head actuator and associated means for moving the magnetic head perpendicular to the track for correct tracking in order to make the system less expensive or reduce the size of the head cylinder.

First, the head touch control is explained. The tension control circuit shown in the first embodiment can keep at an optimum tension with high precision in wide range in accordance with the tension of the magnetic tape T at the supply side movable tape pin 9a. From the perspective of the head touch control, however, it is the tension of the tape at the magnetic head H that actually needs to be tension-controlled.

When mechanical variations, such as deviation of the head cylinder D and changes in contact between tape T and head H, cause variations in tension of the magnetic tape at a portion facing the magnetic head H, the spacing between the tape and the head changes resulting in variations in the high-frequency component. These variations pose a serious problem in the way of simplifying the mechanical system, reducing the cost of components or performing high-density recording.

Figure 18:
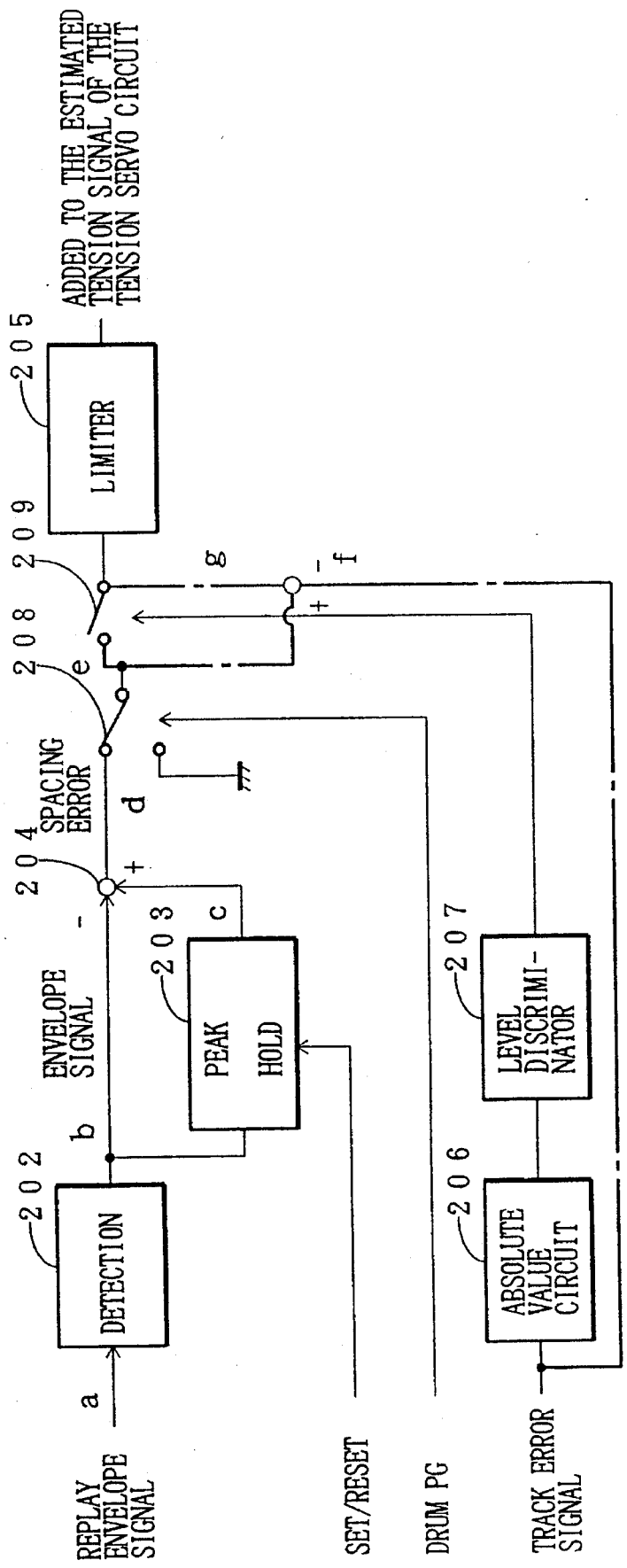
FIG. 18 is a block diagram showing the head touch control circuit of the second embodiment.
Figure 19A:
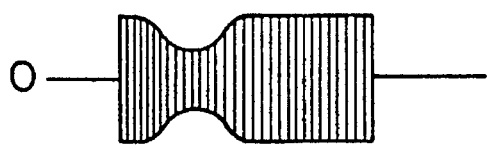
Figure 19B:
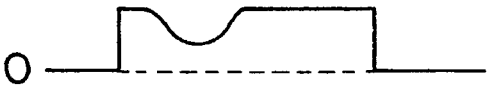
Figure 19D:
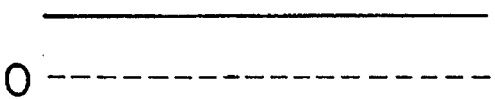
Figure 19E:
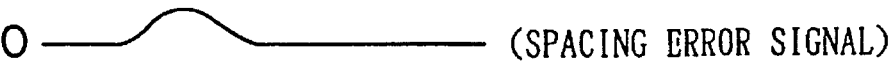

FIG. 14 is a block diagram showing the concept of the second embodiment. FIG. 15 shows the flow of physical quantities in the DTF control system. FIG. 16 represents the DTF control system of FIG. 16 in terms of transfer functions of control logic. FIG. 18 is a block diagram showing the head touch control circuit.

Now, let us explain about the DTF control system of this embodiment that does not use the head actuator.

The DTF control system of this embodiment shown in FIGS. 15 and 16 is compared with the DTF control system of the first embodiment shown in FIGS. 9 and 10. This embodiment does not have a head actuator and therefore the element 14, which is shown in FIG. 10 and represents the head actuator transfer function. This embodiment controls the capstan motor 6 instead of the reel motor of the winding reel 5 as shown by element 5 in FIG. 9.

The DTF control system of this embodiment, as in the first embodiment, performs the high-frequency component control by the takeup side tape actuator 11b and the low-frequency component control by the capstan motor 6.

As in the first embodiment, the second embodiment also has a state estimator 15b and performs the speed feedback to transform the low-frequency characteristic of the takeup side tape actuator 11b into a stable first-order form. The position control and the external disturbance elimination control are also performed in a way similar to the first embodiment.

In FIG. 16, a tracking error signal (the output of the subtractor 30) produced by the pilot method from the replay envelope signal of the magnetic head H is supplied to a compensator 28 where it passes through a low-pass filter 28a with cut-off frequency of several Hz and is then amplified by an amplifier 28b, which has the gain so set that the amplified signal couples with the second control loop for the takeup side tape actuator 11b in the frequency range of several Hz to 10 Hz. The signal is further fed to a drive amplifier not shown to drive the capstan motor 6 during normal operation as shown and, during high-speed replay, drive the reel motor 5. The low-pass filter 28a need not necessarily be used.

The capstan motor 6 or (reel motor 5) moves, via the mechanical characteristic, the magnetic tape T in its longitudinal direction to correct the low-frequency error containing dc component of the tracking error signal. Thus, the first control loop is closed through the tracking error.

The tracking error signal is also supplied to a compensator 25 where it is passed through a high-pass filter 25a, whose cut-off frequency is several tenths of Hz, which is lower than the cut-off frequency of the low-pass filter 28a of the compensator 28. The tracking error signal is then amplified by an amplifier 25b to a desired amplitude and further sent to a special replay signal adder 19, speed damping signal subtractor 22$_1$, external disturbance elimination signal adder 21, and position control signal adder 22$_2$ to a drive amplifier not shown to drive the takeup side tape actuator 11b.

The takeup side tape actuator 11b moves, via the mechanical characteristic, the magnetic tape T in its longitudinal direction to correct the tracking error. Hence, the second control loop is also closed through the tracking error.

Figure 17:
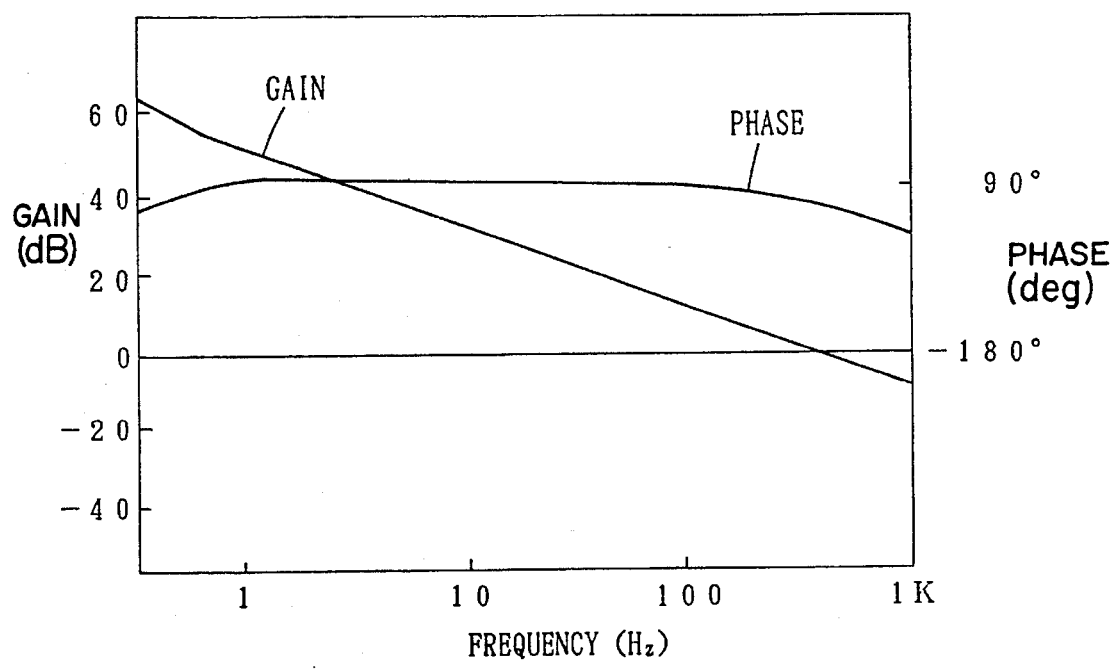
FIG. 17 is a graph showing the open loop characteristic of the DTF control system of the second embodiment.

In the second embodiment, these two electrically coupled DTF control loops combine to realize a DTF control that has high precision, wide frequency range and wide dynamic range. An example open loop characteristic of the DTF control is shown in FIG. 17.

Characteristic of the DTF control system of this embodiment is the fact that the low-frequency characteristic of the takeup side tape actuator 11b is transformed into a stable first-order form by the speed feedback up to a frequency higher than the DTF control frequency range. This enables easy coupling with the capstan motor 6, which is of the second-order form, and also allows a stable DTF control.

Now, the head touch control of this embodiment will be explained.

FIG. 18 is a block diagram showing one example configuration of a head touch control circuit 200. Denoted 202 is a detecting circuit; 203 a peak hold circuit; 204 a subtractor; 205 a limiter; 206 an absolute value circuit; 207 a level identifier; and 208 an analog switch. Signals at points a to d in the figure are shown in FIG. 19.

The reproduced signal a from the magnetic head is detected by a detector 202 to obtain an envelope signal b, whose peak value is held by a peak hold circuit 203 that produces a peak level signal c.

The peak hold circuit 203 may use an analog-voltage memory. Unless the recording condition changes, the peak value does not change in practice and therefore the peak value need only be updated by resetting the peak hold circuit every several turns of the head cylinder D. In the figure, the peak value c is shown as an almost constant voltage.

When the envelope signal b is subtracted from the peak level signal c by the subtractor 24, a signal d is obtained at the fixed contact of a switch 208. To disable the output of this signal d during an idle period (when the head H is not scanning the tape G), the switch is operated by a rotary head phase signal—which represents the rotating phase of the magnetic head and has a 50% duty ratio—to produce a spacing error signal e.

The spacing error signal e represents the amount by which the envelope signal falls, and it is necessary to identify whether the fall is due to track shift or spacing error.

In this embodiment, since the highly precise DTF control is performed, as mentioned above, the track shift should be almost zero or at a negligible level. But for the purpose of safety the following steps are taken. The absolute value is taken of the tracking error signal by the absolute value circuit 206 and, when its output level exceeds a specified value equivalent to 10% of the track pitch, the level identifier 207 opens the switch 209 to cut off the control loop of the head touch control circuit.

The limiter 205 restricts the output amplitude of the spacing error signal e from the head touch control circuit below a specified level because too large a spacing error signal e will cause a sharp change in the tape tension and therefore damage to the tape.

The spacing error signal e output from the limiter 205, as shown in FIG. 14, is added by the adder 201 to the estimated tension signal produced by the state estimator 15a of the DTF control system.

Figure 20E:
FIGS. 20e–20g are additional waveform diagrams of signals produced in the head touch control circuit of FIG. 18.
Figure 20F:
Figure 20G:

Shown by one-dot line in FIG. 18 is a variation of the head touch control circuit, which subtracts the tracking error signal f from the spacing error signal e—which represents the amount of fall of the envelop signal—to derive a pure spacing error signal g. FIG. 20 shows example signals at point e, f, g.

This head touch control method is effective for applications that do not use the DTF control.

Other parts of the second embodiment are identical in configuration with the corresponding parts of the first embodiment.

While the foregoing describes the tension control system as a closed loop, it is also possible to perform an open-loop control as by storing the error patterns of the spacing error signal g in memory. In this case, a better result can be obtained if a gain to be added is selected according to the error pattern of the spacing error signal.

According to the second embodiment, simple and inexpensive DTF control, tension control and head touch control can be realized, keeping the tape in an optimum tension at all times and assuring a good signal reproduction.

[Third Embodiment]

Figure 21:
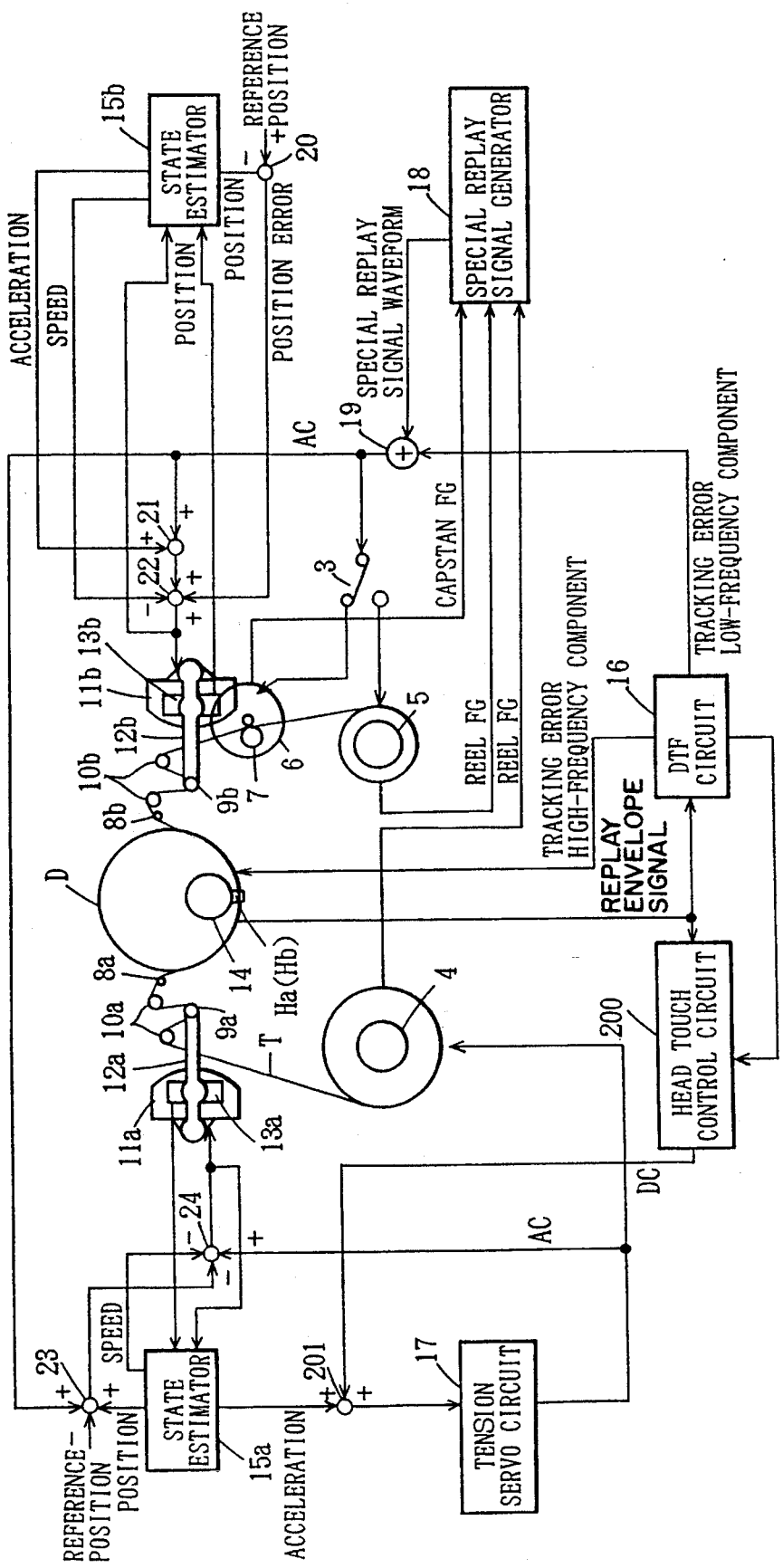
FIG. 21 is a block diagram showing a configuration of the third embodiment.

The third embodiment shown in FIG. 21 is the first embodiment including the head touch control of the second embodiment. Its operation and effect are already described in the first and second embodiments and thus not given here.

[Fourth Embodiment]

Figure 22:
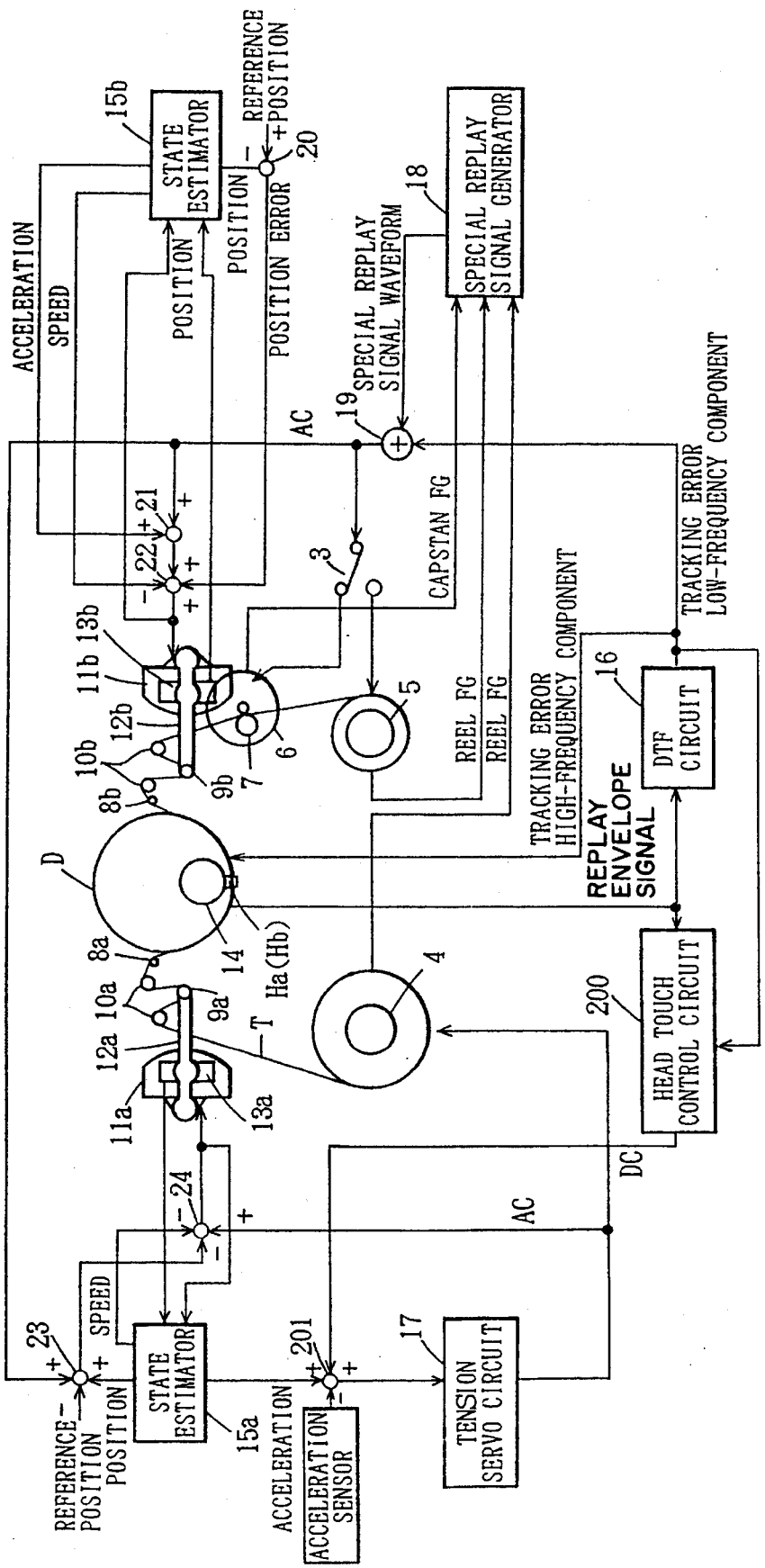
FIG. 22 is a block diagram showing a configuration of the fourth embodiment.

FIG. 22 shows the outline of the fourth embodiment. In the figure, denoted 250 is an acceleration sensor not provided in the third embodiment. The acceleration sensor detects an acceleration of the magnetic recording and reproducing deck in the movable direction of the movable pin.

In the first to third embodiment the tape drive system (simply referred to as a deck) is assumed to be installed in a stable place. This embodiment, however, assumes the system to be mounted on a car and thus employs the acceleration sensor 250 so that the system can maintain good operation even when accelerations or impacts are applied, as when the car moves.

In the systems of first to third embodiment, the tape tension is detected as external disturbance torque acting on the supply side tape actuator 11a. There is no problem when the deck is stationary. However, if the deck moves at a certain acceleration, as assumed in the fourth embodiment, the acceleration of the deck itself adds to the external disturbance torque. In that case, the preceding embodiments cannot distinguish between the external disturbance torque caused by tension variations and one caused by deck acceleration.

In this embodiment, the acceleration sensor 250 detects an acceleration applied to the movable pin 9 or that applied to the arm to which the movable pin 9 is attached. More precisely, the acceleration sensor 250 measures the angular acceleration of the supply side tape actuator 11a, i.e., the acceleration of the arm 12a of the actuator 11a when it is at the reference position.

The detected acceleration signal is subtracted from the estimated tension signal to eliminate adverse effects of the acceleration.

The acceleration sensor may use a common acceleration meter available on the market which detects the relative motion between the base and the weight by a piezo-electric element.

With the system constructed as mentioned above, when the car-mounted deck is subjected to an abrupt external acceleration, a correct tension can be detected permitting stable tension control.

In other respects, the construction, operation and effects of this embodiment are similar to those of the first to third embodiment and their explanations are omitted.

[Fifth Embodiment]

Figure 23:
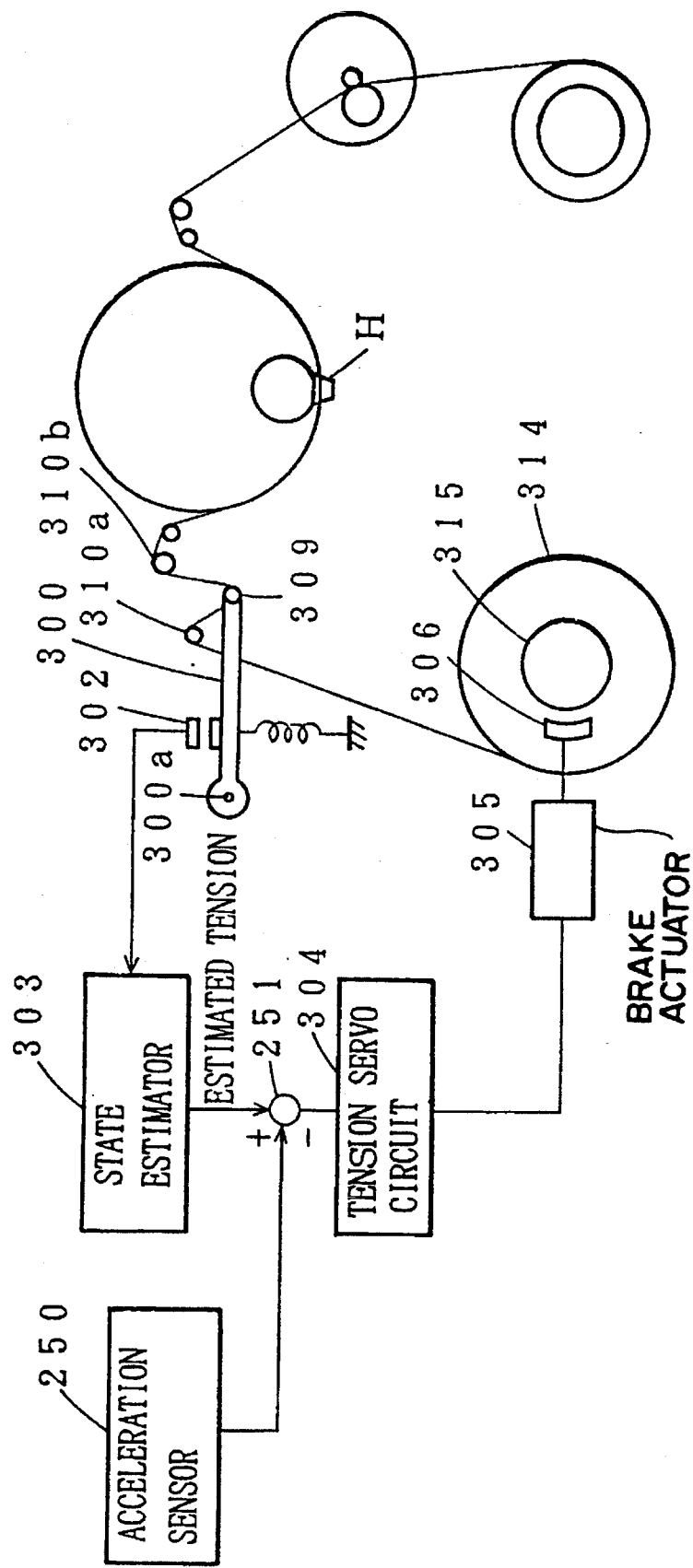
FIG. 23 is a block diagram showing a configuration of the fifth embodiment.
Figure 24:
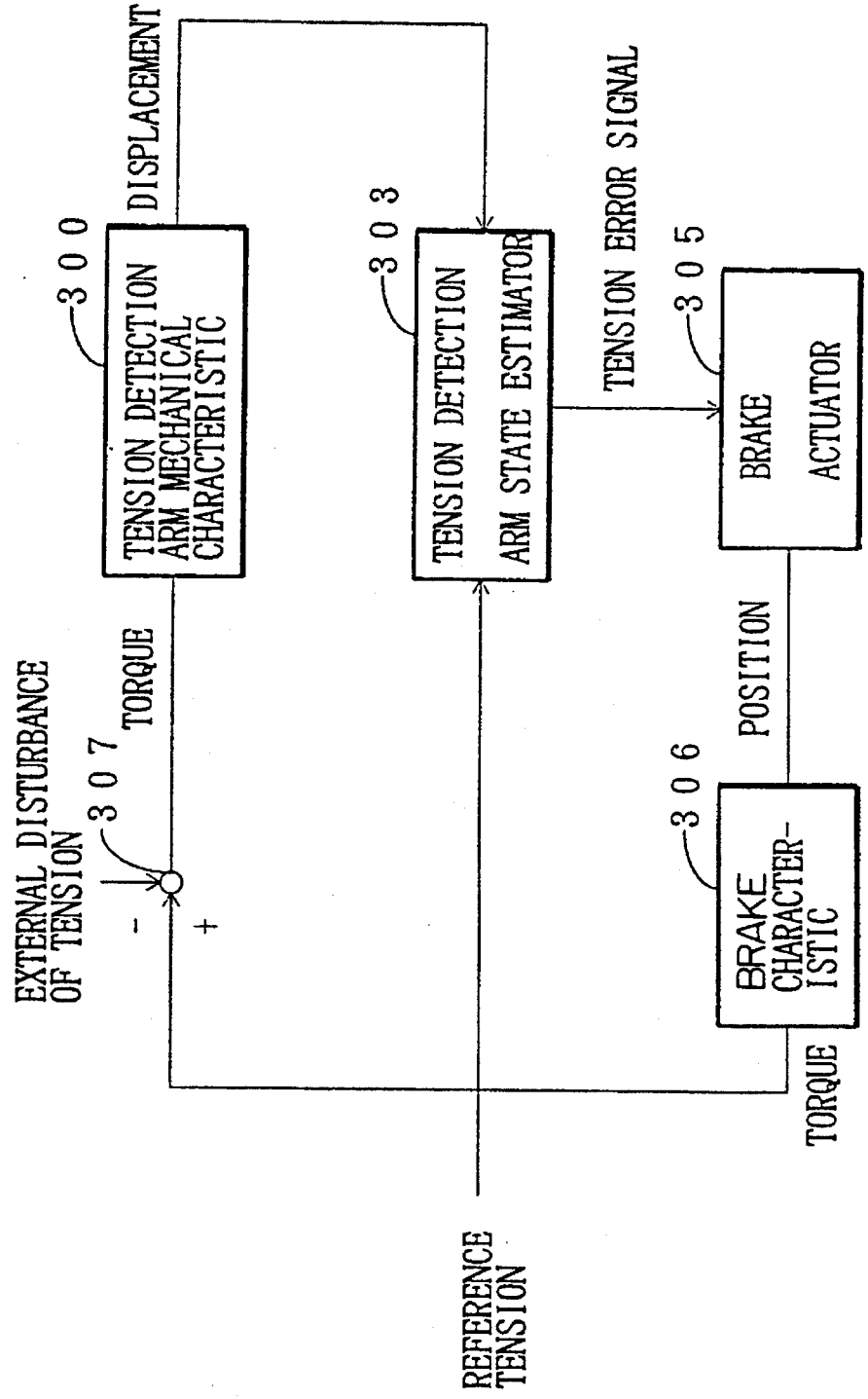
FIG. 24 is a block diagram representing the flow of physical quantities in the fifth embodiment.
Figure 25:
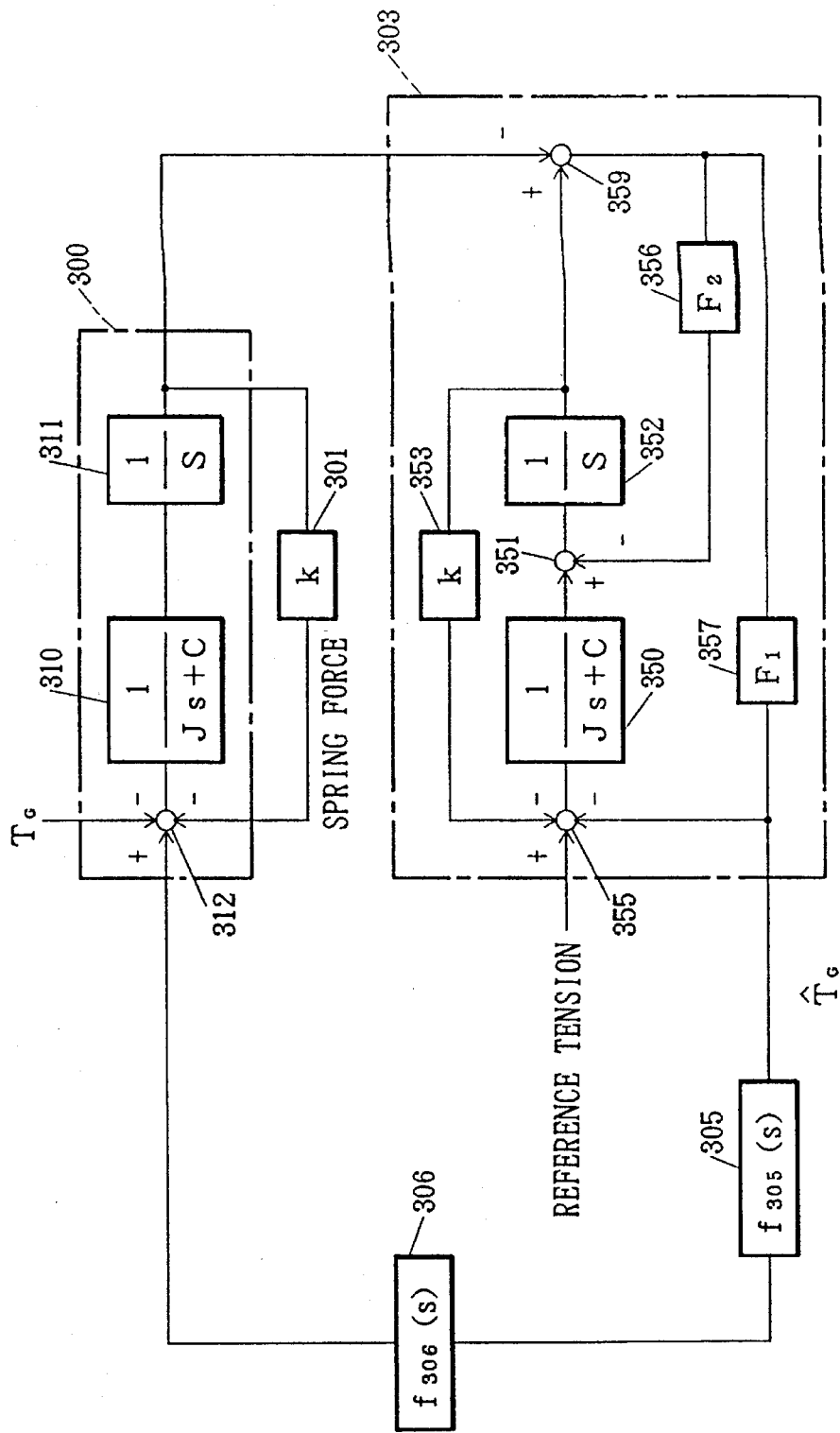
FIG. 25 is a block diagram representing the fifth embodiment in terms of transfer functions of control logic.

FIG. 23 shows the outline of the fifth embodiment, FIG. 24 a block diagram showing the physical quantities, and FIG. 25 the transfer functions of the embodiment. The fifth embodiment eliminates the takeup side tape actuator for making the system less expensive. The tension control can be realized with a method similar to that employed in the first to third embodiment.

The mechanical construction of this embodiment is shown in FIG. 23. A magnetic tape is engaged with a movable tape pin 309 provided at the end of a tension detection arm 300 that rotates about a shaft 300a and with a pair of stationary tape pins 310a, 310b provided on the supply side of the head cylinder D. The tension detection arm 300 is urged by a spring 301 to apply a back tension to the magnetic tape and its rotary position is detected by a sensor 302.

A reel mount 315 on which the supply reel 314 is mounted is provided with a brake 306. By controlling the brake actuator 305 that drives the brake 306, the braking force of the brake 306 is changed to control the back tension of the magnetic tape.

The tension control of this embodiment will be described by referring to FIG. 25.

An element 300 represents the "rotary displacement/torque" characteristic of the tension detection arm. An internal element 310 converts the torque of the tension detection arm into the velocity, with $J_S$ representing an inertia of the arm rotating portion and C a viscosity coefficient.

As shown in FIG. 23, the balanced position of the tension detection arm supported by the spring 301—which is balanced between the tape tension and the recovering force of the spring 301—is monitored by the position sensor 302. The position information produced by the element 300 is fed to a subtractor 359 of the state estimator 303.

The state estimator 303 electrically simulates the "rotary displacement/torque" frequency characteristic of the tension detection arm 300 and the dynamic characteristic of the spring 301. The state estimator 303 can thus estimate the acceleration, velocity and position external disturbance force of the tension detection mechanism including the tension detection arm 300 and the spring 301 in a wide frequency range and with high precision. The configuration and operating principle are basically the same as those of first through fourth embodiment.

Elements 350, 352, 353 in the state estimator 303 are transfer functions that simulate the transfer functions 310, 311, 301 of the tension detection arm 300 and spring 301. A subtractor 359 takes a difference between an output of the position sensor 302 (FIG. 23) and an output of the transfer functions 350–353. Denoted 356 and 357 are transfer functions representing the observer feedback gains that feed back the dynamic characteristic of the transfer functions 350–353—which electrically simulate the characteristic of the tension detection arm 300—so that the difference output of the subtractor 354 converges to zero to make the dynamic characteristic match that of the actual tension detection arm 300.

When compared with the state estimator of the first embodiment in FIG. 13, the state estimator of this embodiment does not include a drive member in the tension detection arm and therefore does not include the element 50. Since this embodiment is spring-supported, it includes an additional transfer function 301 that represents the stiffness of the spring and also an element 353 that simulates the spring.

The force acting on the tension detection arm 300 of the tension detection mechanism is the sum of a force produced by the tape tension and a force of the spring 301. The output of the element 300—including elements 310, 311, 301, 312—which represents the position is detected by the position sensor 302 and fed to the subtraction terminal of the subtractor 359. The output of the transfer function 352 in the state estimator 303, that electrically simulates the element 300 according to the reference tension, is given to the addition terminal of the subtractor 359.

The output of the transfer function 352 is supposed to represent the actual position of the position sensor 302. But since the transfer functions 350, 352 have their own integrators, the dynamic characteristic of the output of the transfer function 352 may differ from that of the tension detection mechanism 300, 301, 302 depending on the initial values of the integrators, even when the transfer characteristic of the tension detection mechanism 300, 301, 302 is equal to that of the state estimator 303 in terms of frequency characteristic.

Hence, the subtractor 359 determines, as in the previous embodiments, the difference between the actual displaced position detected by the position sensor 302 and the estimated displaced position given by the state estimator 303. The difference signal from the subtractor 359 is fed back through the elements 356, 357 with gains $F_1$, $F_2$ to make the estimated characteristics coincide with the mechanical characteristics not only in the frequency characteristic but also in the dynamic characteristic.

The above configuration is well known as the configuration of the equal-dimension observer of the modern control logic. The feedback gains $F_1$, $F_2$ are constants that freely determine the convergence of the observer and are set high so that the pole of the observer is about 10 times larger than that of the object being controlled (the negative value is increased).

As a result, the characteristics of the state estimator 303 agree with those of the tension detection mechanism 300, 301, 302 not only in terms of the frequency characteristic but also the dynamic characteristic. It is therefore possible to detect tension variations caused by external disturbance acceleration in wide frequency range without being affected by the mechanical resonance frequency.

The tension variations detected in this way is phase-compensated and gain-compensated by the compensator 304 to stabilize the tension control system. If the brake actuator 305 can be operated up to high frequency without phase shift, this phase compensation is a first-order low-pass characteristic.

Returning to FIG. 23, the estimated tension signal from the state estimator 303 minus the acceleration signal from the acceleration detector 250 is fed to the tension servo circuit 304, which produces a tension control signal that is supplied to a drive amplifier not shown to drive a brake actuator 305.

As a result, the brake 306 is operated to brake the supply reel mount 315 to keep the tension at the reference value. The brake torque characteristic generally is non-linear with respect to the displacement of the brake actuator 305, so that the system should preferably be formed by using the range where the characteristic is linear.

With the tension control system formed in this way, not only can the tension detection be done in wide range but also the tension control can have higher performance than is possible with the conventional tension control because it is formed in a closed loop using the actuator.

[Sixth Embodiment]

As mentioned earlier, it is important for high-density recording that the amount of spacing between the magnetic head and the magnetic tape be kept at a specified value at all times.

Although the preceding embodiments take into account the stabilization of the spacing, it is not necessarily sufficient because the spacing is controlled indirectly through the tape tension.

It is preferred that the spacing be directly controlled by moving the magnetic head in a direction perpendicular to the surface of the magnetic tape.

Let us first explain about an example construction of the rotary head that has a mechanism to move the magnetic head perpendicular to the surface of the magnetic tape.

Figure 26:
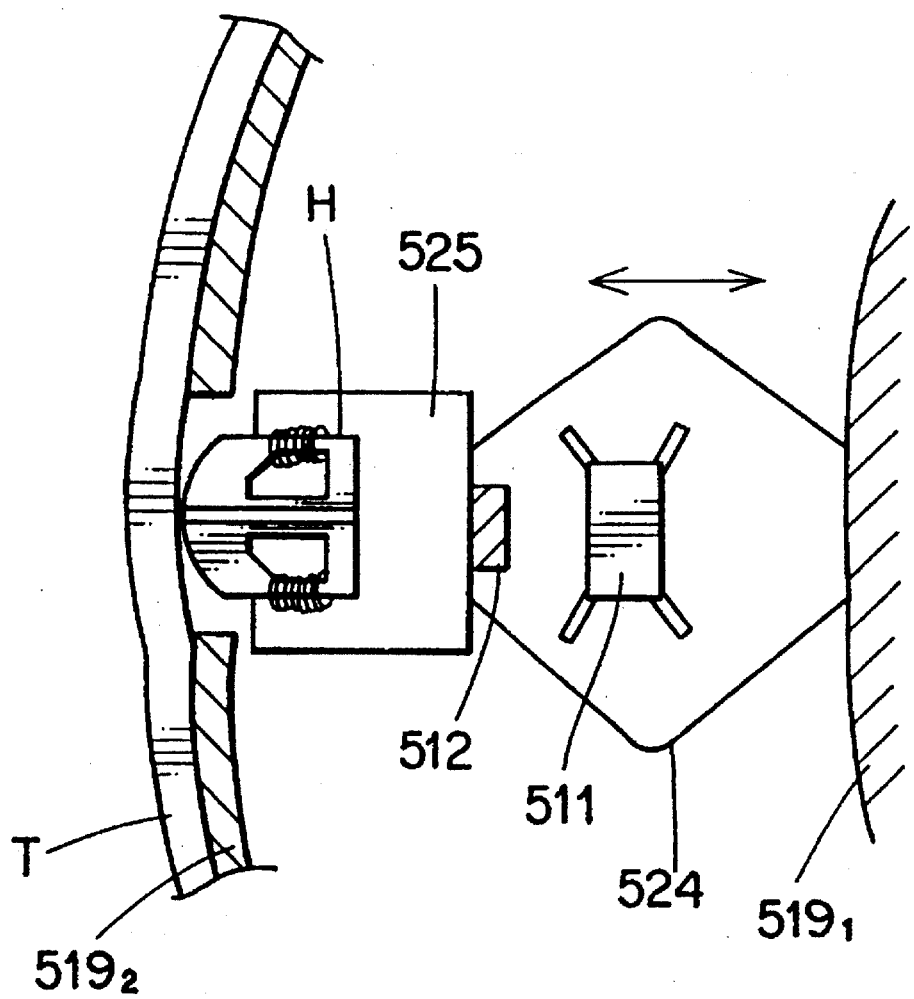
FIG. 26 is a plan view showing the construction of the movable head mechanism installed in the head cylinder.
Figure 27:
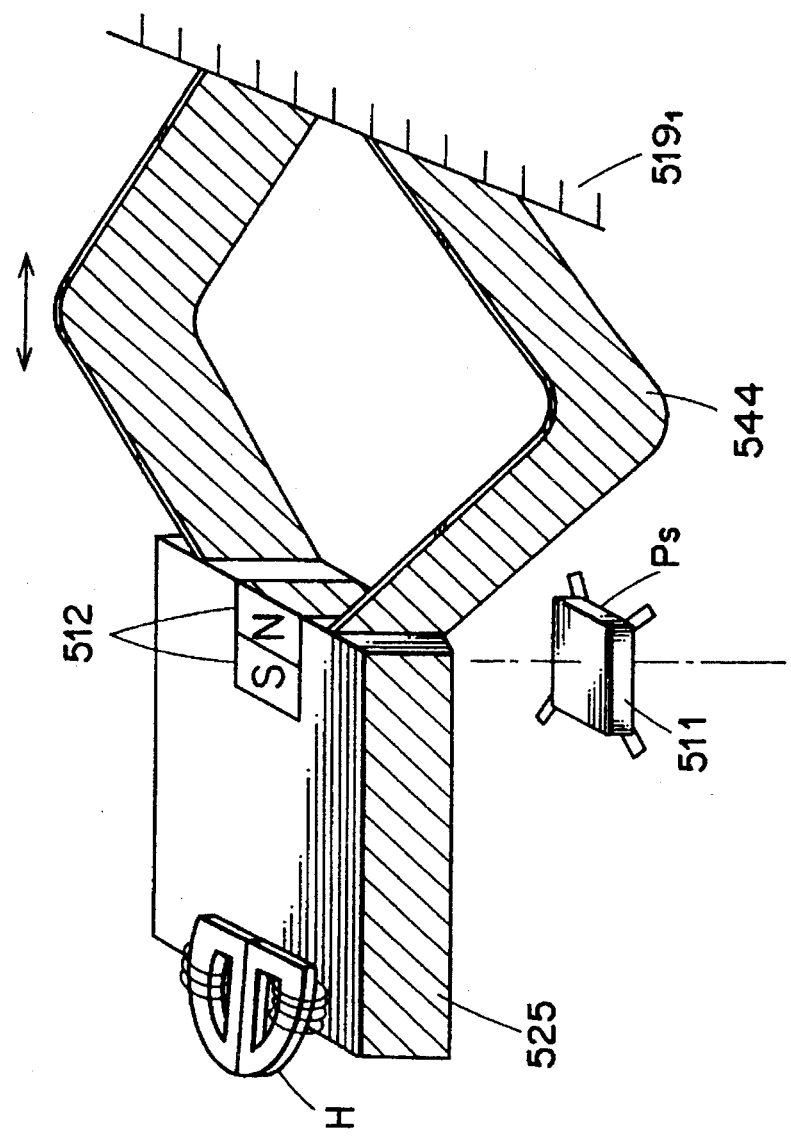
FIG. 27 is a perspective view showing the construction of the movable head mechanism installed in the head cylinder.

FIGS. 26 and 27 are a plan view and a perspective view respectively of the example construction of the movable head mechanism used in this embodiment, in which the magnetic head mounted on the head cylinder is moved in a direction perpendicular to the surface of the magnetic tape, i.e., in the diametric direction of the head cylinder.

Denoted $519_1$, $519_2$ are cross sections of the head cylinder on which the movable head H is mounted. A portion $519_1$ is a shaft portion including the rotary drive portion and a portion $519_2$ is a wall portion on which the magnetic tape 516 is wound. The movable head H is mounted on a head base 525, which is held on the head cylinder shaft portion $519_1$ through a pantograph-shaped leaf spring 524, so that the movable head H is pressed against the surface of the magnetic tape 516 through an air layer.

Since the magnetic head H is restricted in the movement in other directions than indicated by the arrow by the leaf spring 524, it cannot move except in a direction perpendicular to the surface of the magnetic tape.

In the construction shown, when the sliding surface of the head a is applied with a surface pressure from the magnetic tape 516, the magnetic head moves toward the inside of the head cylinder against the force of the leaf spring 524. The amount of displacement of the head H is detected as an output of a hole element 511 that is determined by the positional relation between the hole element 511 and the magnet 512 mounted on the head base 525.

The term "surface pressure" used in this specification and drawings refers to the pressure that the sliding surface of the magnetic head receives from the recording medium in a head projecting direction with a certain spacing of air layer therebetween.

If the magnet 512 is of two-pole type as shown in FIG. 27, the hole element 511 produces a positive or a negative signal according to the position of the magnet 512. Hence, if a control system is formed in such a way that the position where the output of the hole element 511 is "0" is taken as a balance position, the control system cannot easily be affected by variations in the sensitivity of the hole element 511.

[Seventh Embodiment]

Figure 28:
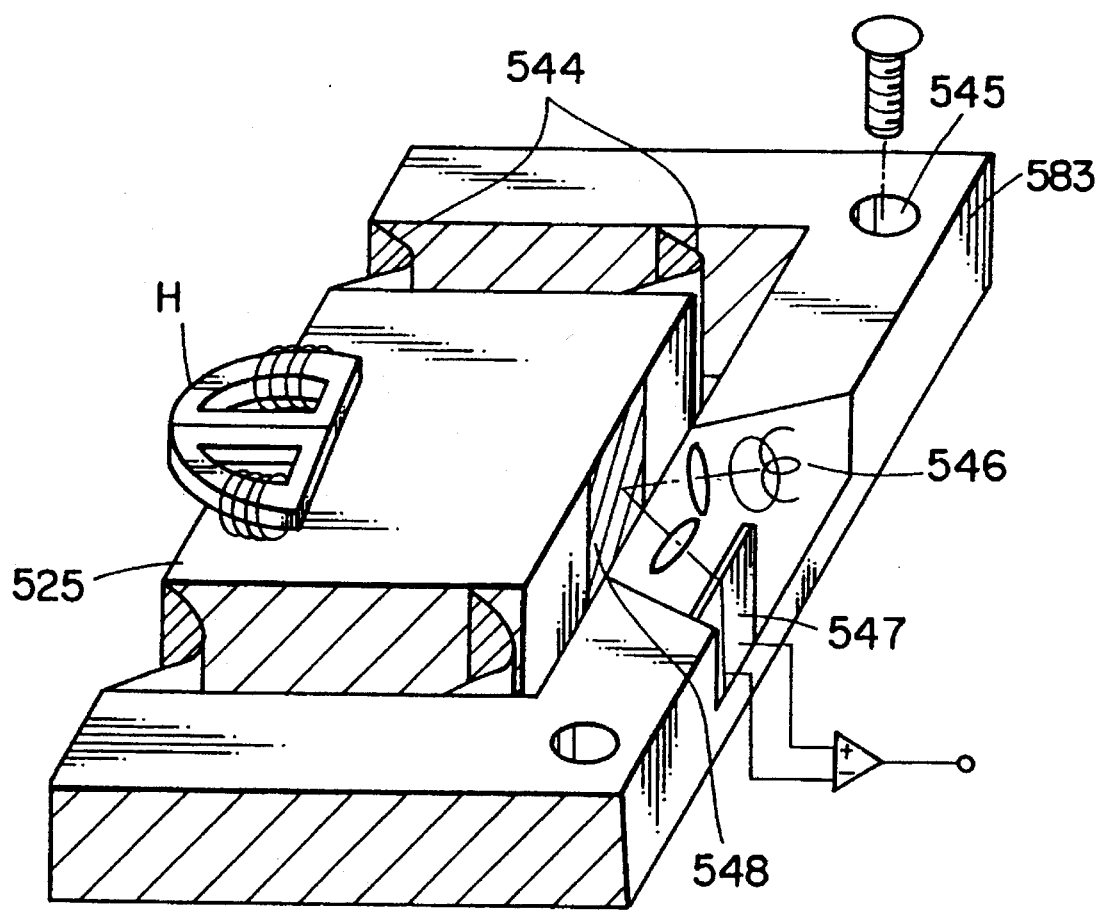
FIG. 28 is a perspective view showing another example of construction of the movable head mechanism.

FIG. 28 is a perspective view of another example construction of the movable head mechanism. In the figure, denoted 583 is a stationary head base secured to a head cylinder not shown by a screw passed through a hole 545. A head base 525 on which the head h is supported is urged by the leaf spring 544 so that it can project only in a direction away from the stationary head base 583. On the surface of the head base 525 opposite the head mounting portion is a reflection surface 548.

The stationary head base 583 is formed with a light emitting portion 546 and a light receiving portion 547. Light radiated from this light emitting portion 546 is reflected by the reflection surface 548 of the head base 525 and received by the light receiving portion 547.

The light receiving portion 547 employs a light receiving element, which is laterally divided in two as shown in such a manner that the reflected light, when the head base 525 is at the reference position, is projected onto the divided portion of the light receiving element. With this arrangement, it is possible to detect the displacement of the head base 525 as the difference between the outputs of the two light receiving elements.

Figure 29:
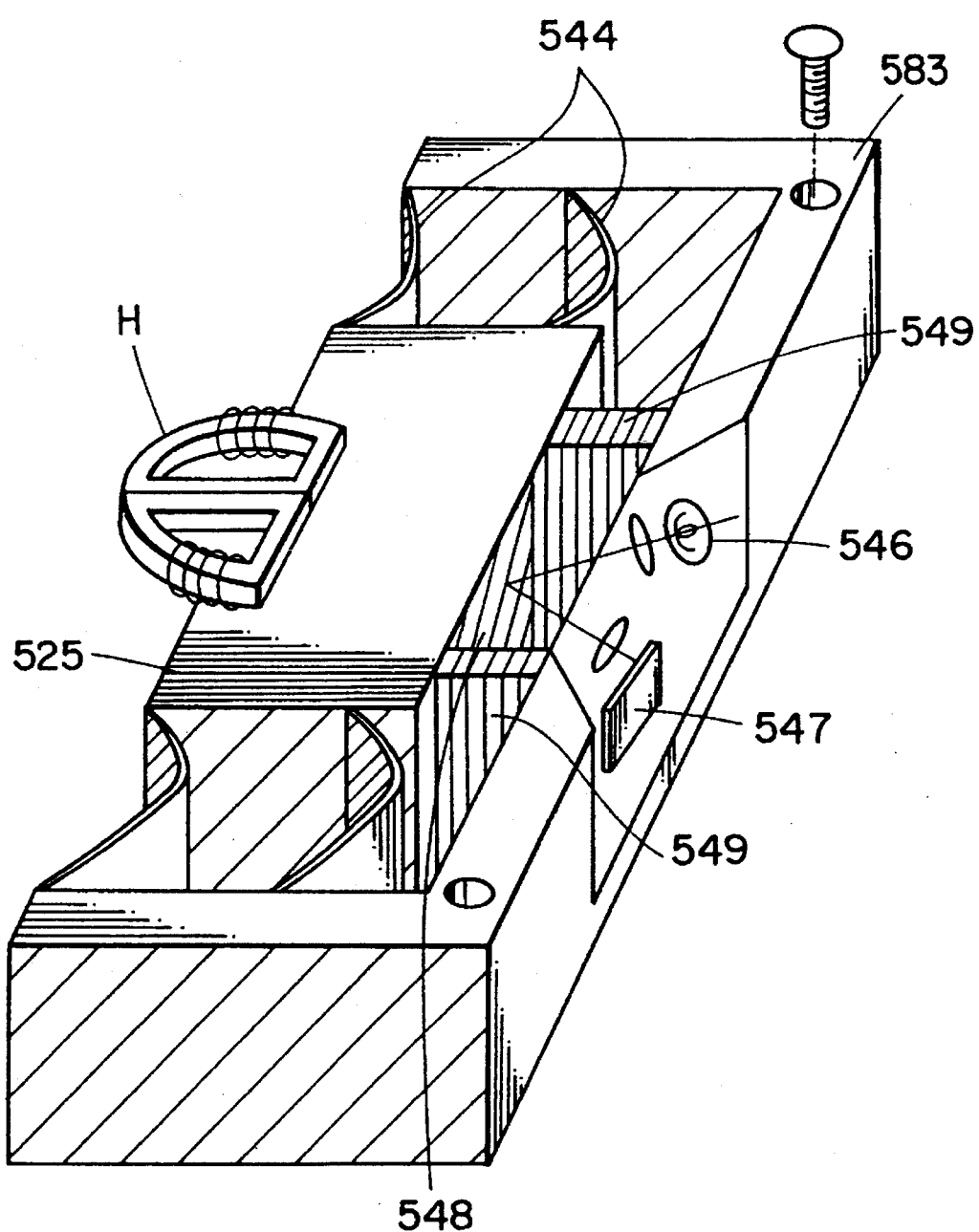
FIG. 29 is a perspective view showing still another example construction of the movable head mechanism.

FIG. 29 is a perspective view of a variation of the movable head mechanism of FIG. 28, in which the displacement of the magnetic head can be controlled.

Denoted 549 is a piezo-electric bimorph provided between the head base 525 and the stationary head base 583. By controlling the voltage applied to the piezo-electric bimorph, it is possible to move the head base 525 supported on the stationary head base 583 by the leaf spring 544 to control the amount of projection of the head H.

With this arrangement, the amount of projection of the head H can be positively controlled and this in turn permits control of the head surface pressure from the head side. The piezo-electric bimorph 549 may be replaced by a voice coil actuator and the similar operation can still be obtained.

Figure 30:
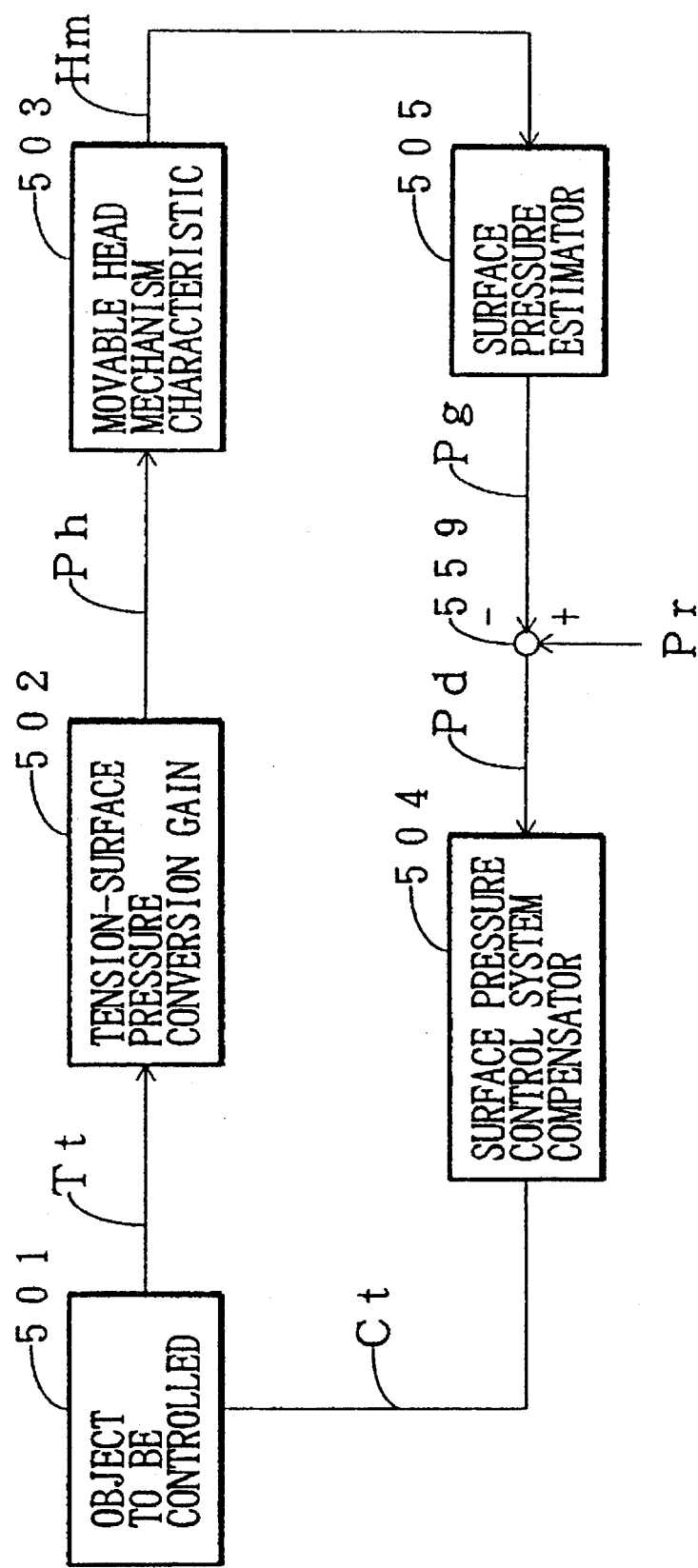
FIG. 30 is a block diagram of the sixth embodiment showing the flow of physical quantities.

FIG. 30 shows the flow of physical quantities in the sixth embodiment, in which the surface pressure of the magnetic head is controlled by the movable head and in which the tape tension is controlled by the reel motor or by the movable pin provided to the magnetic tape drive system.

When, as described in the first to fifth embodiment, the reel motor that drives the supply reel or the movable pin—a controlled object 501—provided in the magnetic tape drive system is controlled, the tape tension changes, which in turn changes the surface pressure of the magnetic head and therefore the projection of the movable head.

The tension surface pressure conversion gain 502 in FIG. 30 represents the relationship between the change in the tension $T_t$ and the change in the magnetic head surface pressure $P_h$ caused by the tension change. The movable head mechanical characteristic 503 represents the relationship between the change in the surface pressure $P_h$ and the movable head displacement $H_m$ caused by the surface pressure change. This mechanical characteristic can be given by $$H_m = 1/(mS^2 + cS + k) \tag{11}$$

where m is a mass of the movable head, k is a spring constant of the spring that holds the movable head, c is a viscosity of the system that holds the movable head, and S is a Laplacean.

The output $H_m$ of the movable head mechanical characteristic is an actual displacement of the movable head, which is measured by the movable head displacement measuring means.

The movable head displacement $H_m$ measured by the displacement measuring means is fed to the surface pressure estimator 505, which estimates the surface pressure that is then supplied to the subtractor 559. The surface pressure estimator 505 uses the movable head displacement in estimating the surface pressure because it is difficult to measure the actual surface pressure of the magnetic head. This is detailed later.

The reference surface pressure value $P_r$ is given to the addition input terminal of the subtractor 559, which produces a surface pressure error $P_d$—a difference between the reference surface pressure Pr and the estimated surface pressure $P_g$. The surface pressure control system compensator 504 calculates a control amount $C_t$ required to compensate for the surface pressure according to the error value $P_d$ and sends the control amount $C_t$ to the controlled object 501 such as the reel motor for driving the supply reel or the actuator for moving the movable pin provided in the tape drive system.

With this feedback control system, it is possible to keep the surface pressure of the magnetic head imparted by the magnetic tape at a good value at all times.

[Surface Pressure Estimator]

The surface pressure estimator 505 that plays a very important role in forming the surface pressure control system has the similar configuration and function to those of the state estimator, particularly the one in the fifth embodiment that uses a spring.

Figure 31:
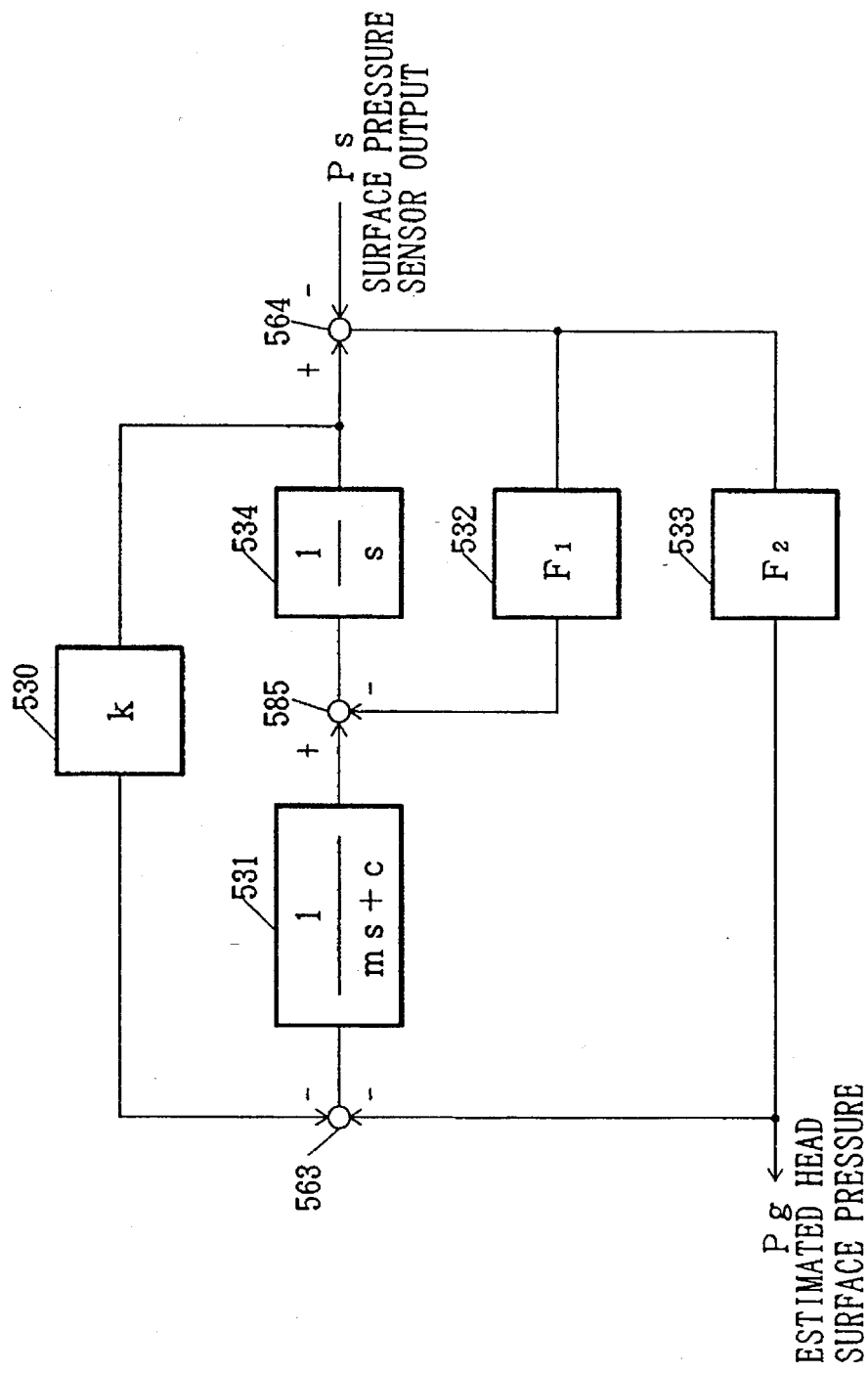
FIG. 31 is a block diagram representing the surface pressure estimator of the sixth embodiment in terms of transfer functions of control logic.

FIG. 31 is a block diagram showing one example configuration of the surface pressure estimator 505 in FIG. 30. In the figure, elements 530, 531, 534 simulate as equivalent circuits the mechanical characteristics of the movable head mechanism 526. These elements show the simulated mechanical characteristics. The spring constant element 530 simulates a spring constant k, and the mass viscosity element 531 simulates a mass m and a viscosity c. S represents a Laplacean and thus an element 534 shown as 1/S is an integrator.

Elements 532, 533 are observer feedback gains $F_1$, $F_2$ that feed back the dynamic characteristic of the elements 530, 531, 534—which electrically simulate the characteristic of the movable head mechanism 526—so that the output of the subtractor 563 converges to zero to make the dynamic characteristic match the actual dynamic characteristic of the movable head mechanism 526.

The estimated movable head surface pressure from the elements 530, 531, 534 is fed to the addition input terminal of the subtractor 564, which receives at its subtraction input terminal the surface pressure sensor output $P_s$ of the movable head mechanism 526 and produces a difference between the actual surface pressure and the estimated surface pressure.

The difference output is fed back with gains $F_1$, $F_2$, so that a certain time later this difference output becomes zero.

In such a condition, the state estimator reproduces a balance of forces present in the movable head mechanism 526 and, by taking the output of the feedback gain element 533, the estimated head surface pressure $P_g$ is obtained.

While the above configuration can easily be formed by microcomputer, it can also be formed by analog circuit as explained below.

Figure 32:
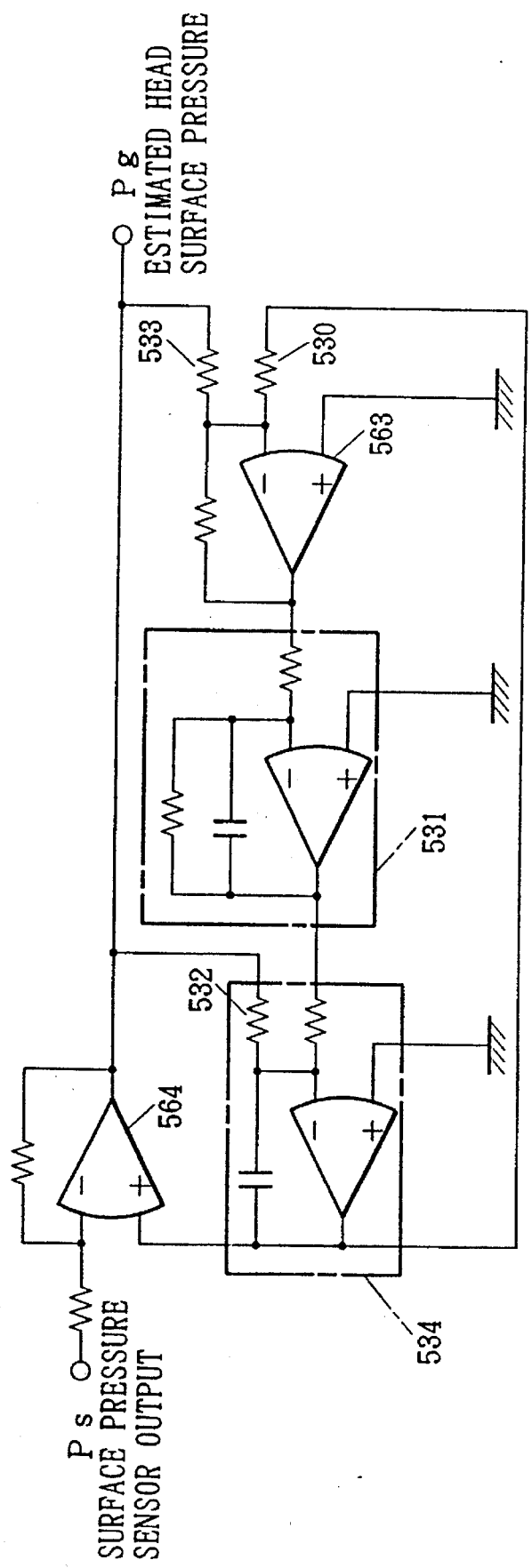
FIG. 32 is a circuitry of the sixth embodiment implemented by an analog circuit.

FIG. 32 is a block diagram of FIG. 31 when it is formed of analog circuit. In the figure, operational amplifiers 531, 534, 563, 564 correspond to the elements with like reference numerals in FIG. 32, i.e., the mass viscosity element 531, integrator element 534, and calculators 563, 564.

The mass viscosity element 531 constitutes a lag/lead filter and the integrator element 534 forms an integrator. They are connected with feedback gain elements 532, 533 and spring constant element 530.

With the configuration of the surface pressure estimator of FIG. 31, however, the measuring noise contained in the output of the head position sensor is multiplied by $F_2$, a gain of the feedback gain element 533, and then included in the estimated head surface pressure. It is therefore necessary to remove the noise of the sensor.

Figure 33:
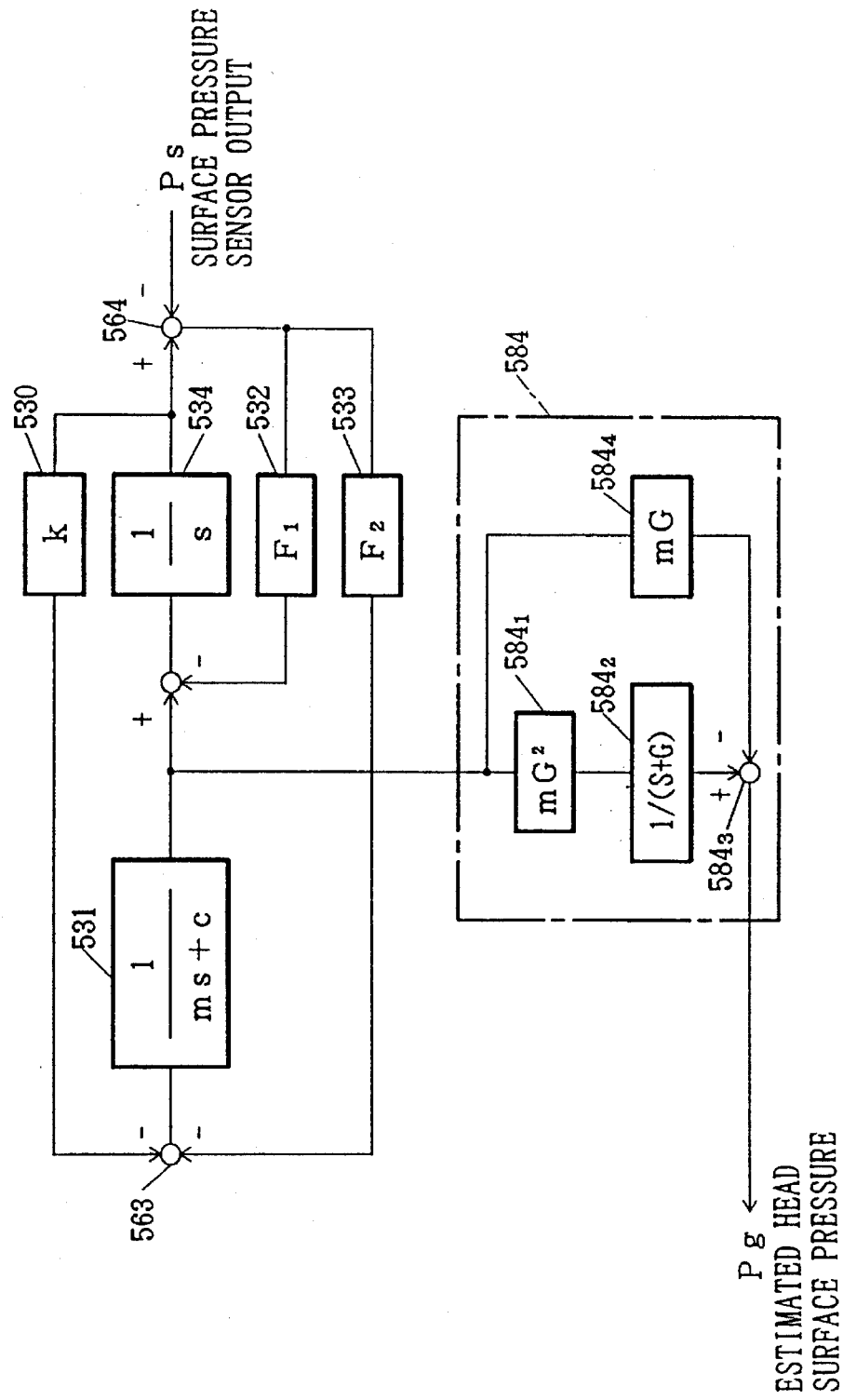
FIG. 33 is a block diagram representing the surface pressure estimator of the seventh embodiment in terms of transfer functions.

FIG. 33 is a block diagram showing the configuration of the surface pressure estimator which is free from the sensor noise. Denoted 584 is a pseudo differential circuit.

Supplying the surface pressure sensor output $P_s$ to the subtractor 564 causes the mass viscosity block 531 to produce a signal that represents the speed of the movable head mechanism. This signal receives through the low-pass filter characteristic of the mass viscosity block 531 the noise that is contained in the surface pressure sensor output $P_s$.

The speed signal, an output of the mass viscosity element 531, is sent to an external disturbance estimation observer formed by a GOPINATH minimum-dimension observer of control logic.

Generally, the external disturbance estimation observer takes in the drive current and the detected speed to estimate the disturbance torque or force. When the movable head mechanism does not have an actuator means to positively drive the movable head, the drive current is simplified as "0." The pseudo differential circuit 584 therefore is a simplified external disturbance estimation observer.

The pseudo differential circuit 584 consists of an element $584_1$ having $mG^2$ characteristic (G represents an external estimation band) and an element $584_2$ having a low-pass filter characteristic $1/(S+G)$. The output of the element $584_1$ is passed through the low-pass filter characteristic of the element $584_2$, so that the noise-contained signal from the surface pressure sensor passes through two low-pass filter characteristics—1/(mS+c) of the mass viscosity element 531 and 1/(S+G) of the element 584$_2$, thus outputting an estimated surface pressure not containing sensor noise to the adder 584$_1$.

The element 584$_4$ is shown to have a characteristic mG when the pseudo differential circuit 584 is formed of the GOPINATH minimum-dimension observer of control logic. For the path including the element 584$_4$, mG$^2$>>mG because G>>1. The noise elimination can thus be ignored and its explanation is omitted.

Figure 34:
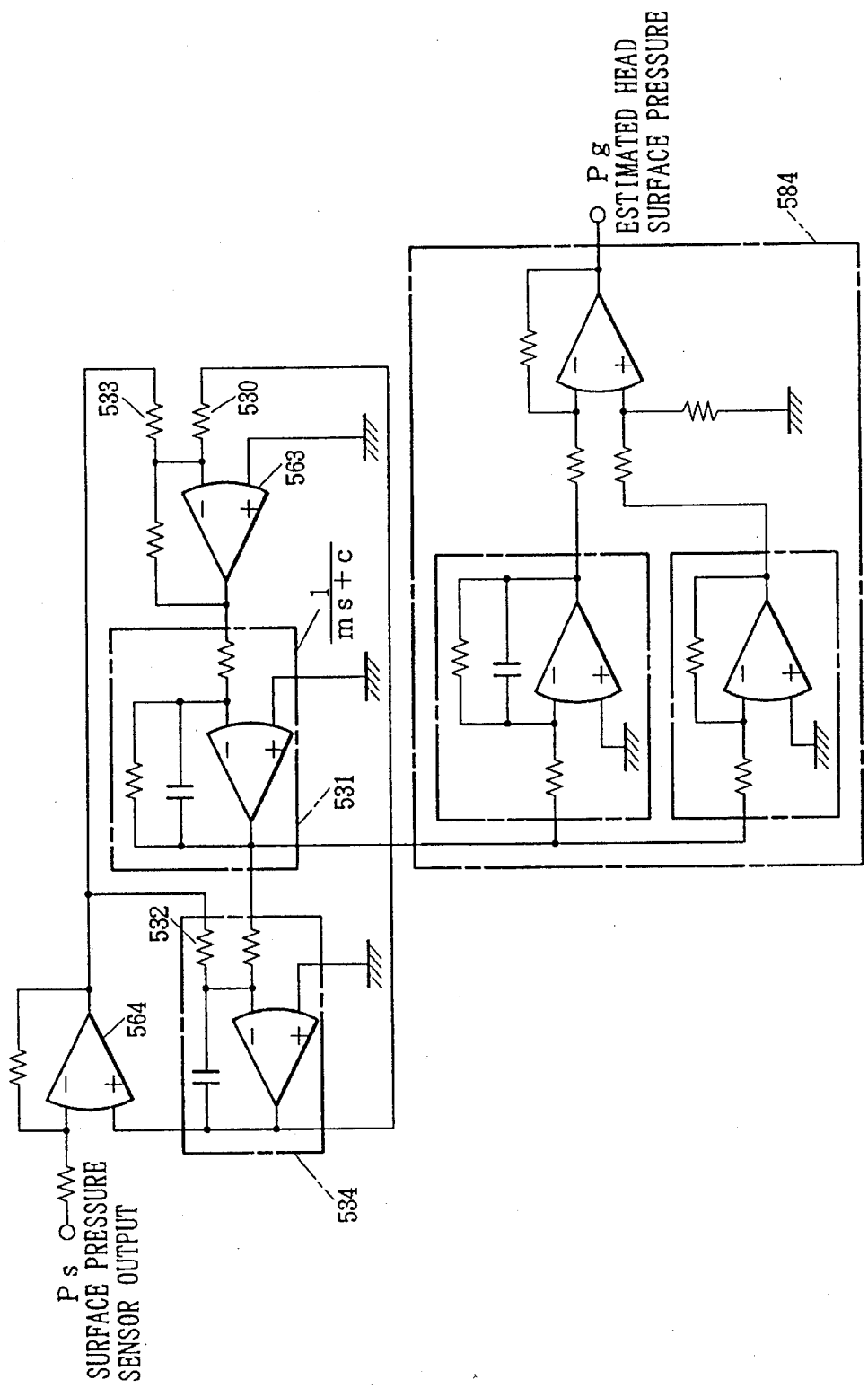
FIG. 34 is a circuitry of the seventh embodiment implemented by an analog circuit.

FIG. 34 shows the transfer function configuration of FIG. 33 expressed in analog circuit form.

Figure 35:
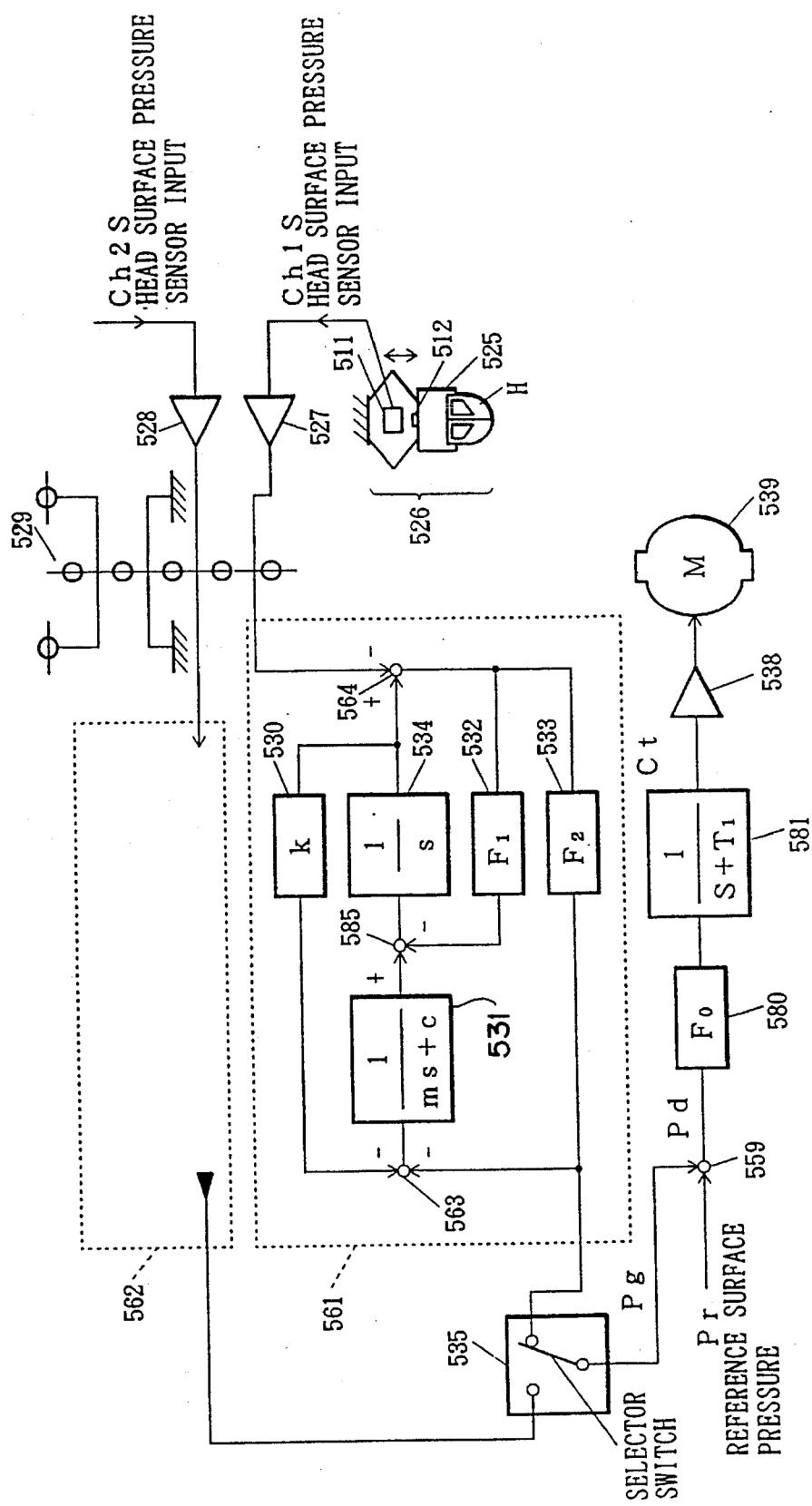
FIG. 35 is a block diagram showing the surface pressure control system of the eighth embodiment.

The surface pressure estimator of FIGS. 33 and 34 can be applied as the surface pressure estimator 505, Ch1 head surface pressure estimator 561 and Ch2 head surface pressure estimator 562 for such 2-head VTR as shown in FIG. 35. The two-head construction of FIG. 35 can perform the same function except that it has more complicated configuration and better performance against noise.

[Eighth Embodiment]

FIG. 35 shows an embodiment of the surface pressure control system according to this invention which controls the surface pressure by the supply reel motor. Two magnetic heads are mounted 180 degrees apart on the head cylinder so that the two magnetic heads perform replay alternately.

These two magnetic heads are called Ch1 head and Ch2 head. They are provided with a combination of hole element 511 and magnet 512, as shown in FIG. 27, to detect the displacement of the head a toward the magnetic tape 516. These hole elements 511 send the head surface pressure sensor output Ch1S, Ch2S to each movable head.

In the figure, denoted 527 is a Ch1 sensor amplifier to amplify the Ch1 head surface pressure sensor output Ch1S; 528 a Ch2 sensor amplifier to amplify the Ch2 head surface pressure sensor output Ch2S; 561 a Ch1 head surface pressure estimator that estimates the Ch1 head surface pressure according to the Ch1 head surface pressure sensor output Ch1S supplied from the Ch1 sensor amplifier 27 through a slip ring 529; and 562 a Ch2 head surface pressure estimator that estimates the Ch2 head surface pressure according to the Ch2 head surface pressure sensor output Ch2S supplied from the Ch1 sensor amplifier 27 through a slip ring 529.

Since the Ch1 head surface pressure estimator 561 and the Ch2 head surface pressure estimator 562 has the same configuration, only the Ch1 head surface pressure estimator 561 will be described in detail.

The selector switch 535 selects between the output of the Ch1 head surface pressure estimator 561 and the output of the Ch2 head surface pressure estimator 562. A subtractor 559 subtracts the reference surface pressure Pr from the estimated surface pressure Pg supplied through the selector switch 535 to produce the surface pressure error Pd. An element 580 is a gain compensator that compensates for the gain of the surface pressure error Pd from the calculator 559. An element 581 is a phase compensator to phase-compensate for the output from the gain compensator 580. An amplifier 538 is a power amplifier to drive the reel motor 539 by the control amount Ct, an output of the phase compensator 581.

An element 530 of the Ch1 head surface pressure estimator 561 is a spring constant element with a coefficient k that corresponds to the spring constant of the leaf spring 524 in the movable head mechanism 526. Denoted 531 is a mass viscosity element that forms 1/(mS+c) representing the mass and viscosity of the movable head mechanism 526; 534 an integrator element that forms a mechanical model of the movable head mechanism 526 in combination with the spring constant element 530 and the mass viscosity element 531; 532 and 533 feedback gain elements having feedback gains F$_1$, F$_2$ that form an observer in the Ch1 head surface pressure estimator 561; 564 a subtractor that subtracts from the output of the integrator element 534 the Ch1 head surface pressure sensor output Ch1S and supplies the difference to the feedback gain elements 532, 533; 563 a subtractor that detects a balance between the output of the feedback gain element 533 and the output of the spring constant element 530 and feeds the detected result to the mass viscosity element 531; and 585 a subtractor that subtracts the output of the feedback gain element 532 from the output of the mass viscosity element 531 and gives the result to the integrator element 534.

In this embodiment, the movable head mechanisms 526 including the heads H are mounted 180 degrees apart on the head cylinder. The selector switch 535 is operated every half turn of the head cylinder so that the output of the Ch1 head surface pressure estimator 561 is supplied through the selector switch 535 to the subtractor 559 to determine the estimated surface pressure while the Ch1 head a is sliding on the magnetic tape 516 and that while the Ch2 head not shown is sliding on the magnetic tape 516, the output of the Ch2 head surface pressure estimator 562 is fed to the subtractor 559.

Assuming that the selector switch 535 selects the input of the Ch1 head surface pressure estimator 561, the operation of this embodiment will be explained.

The amount by which the head H projects changes according to the surface pressure imparted to the head H from the magnetic tape. This amount of head projection is detected by a combination of the hole element 511 and the magnet 512 and is given as the Ch1 head surface pressure sensor output Ch1S to the Ch1 sensor amplifier 527.

Based on the Ch1 head surface pressure sensor output Ch1S from the Ch1 sensor amplifier 527, the Ch1 head surface pressure estimator 561 determines the estimated head surface pressure Pg, which is fed through the selector switch 535 to the subtractor 559.

The subtractor 559 subtracts the estimated head surface pressure Pg from the reference surface pressure Pr and sends the surface pressure error Pd to the gain compensator 580 where it is gain-compensated. The error Pd is further phase-compensated by the phase compensator 581 and the resultant control amount Ct is fed through the power amplifier 538 to the reel motor 539. In this way, the tension Tt of the magnetic tape 516 is controlled by the feedback control to maintain at a constant value the surface pressure imparted from the magnetic tape to the head H.

The head surface pressure estimators 561, 562 perform the similar calculation to those of the state estimators of the first to sixth embodiment. The spring constant element 530, mass viscosity element 531, and integrator element 534 form an electric circuit that simulates the spring constant, mass, viscosity, and speed-displacement conversion coefficient, thereby simulating the mechanical characteristic of the movable head.

This embodiment does not have an actuator for controlling the projection of the movable head H and thus the observers in the head surface pressure estimators 561, 562 have no inputs. However, the estimated displacement, which is an estimated surface pressure output, is always compared with the actual displacement and the result of comparison, or the estimation error, is fed back through the feedback gain elements 532, 533 so that the estimation error will converge after the operation of the observer. The feedback gain element 532 corresponds to a term representing the speed of convergence of the estimation error and the feedback gain element 533 relates to a term that represents the stability of the observer.

In the head surface pressure estimator 561, the output of the spring constant element 530 and the estimated head surface pressure output of the feedback gain element 533 are fed back through the subtractor 563 to the mass viscosity element 531 to represent the balance of forces in the head surface pressure estimator 561 between the reactionary force of the leaf spring 524 and the head surface pressure force that the head H receives from the magnetic tape.

In the foregoing, description centers around the operation of the Ch1 head surface pressure estimator 561. The operation of the Ch2 head surface pressure estimator 562 is also the same. The output of the Ch2 head surface pressure estimator 562 is fed through the selector switch 535 to the calculator 559 to control the head contact on the Ch2 head side in good condition.

By changing the tension of the magnetic tape 516 through the above-mentioned operation, the surface pressure of the head H is controlled at a constant value maintaining a good head contact.

[Ninth Embodiment]

Figure 36:
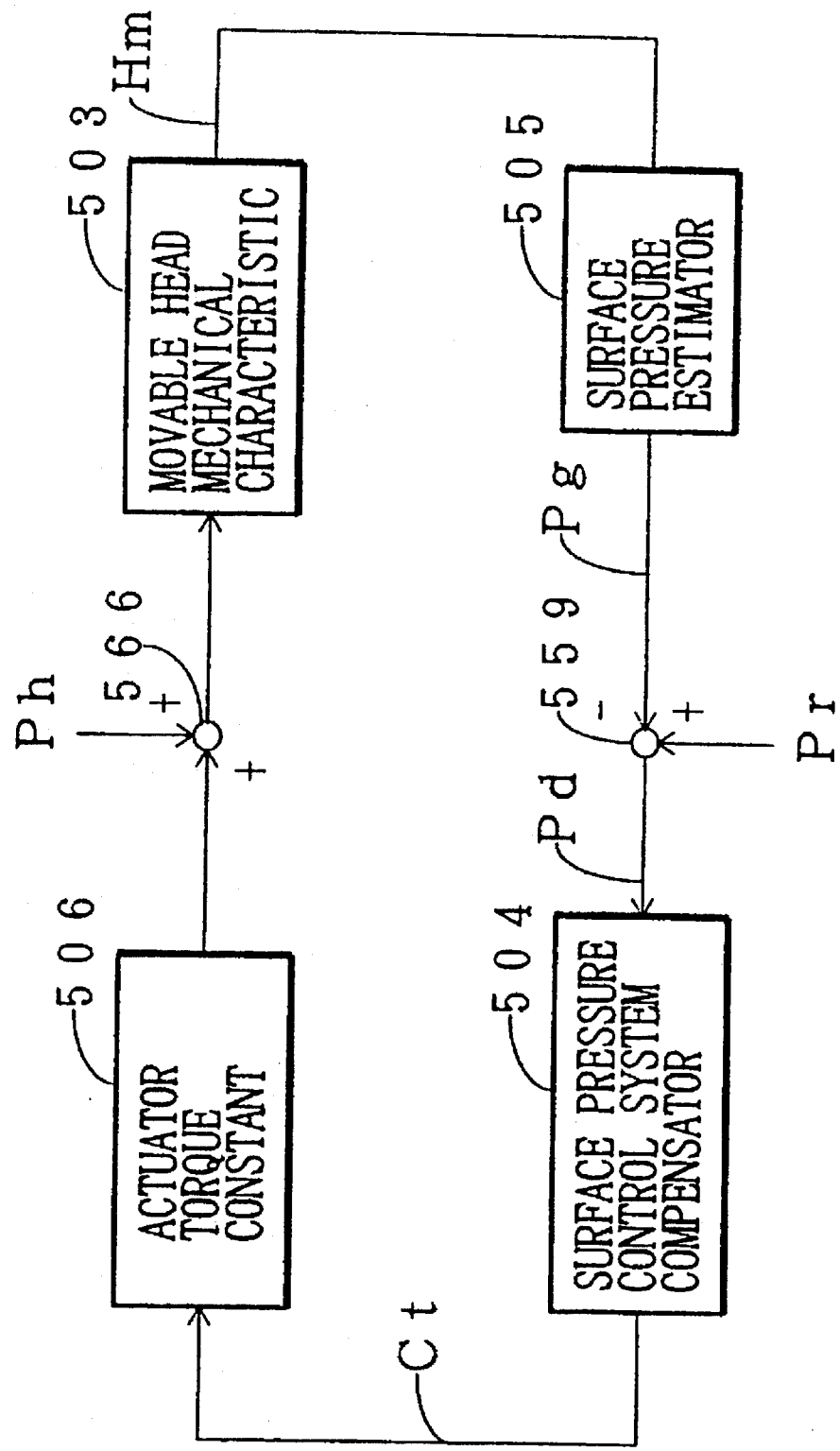
FIG. 36 is a block diagram of the ninth embodiment.

FIG. 36 shows as the ninth embodiment of the invention a control system to control the movable head projection by an actuator, as in FIG. 29.

An element 506 represents an actuator torque constant for the actuator that drives the movable head in a projecting or forward direction. An element 566 is an adder that adds the head surface pressure Ph and the output of the actuator torque constant 506. The surface pressure control actuator consists equivalently of the actuator torque constant 506, adder 566 and movable head mechanical characteristic 503.

In the configuration of the figure, the control amount Ct from the surface pressure control system compensator 504 is given to the actuator, which produces a force to move the movable head according to the actuator torque constant 506. Since the movable head is also applied a head surface pressure Ph, the combined force is imparted to the movable head.

Upon receiving the combined force, the movable head is displaced, affected by the mechanical characteristic 503 of the self inertia. The displacement measuring means outputs a displacement amount Hm representing the amount of displacement.

As in the previous embodiment, the surface pressure estimator 505 estimates the surface pressure that the movable head receives from the displacement Hm and sends the estimated value Pg to the subtraction input terminal of the subtractor 559 which takes in the reference surface pressure Pr at the addition input terminal.

The subtractor produces a surface pressure error Pd.

[Tenth Embodiment]

Figure 37:
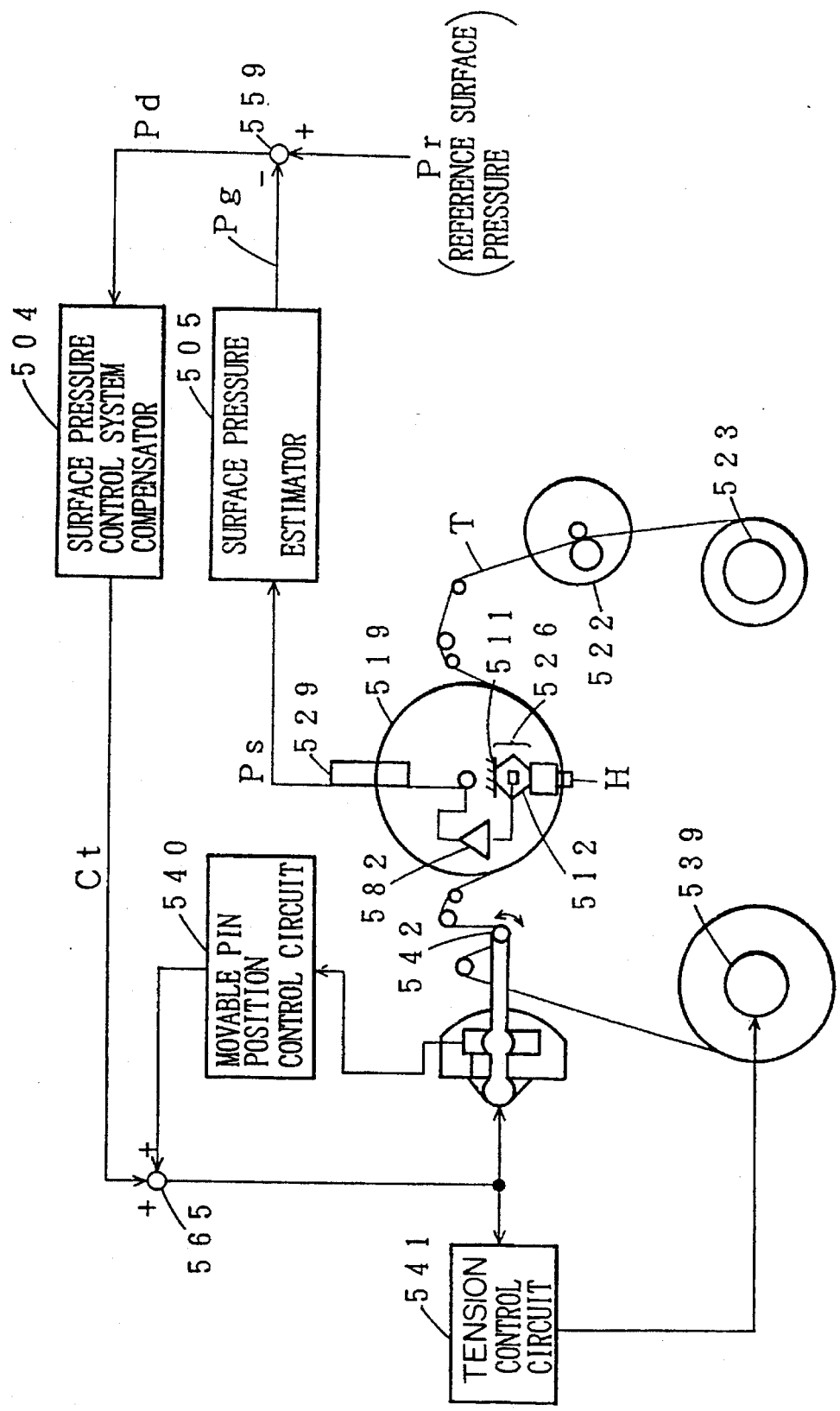
FIG. 37 is a schematic diagram showing the outline of the tenth embodiment.

The tenth embodiment shown in FIG. 37 employs a movable head as the magnetic head. The surface pressure information determined from the movable head displacement is fed to the tension control system which performs both the high precision surface pressure control and the tension control at the same time.

Denoted 542 is the movable pin installed on the supply side of the head cylinder D9; 541 a tension servo circuit that controls the reel motor 539 to maintain the tape tension at a specified value; 540 a movable pin position control circuit to control the position of the movable pin 542; 565 a calculator that adds the control amount Ct—an output of the surface pressure control system compensator 504—and an output of the movable pin position control circuit 540 and feeds the added result to the tension servo circuit 541 and the movable pin 542; and 582 a sensor amplifier that amplifies the surface pressure sensor output Ps produced by the hole element 511 in the movable head mechanism 526 and feeds it through a slip ring 529 to the surface pressure estimator 505.

In the above-mentioned configuration, the surface pressure sensor output Ps for the head H in the movable head mechanism 526 of the head cylinder 519 is amplified by the sensor amplifier 582 and taken through slip ring 529 out of the head cylinder to the surface pressure estimator 505.

As a result, the surface pressure estimator 505 produces the estimated head surface pressure Pg, which is subtracted by the calculator 559 from the reference surface pressure Pr to obtain the surface pressure error Pd that is then fed to the surface pressure control system compensator 504.

The position of the movable pin 542 is detected by a position sensor not shown and fed to the movable pin position control circuit 540.

The surface pressure estimator 505 and the surface pressure control system compensator 504 along with the movable pin position control circuit 540 form the positioning control loop. With the movable pin position control circuit 540 performing the positioning control, the voltage applied to the actuator that drives the movable pin 542 is linear with respect to the tape tension in the tape drive system in the frequency range within a servo band of the position control system for the movable pin 542.

Examining the frequency characteristic that ranges from the external disturbance imparted by the tape tension to the movable pin 542 to the drive voltage of the control system including the movable pin position control circuit 540 indicates that the transfer characteristic of the external disturbance and the voltage is a closed characteristic of the position control system.

The closed characteristic is generally flat up to near the control band in the gain characteristic and in the phase characteristic. Hence, when the movable pin 542 is being position-controlled, the voltage to drive the movable pin 542 may be regarded to some extent as the detected tension of the tape drive system.

The tension control circuit 541 performs gain and phase compensation on the voltage applied to the movable pin 542 so that the voltage becomes constant, and then the voltage is fed back to the reel motor 539 to keep the tape tension constant.

The calculator 565 adds the output of the surface pressure control system compensator 504 to the position control system of the movable pin 542 to position-control the movable pin 542 and perform control so that the head surface pressure of the head H in the movable head mechanism 526 is constant.

In other words, it is possible to maintain at a constant value the tape tension that the movable pin 542 receives from the reel motor 539 and to suppress the head surface pressure variations of somewhat high frequency by moving the movable pin 542.

By moving the movable pin 542 in the direction of arrow, not only can the tape tension of the tape drive system be changed freely but the head surface pressure between the head H and the magnetic tape 516 can also be changed.

When compared with the case of controlling only the reel motor 539, the control including the position control of the movable pin 542 can be realized in a wide frequency range by forming the movable pin 542 with a highly responsive mechanism having high stiffness.

[Eleventh Embodiment]

Figure 38:
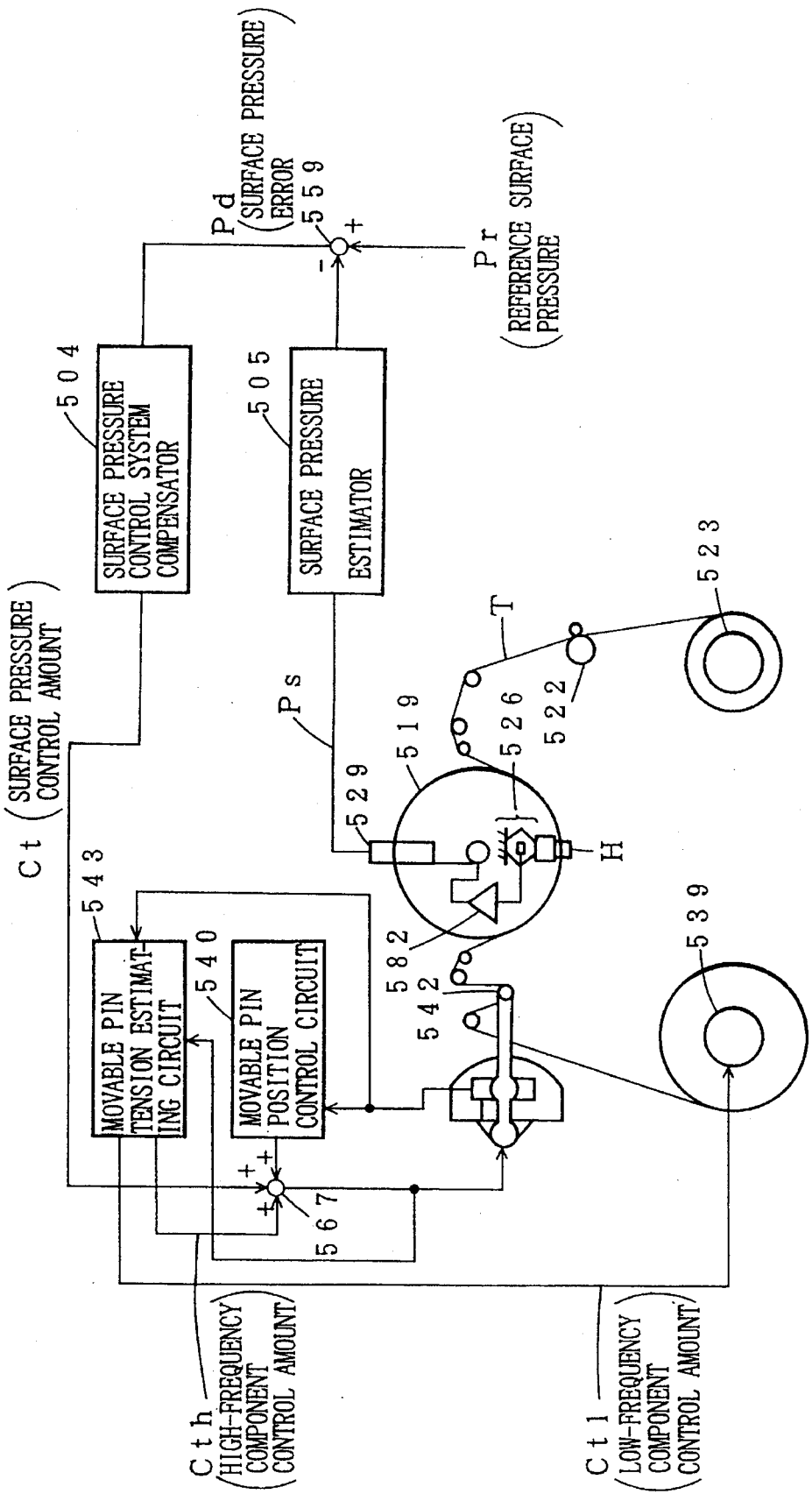
FIG. 38 is a schematic diagram showing the outline of the eleventh embodiment.

FIG. 38 is a block diagram showing another example of the surface pressure control system having the reel motor and the movable pin. The external disturbance applied to the movable pin position control system is processed by the actuator torque constant 506 to enable a wide frequency range tension control.

In the figure, an element 543 is a movable pin tension estimation circuit that estimates the tension of the movable pin 542 according to the position control signal and the position detection signal of the movable pin 542 and outputs the low-frequency component control amount Ct1 and the high-frequency component control amount Cth. An adder 567 adds a control amount Ct from the surface pressure control system compensator 504, a control signal from the movable pin position control circuit 540, and a high-frequency component control amount Cth from the movable pin tension estimation circuit 543 and generates a position control signal for the movable pin 542.

The low-frequency component control amount Ct1 from the movable pin tension estimation circuit 543 is given as the tension control signal to the reel motor 539.

In the above configuration, the movable pin tension estimation circuit 543 has almost the same configuration as the Ch1 head surface pressure estimation section 561. It estimates the tension of the magnetic tape 516 acting on the movable pin 542 from the position or displacement of the movable pin 542 and the position control signal to the pin.

In the configuration of the tenth embodiment shown in FIG. 37, the accurate tension detection can be made only up to the servo frequency band of the position control system for the movable pin 542. With this eleventh embodiment, however, it is possible to estimate the tape tension accurately even outside the position control band, thus widening the range in which the tape tension acting on the movable pin 542 can be controlled.

In this case, the tape tension estimated by the movable pin tension estimation circuit 543 is divided into frequency bands by filter, and the low-frequency component control amount Ct1 derived by a low-pass filter is supplied to the reel motor 539 and the high-frequency component control amount Cth derived by a high-pass filter is fed to the movable pin 542, thus performing the control in two frequency bands.

In the configuration of FIG. 38, the low-frequency tape tension control is covered by the reel motor 539 and the tension control in a relatively wide frequency range is done by the movable pin 542, thus maintaining the desired tape tension in a wide frequency range.

According to the control amount Ct from the surface pressure control system compensator 504, the calculator 567 outputs a head surface pressure control signal to the position control system for the movable pin 542 to perform the tension control in a wide band including a rotating frequency of the head cylinder 519. During this tension control, the high-frequency head surface pressure variations is absorbed by the head surface pressure control using the movable pin 542, thus maintaining a good head contact.

[Twelfth Embodiment]

Figure 39:
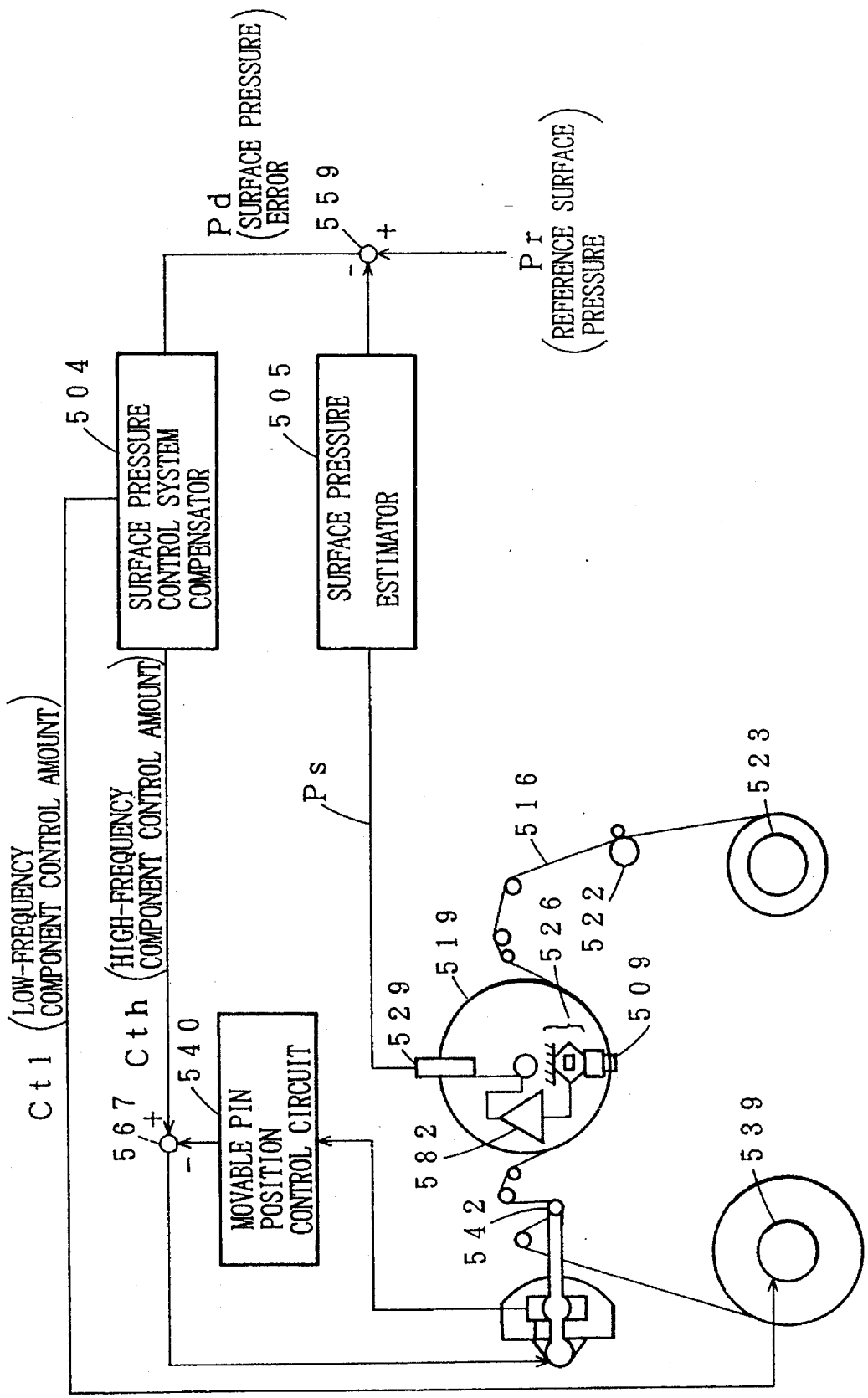
FIG. 39 is a schematic diagram showing the outline of the twelfth embodiment.

FIG. 39 shows a block diagram showing still another example of the surface control system that controls the reel motor and the movable pin. In this example, the tape tension in the tape drive system is controlled only by the head surface pressure control, rather than by detecting or estimating the tape tension acting on the movable pin.

In the figure, the surface pressure control system compensator 504 generates the low-frequency component control amount Ct1 and the high-frequency component control amount Cth through filter processing. The low-frequency component control amount Ct1 is fed as is to the reel motor 539 while the high-frequency component control amount Cth is added through the calculator 567 to the output of the movable pin position control circuit 540 that controls the movable pin 542.

In this case, two or more movable head mechanisms 526 must be mounted 180 degrees apart on the head cylinder 519 to detect the surface pressure imparted by the magnetic tape 516. During the section where the head H is not in contact with the magnetic tape 516, the estimated head surface pressure Pg produced by the surface pressure estimator 505 must be sample-held for use. The configuration of FIG. 39 is simpler than that of FIG. 38.

If the above conditions are met, this configuration permits a control of the head surface pressure at a constant value in wide frequency range, assuring a good head contact.

Figure 40:
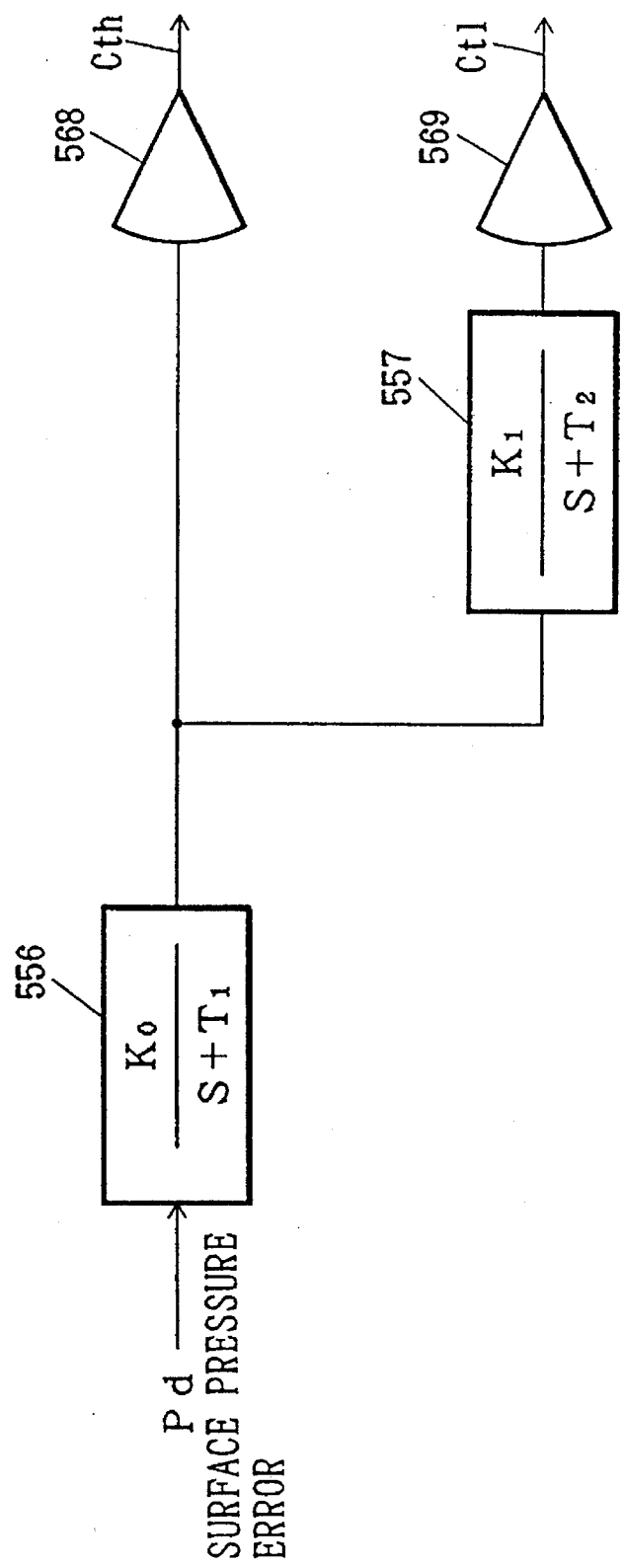
FIG. 40 is a block diagram showing the circuit configuration of the surface pressure control system compensator of the twelfth embodiment.

FIG. 40 is a block diagram showing a concrete circuit configuration of the surface pressure control system compensator 504 of FIG. 39. In the figure, denoted 556 is a low-pass filter that filters the surface pressure error Pd with a transfer function $K_0/(S+T_1)$; 568 a driver amplifier that sends out the output of the low-pass filter 556 as the high-frequency component control amount Cth; 557 a low-pass filter that filters the output of the low-pass filter 556 with a transfer function $K_1/(S+T_2)$; and 569 a driver amplifier that sends out the output of the low-pass filter 557 as the low-frequency component control amount Ct1.

As shown in FIG. 39, the high-frequency component control amount Cth is sent to the control system of the movable pin, while the low-frequency component control amount Ct1 is sent to the control system of the reel motor.

In performing a compensation processing on a system having a movable pin control system and a reel motor control system, the above configuration secures a low-frequency gain for the movable pin control system and determines the control band.

The head surface pressure control system corresponds to a kind of force control, i.e., acceleration control. If the low-pass filter 556 is inserted into the first-stage control loop, the phase in the open-loop characteristic rotates only 90 degrees, so that the stability of the control system can be assured.

Insertion of additional several stages of low-pass filters to suppress noise in the control system in a frequency range higher than the control band does not result in a significant reduction in the phase margin. That is, insertion of the additional low-pass filters is allowed if the phase margin of about 40 to 60 degrees is maintained.

The low-frequency component control amount Ct1 for the reel motor is further passed through one stage of low-pass filter 557 to limit the output to a still lower frequency. This is because the reel motor has a large inertia and cannot make a quick response. Hence, the control is performed only in a low frequency band. That is, the two-stage control—movable pin and reel motor—is performed according to the frequency band.

While in the above example the output of the low-pass filter 556 of the reel motor control system is further passed through another low-pass filter 557 to produce a low-frequency component control amount Ct1, it is possible to divide the surface pressure error Pd—an input to the surface pressure control system compensator 504—in two and produce a high-frequency component control amount Cth through a low-pass filter that has a high cut-off frequency and a low-frequency component control amount Ct1 through a low-pass filter that has a low cut-off frequency.

In this case, since each control system is controlled only by one stage of low-pass filter, there is an advantage that each system can be controlled independently of each other and stably.

In the surface pressure control of this invention, the head surface pressure variations or external disturbances often contain cyclic components that are synchronous with one rotation of the head cylinder or disk. For this reason, it is possible to enhance the follow-up capability with the configuration of FIG. 41.

Figure 41:
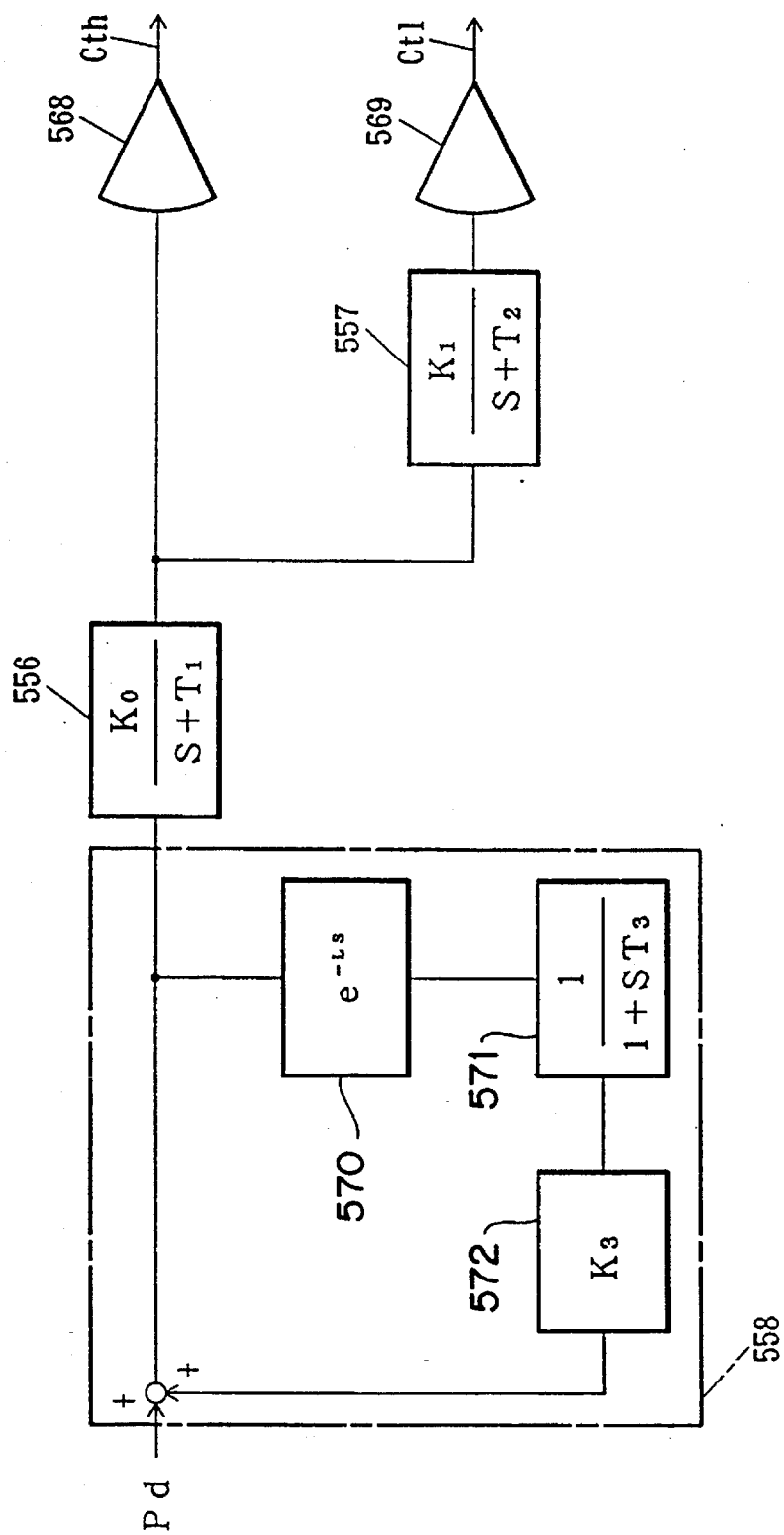
FIG. 41 is a block diagram showing another circuit configuration of the surface pressure control system compensator of the twelfth embodiment.

FIG. 41 is another example of the surface pressure control system compensator shown in FIG. 40. In the figure, denoted 558 is a iterative learning compensator inserted in the input stage of the surface pressure error Pd.

The iterative learning compensator 558 learns periodic components. That is, an element $e^{-Ls}$ denoted as 570, a memory for one cycle, stores cyclic components of surface pressure variations. To stabilize the learning conditions, the cyclic component is passed through a filter $1/(1+ST_3)$ denoted as 571 and an attenuator $K_3$ denoted as 572 and positively fed back to the original input.

As a result, the surface pressure error Pd is added with a condition one cycle before, improving the follow-up capability in compensation.

Such a configuration includes a memory element and thus cannot be implemented with analog circuits. It is effectively realized with digital circuits or a system using microcomputer.

[Example Software Implementing Twelfth Embodiment]

Next, in the surface pressure control system of FIG. 39, the functions corresponding to the surface pressure control system compensator 504 of FIG. 40 and to the surface pressure estimator 505 of FIG. 33 are realized by software, which is explained by referring to flowcharts in FIGS. 42 through 45.

Figure 42:
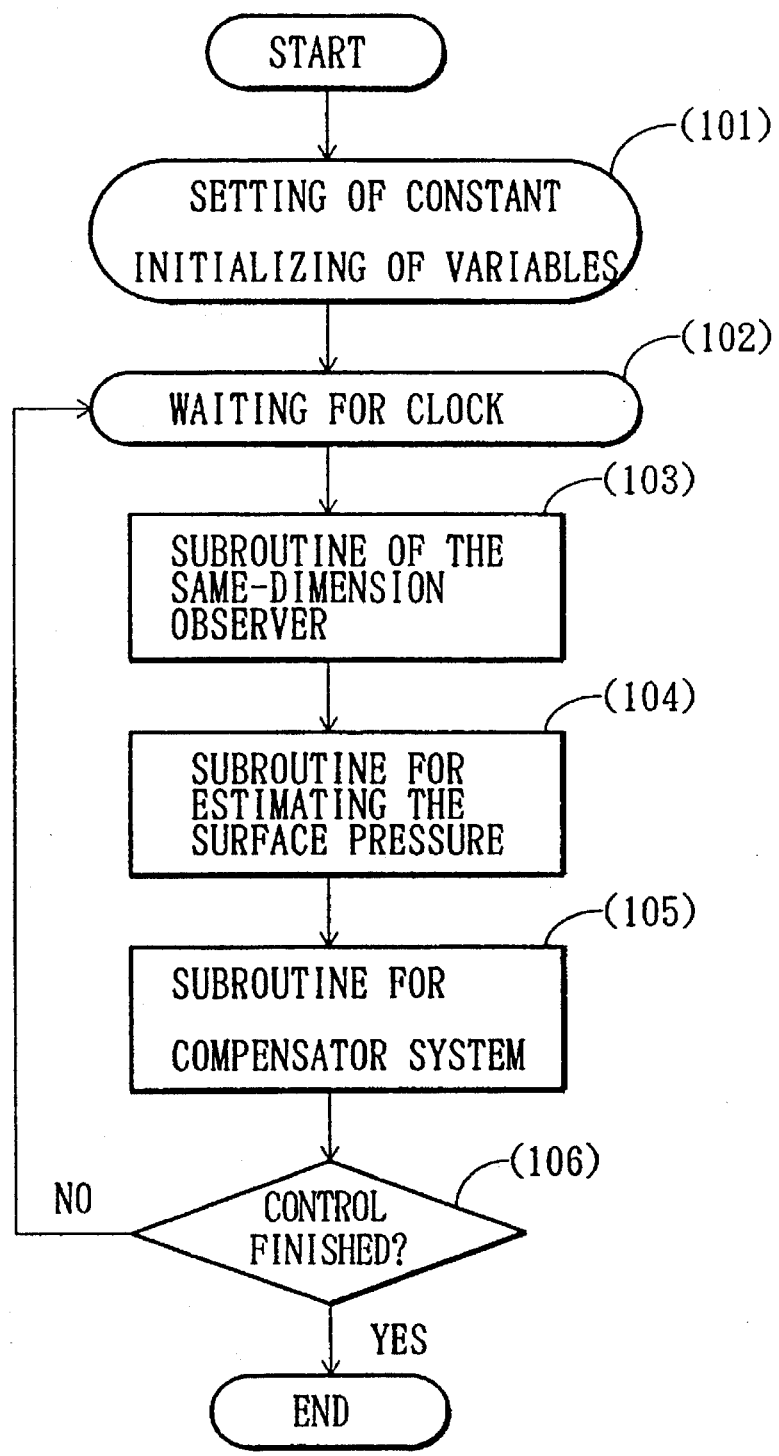
FIG. 42 is a flowchart of the main program that implements the twelfth embodiment.

FIG. 42 is a main program of the software. At step 101, constants such as spring constant, feedback constant, mass, gain, digital parameters and variables are initialized. At the next step 102, the program waits one clock cycle. The program executes the equal-dimension observer subroutine at step 103, the surface pressure estimation subroutine at step 104 and the compensation system subroutine at step 105. Until when at step 106 the control is finished, the program returns to step 102 and repeats the execution of the subroutines when triggered by the next clock.

Figure 43:
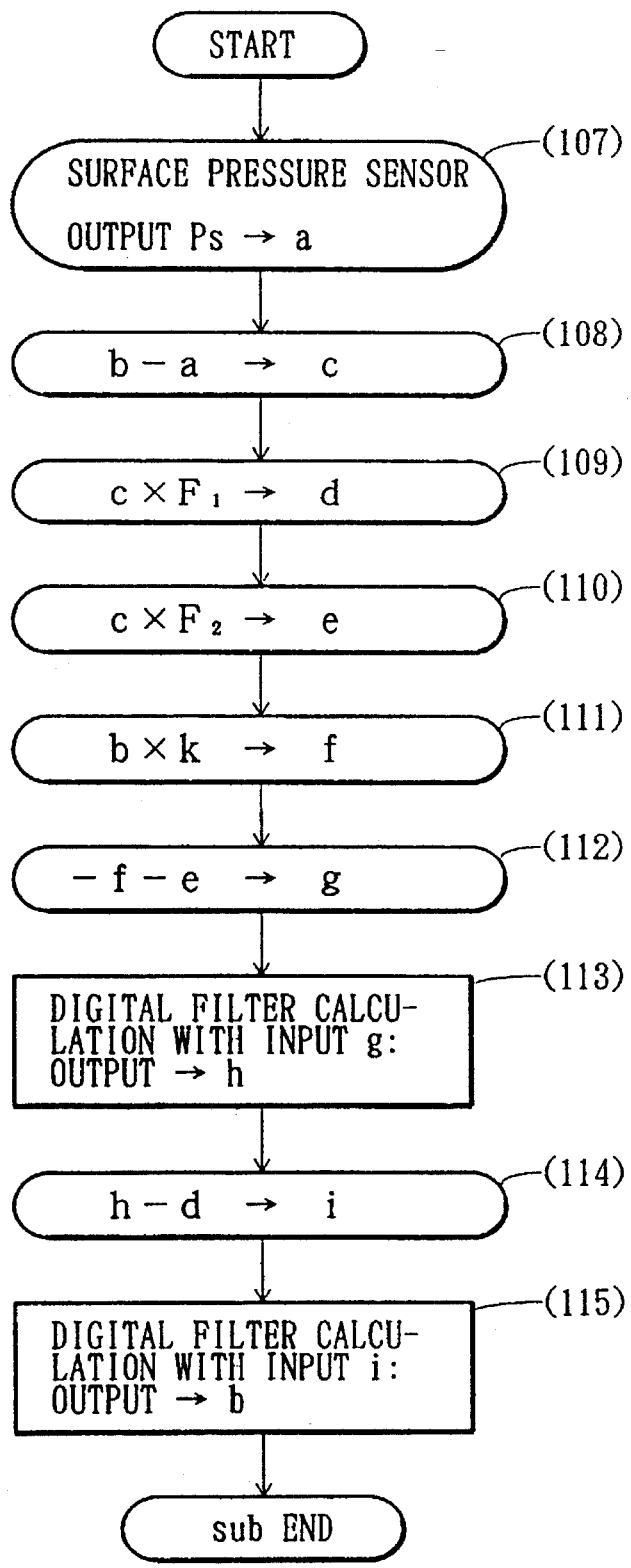
FIG. 43 is a flow chart showing one example subroutine of the observer.

FIG. 43 is a flowchart showing one example subroutine of the observer in the flowchart of FIG. 42. This subroutine realizes the equal-dimension observer, i.e., the function corresponding the system of FIG. 31. At step 107 the surface pressure sensor output Ps is set as variable a and at step 108 variable a is subtracted from variable b to set the result as a variable c. The operation of this step corresponds to the operation of the calculator 564 in FIG. 31. The variable b is set with a value corresponding to the output of the integrator element 534.

At step 109 the variable c is multiplied with a feedback constant $F_1$ and set as variable d. This operation corresponds to that of the feedback gain element 532. At step 110 the variable c is multiplied with a feedback constant $F_2$ and set as a variable e. This operation corresponds to the feedback gain element 533.

Next, at step 111 the variable b is multiplied with the spring constant k and set as a variable f. This operation corresponds to that of the spring constant element 530. At step 112, the variables f and e are inverted in sign and added, and the result is set as variable g. This operation corresponds to that of the calculator 563.

At the next step 113, the program executes a digital filter calculation with the variable 9 as input and sets the result as a variable h. This operation corresponds to that of the mass viscosity element 531. At step 114 the variable d is taken from the variable h. This operation corresponds to that of the calculator 585. The next step 115 takes in a variable i, performs a digital filter calculation and sets the result in the variable b. This operation corresponds to that of the integrator element 534.

Figure 44:
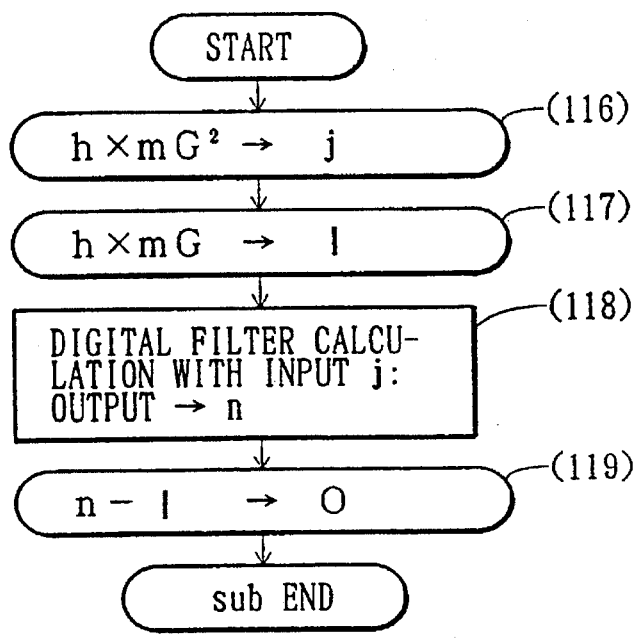
FIG. 44 is a flow chart showing one example subroutine of the surface pressure estimation.

FIG. 44 is a flowchart showing one example subroutine for surface pressure estimation in the flow of FIG. 42. This subroutine implements the function of the pseudo differential circuit 584 of FIG. 33, i.e., the operation of the external disturbance element. Step 116 multiplies the variable h with a value $mG^2$ and sets the result as a variable j. Then at step 117 the variable h is multiplied by mG and the result is set as a variable l.

Step 118 performs a digital filter calculation with the variable j as input and sets the result as a variable n. The final step 119 subtracts the variable l from the variable n, sets the result as a variable o and ends this subroutine. The value of this variable o corresponds to the estimated head surface pressure Pg.

Figure 45:
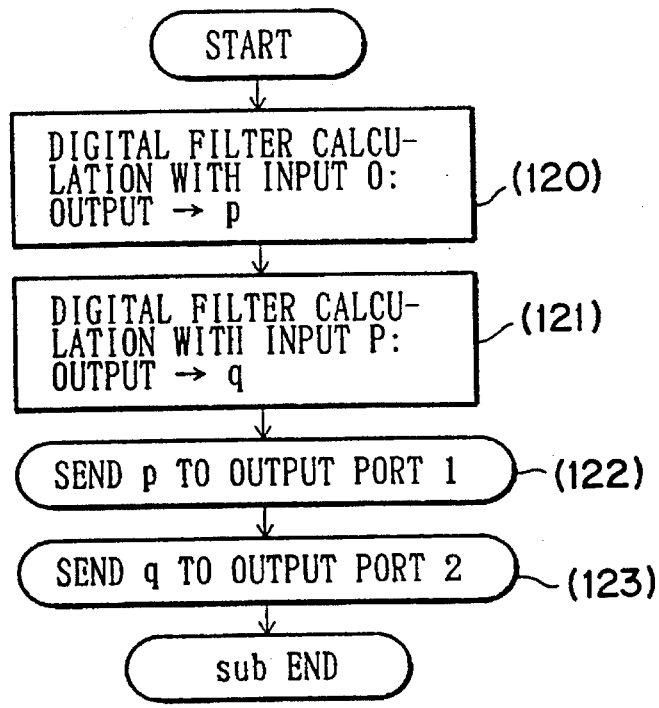
FIG. 45 is a flow chart showing one example subroutine of the compensation system.

FIG. 45 is a flowchart showing one example subroutine for the compensation system in the flow of FIG. 42. This subroutine implements the function that corresponds to the operation of the system of FIG. 40. Step 120 performs a digital filter calculation with the variable o as input and sets the result as a variable p. This operation corresponds to that of the low-pass filter 556 in FIG. 40.

The next step 121 performs a digital filter calculation with the variable p as input and sets the result in a variable q. This operation corresponds to that of the low-pass filter 557. The step 122 outputs the value of variable p to the output port 1. The output value corresponds to the high-frequency component control amount Cth. Step 123 outputs the value of variable q to the output port 2. The output value corresponds to the low-frequency component control amount Ct1.

With the above-mentioned software processing, it is possible to obtain the high-frequency component control amount Cth to be applied to the movable pin control system and also the low-frequency component control amount Ct1 to be applied to the reel motor control system. The lag-lead filter in each subroutine, i.e., low-pass filter, can generally be formed of a digital filter of cyclic type.

Although the above software does not include the processing that corresponds to the operation of the iterative learning compensator 558 of FIG. 41, it is easy to form a memory on the microcomputer and use it as the surface pressure control system compensator of FIG. 41.

The movable pin position control circuit can generally be realized by taking in a signal from the position sensor installed on the movable pin, giving a gain to the sensor signal, and passing it through the low-pass filter to secure the low-frequency gain and the control band. It is therefore readily realized to provide a new subroutine in one cycle of the software. In this case, only one input port is added for the movable pin position sensor and thus the position control output need only be added to the movable pin control amount among the head surface pressure control outputs.

In each of the above embodiments, the equipment to which this invention is applied is a recording and reproducing apparatus and the movable head is not driven by the actuator. For the magnetic disk apparatus or magnetic tape apparatus which has only a reel motor and no movable head mechanism, it is necessary to move the magnetic head by the actuator.

In this case also, the similar effects can be obtained by supplying to the actuator of the magnetic head moving mechanism a high-frequency component control amount Cth, a signal which is calculated by the subroutine of FIG. 45 and given to the movable pin.

While this method makes the mechanism of the magnetic head complicated, the magnetic head that needs to be driven is still very small in mass when compared with the system that controls the movable pin and reel motor, ensuring a control in wide frequency band. When the rotary magnetic head is used, the control signal is supplied to the magnetic head through a slip ring which provides an electrical connection between the head cylinder and the magnetic head.

The above-mentioned surface pressure control system of this invention can also be applied to the magnetic disk apparatuses.

Figure 47A:
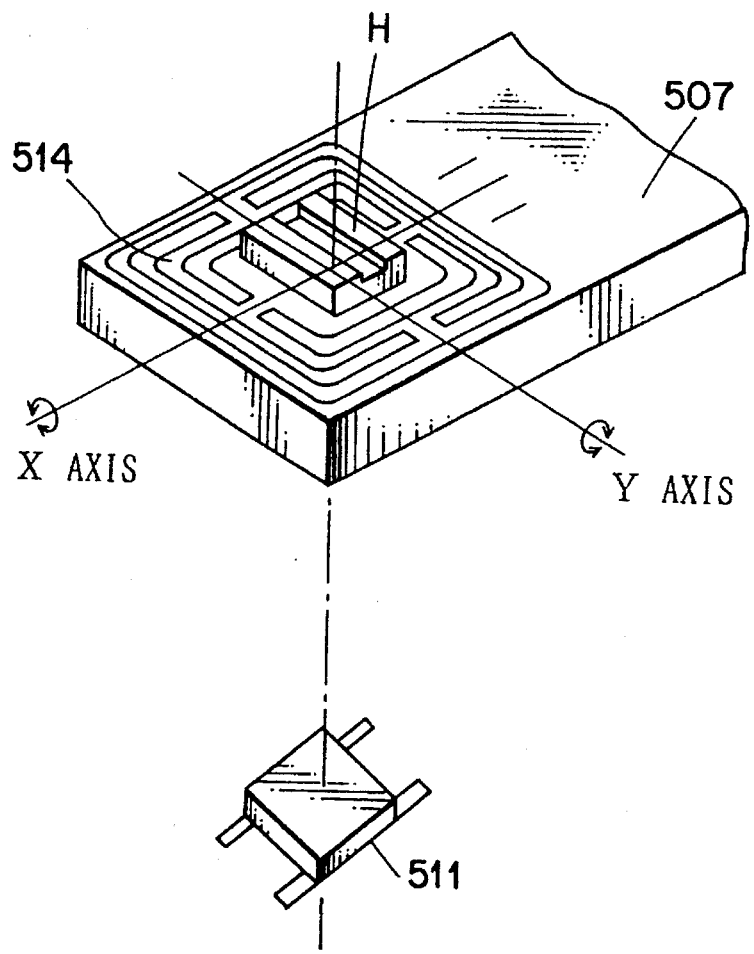
FIGS. 47a and 47b are a perspective view and a cross section, respectively, of the head holder used in the thirteenth embodiment.
Figure 47B:
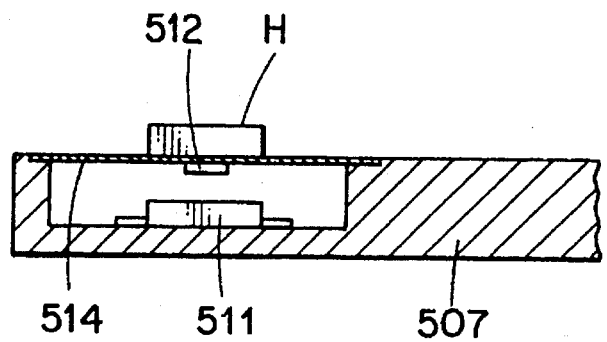
Figure 48:
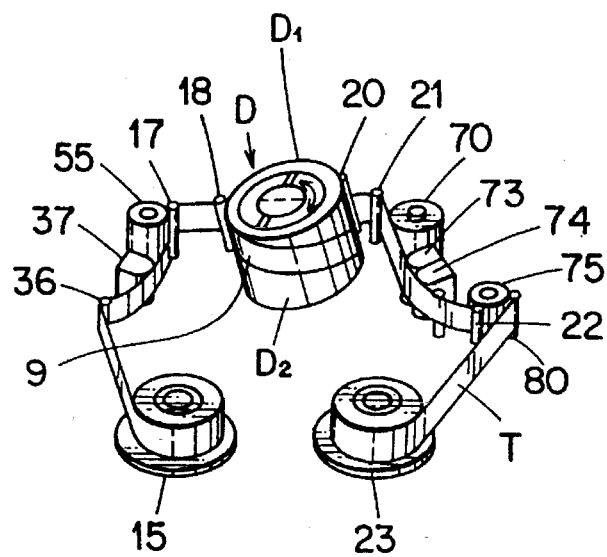
FIG. 48 is a perspective view showing the outline construction of a general tape drive system in the magnetic recording and reproducing apparatus using a conventional rotary head.

FIG. 46 shows the outline configuration of the thirteenth embodiment that employs the surface pressure control system in the magnetic disk apparatus. FIG. 47 is a perspective view and .a cross section of a mount for the head used in FIG. 46.

In FIG. 46, denoted 507 is a carriage for moving the head H toward the disk 510; and 508 a movable support that is held by a gimbal spring 514 and used to move the head H in the projecting direction. The head H is supported on the carriage 507 by the gimbal spring 514 so that it can be moved in a direction perpendicular to X- and Y-axis.

FIG. 47 is a perspective view and a cross section of the mount for the head a used in the mechanism of FIG. 46. The head H is held on the carriage 507 by gimbal spring 514 so that it can be moved in a direction perpendicular to X- and Y-axis.

The amount by which the head H is projected is detected by the magnet 512 located below the head H and the hole element 511 fixed on the carriage 507 and is sent out as the surface pressure sensor output Ps to the surface pressure estimator 505.

The surface pressure, which is the pressing force of the head H against the disk 510, can be detected from the position of the head H in the projecting direction with respect to the movable support 508. The distance between the magnet 512 and the hole element 511 corresponds to the surface pressure, and the surface pressure sensor output is produced by the magnet 512.

Designated 513 is a spindle motor to rotate the disk 510; 560 a ceramic actuator to control the amount of head projection with respect to the disk 510; and 559 a calculator that subtracts the estimated head surface pressure Pg given by the surface pressure estimator 505 from the reference surface pressure Pr to output the surface pressure error Pd to the surface pressure control system compensator 504.

In the above construction, the disk 510 is rotated by the spindle motor 513. The carriage 507 controls the head H at a position corresponding to the specified track. The spacing between the head H and the disk 510 is determined by the balance between a reactionary force of an air—flow produced between the disk 510 and the head H—and a force pressing the head H against the disk 510. The ceramic actuator 560 drives the movable support 508 toward the disk 510.

The surface pressure sensor output Ps generated by the mechanism shown above is then fed to the surface pressure estimator 505 to produce an estimated head surface pressure Pg, which is compared with the reference surface pressure Pr by the calculator 559 that produces a surface pressure error Pd. The surface pressure error Pd is then fed to the surface pressure control system compensator 504 that generates a control amount Ct, which in turn controls the ceramic actuator 560 so that the estimated head surface pressure Pg produced by the surface pressure estimator 505 is kept constant, thus maintaining a good head contact with the disk.

As described above, this invention makes it possible to perform the tension control and DTF control of the magnetic tape in a wide dynamic range and a wide frequency band with high precision. Provision of the control system using the state estimator and the surface pressure estimator enhances the control performance of the recording and reproducing apparatus, so that a good reproduction can be obtained not only during normal speed replay but also during special replays at other speeds than the normal speed without generating noise on the picture. Further, the system becomes less expensive.

The control to keep constant the surface pressure that the magnetic head receives from the magnetic recording medium allows the spacing between the magnetic head and the recording medium to be maintained at a constant value in a wide frequency range with high precision and good response. This in turn permits the line recording density to be increased. During high-density recording, since there is no contact between the magnetic tape and the magnetic head, wear of these components can be reduced.

Moreover, when transient tension variations are large as during special replays at other than the normal speed, a good head contact is maintained, thus improving the life of the magnetic head and tape.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A recording/reproducing apparatus comprising:

supply reel drive means for driving a supply reel;

tape tension control means for changing a tension of a magnetic tape path between said supply reel and a head cylinder on which a rotary head is mounted, said tape tension control means having a pair of supply side stationary pins located along the magnetic tape path for guiding the magnetic tape, a supply side movable pin, mounted along a plane located between said pair of supply side stationary pins, for guiding the magnetic tape and creating a supply side loop in the magnetic tape path, and actuator means for driving said supply side movable pin in a direction along the plane to change a distance in which said supply side movable pin is located from an axis between said pair of supply side stationary pins;

tension detecting means for estimating tape tension and for outputting a control signal to said tape tension control means, said tape tension control means controlling the tension of the magnetic tape path in accordance with the control signal; and spacing detecting means, coupled to said tape tension control means, for detecting a spacing error between said rotary head and the magnetic tape based on an envelope of a signal reproduced by said rotary head and for generating a spacing error signal indicative of the detected spacing error, said tape tension control means changing a tension of the magnetic tape path in accordance with the spacing error signal.

2. The recording/reproducing apparatus of claim 1, wherein said tension detecting means comprises:

position detecting means for detecting a position of said supply side movable pin and for generating a position signal indicative thereof;

state estimating means for estimating the tape tension by implementing an arithmetic operation on the position signal and one of either a driving voltage and a driving current of said actuator means; and tension servo means, coupled to said state estimating means, for generating the control signal in accordance with the estimated tape tension, said tape tension control means adjusting tape tension by selectively controlling said supply reel drive means and said actuator means in accordance with the control signal.

3. The recording/reproducing apparatus of claim 2, wherein said state estimating means comprises:

an equivalent circuit, including an integrator, for simulating a characteristic of said actuator means;

subtractor means for subtracting a characteristic signal indicative of a result of simulation by said equivalent circuit from the position signal and for generating a corresponding comparison signal; and feedback means for feeding back the comparison signal with a predetermined gain to said equivalent circuit.

4. The recording/reproducing apparatus of claim 3, wherein said equivalent circuit electrically simulates a displacement angle/input voltage characteristic of said actuator means.

5. The recording/reproducing apparatus of claim 3, wherein said equivalent circuit electrically simulates a displacement angle/torque function characteristic of said actuator means.

6. The recording/reproducing apparatus of claim 2, wherein said tension servo means feeds back a relatively low frequency component of the control signal to said supply reel drive means and a relatively high frequency component of the control signal to said actuator means.

7. The recording/reproducing apparatus of claim 2, wherein said tension servo means controls and maintains tape tension by operating said supply reel drive means alone or in cooperation with said actuator means.

8. A method of controlling tape tension of a magnetic recording/reproducing apparatus having supply reel drive means for driving a tape supply reel, a supply side movable pin for varying a magnetic tape path between the tape supply reel and a head cylinder on which a rotary head is mounted and supply side tape actuator means for driving the supply side movable pin, the method comprising the steps of:

determining a tension of the magnetic tape in accordance with the supply side movable pin;

detecting a spacing error indicative of a distance between the magnetic tape and the rotary head based on an envelope of a signal reproduced from the magnetic tape by the rotary head;

generating a control signal based on said determined tension and said spacing error; and adjusting tape tension in accordance with said control signal by selectively operating the supply reel drive means and the supply side tape actuator means.

9. The method of controlling tape tension of claim 8, wherein said step of determining tape tension comprises:

detecting a position of the supply side movable pin; and estimating tape tension by implementing an arithmetic operation on a position signal indicative of said detected position and one of either a driving voltage and a driving current of the supply side tape actuator means.

10. The method of controlling tape tension of claim 9, wherein said step of estimating tape tension comprises:

simulating a characteristic of the supply side tape actuator means;

comparing a characteristic signal indicative of a result of said step of simulating with said position signal; and feeding back a comparison signal indicative of a result of said step of comparing with a predetermined gain and repeating said step of simulating in accordance with the fed back comparison signal.

11. The method of controlling tape tension of claim 10, wherein said step of simulating comprises electrically simulating a displacement angle/input voltage characteristic of the supply side tape actuator means.

12. The method of controlling tape tension of claim 11, wherein said step of generating a control signal comprises adding a spacing error signal indicative of said detected spacing error to a tension signal indicative of said determined tension to generate said control signal.

13. The method of controlling tape tension of claim 10, wherein said step of simulating comprises electrically simulating a displacement angle/torque function characteristic of the supply side tape actuator means.

14. The method of controlling tape tension of claim 9, wherein a first frequency component of said control signal within a tension control range of said tension signal is fed back to the supply reel drive means and a second frequency component of said control signal is fed back to the supply side tape actuator means, the second frequency component being greater in frequency than the first frequency component.

15. The method of controlling tape tension of claim 8, wherein said step of adjusting tape tension comprises controlling and maintaining the tape tension at a specified value by operating the supply reel drive means alone or in cooperation with the supply side tape actuator means.

16. A recording/reproducing apparatus having a rotary head for recording and reproducing data on a magnetic tape comprising:

supply reel drive means for driving a supply reel;

magnetic tape path length changing means for changing a length of a magnetic tape path between said supply reel and a head cylinder on which the rotary head is mounted;

tension detecting means, coupled to said magnetic tape path length changing means, for determining a tension of the magnetic tape and for generating a tension signal indicative thereof;

envelope detecting means for detecting an envelope of a signal reproduced by the rotary head and for outputting a corresponding envelope signal;

spacing detecting means for detecting a spacing error between the magnetic tape and the rotary head in accordance with the corresponding envelope signal and for outputting a spacing error signal; and tension control means, coupled to said tension detecting means and said spacing detecting means, for generating a control signal in accordance with the tension signal and the spacing error signal and for adjusting tape tension by selectively controlling said supply reel drive means and said magnetic tape path length changing means with the control signal.

17. The recording/reproducing apparatus of claim 16, wherein said magnetic tape path length changing means comprises:

a supply side movable pin for varying the length of the magnetic tape path; and supply side tape actuator means for driving said supply side movable pin in accordance with the control signal.

18. The recording/reproducing apparatus of claim 17, wherein said tension detecting means comprises:

position detecting means for detecting a position of said supply side movable pin and for generating a position signal indicative thereof; and state estimating means for estimating tape tension by implementing an arithmetic operation on the position signal and one of either a driving voltage and a driving current of said supply side tape actuator means.

19. The recording/reproducing apparatus of claim 18, wherein said state estimating means comprises:

an equivalent circuit, including an integrator, for simulating a characteristic of said supply side tape actuator means;

subtractor means for subtracting a characteristic signal indicative of a result of simulation by said equivalent circuit from the position signal and for generating a corresponding comparison signal; and feedback means for feeding back the comparison signal with a predetermined gain to said equivalent circuit.

20. The recording/reproducing apparatus of claim 19, wherein said equivalent circuit electrically simulates a displacement angle/input voltage characteristic of said supply side tape actuator means.

21. The recording/reproducing apparatus of claim 19, wherein said equivalent circuit electrically simulates a displacement angle/torque function characteristic of said supply side tape actuator means.

22. The recording/reproducing apparatus of claim 18, wherein said tension control means feeds back a first frequency component of the control signal to said supply reel drive means and a second frequency component of the control signal to said supply side tape actuator means, the second frequency component being greater in frequency than the first frequency component.

23. The recording/reproducing apparatus of claim 17, wherein said tension control means controls and maintains tape tension by operating said supply reel drive means alone or in cooperation with said supply side tape actuator means.

24. A magnetic recording and reproducing apparatus comprising:

supply reel drive means for driving a supply reel on which a magnetic tape is wound;

magnetic tape supply means for driving the magnetic tape at a specified speed along a magnetic tape path from said supply reel via a head cylinder on which a rotary magnetic head is mounted;

a supply side movable pin located in the magnetic tape path from said supply reel to said head cylinder for varying a length of the magnetic tape path between said supply reel and said head cylinder;

supply side tape actuator means for driving said supply side movable pin;

tension detecting means for detecting a tension of the magnetic tape in accordance with said supply side movable pin;

tension control means for controlling and maintaining the tension of the magnetic tape at a specified value by operating said supply reel drive means alone or in cooperation with said supply side tape actuator means based on an output signal of said tension detecting means indicative of a detected tension of the magnetic tape;

spacing detecting means for detecting a spacing error based on an envelope of a signal reproduced from the magnetic tape by said rotary magnetic head; and means for adding a spacing error signal, output by said spacing detecting means, to an output of said tension detecting means.

25. The magnetic recording and reproducing apparatus of claim 24, wherein said spacing detecting means outputs the spacing error signal through a limiter in order to maintain the spacing error signal within a specified level.

26. The magnetic recording and reproducing apparatus as claimed in claim 24 or 25, wherein said spacing detecting means comprises envelope detection means for envelope-detecting the signal reproduced from the magnetic tape by said rotary magnetic head, the magnetic recording and reproducing apparatus further including means for producing, based on the signal reproduced from the magnetic tape by said rotary magnetic head, a tracking error signal which represents a relative position error between said rotary magnetic head and the recording track on the magnetic tape, said spacing detecting means further including subtraction means for detecting an amount of spacing according to a difference between an output of said envelope detection means and the tracking error signal.

27. The magnetic recording and reproducing apparatus of claim 24 or 25, wherein the magnetic recording and reproducing apparatus further comprises means for producing, based on the signal reproduced from the magnetic tape by said rotary magnetic head, a tracking error signal which represents a relative position error between said rotary magnetic head and the recording track on the magnetic tape, said spacing detecting means comprising:

envelope detection means for envelope-detecting the signal reproduced from the magnetic tape by said rotary magnetic head, decision means for discriminating when the tracking error is smaller than a predetermined value based on the tracking error signal, and switch means operatively coupled to said envelope detection means, for providing the spacing error signal as an output thereof when the tracking error is discriminated as smaller than the predetermined value by said decisions means.

28. The magnetic recording and reproducing apparatus of claim 27, wherein said decision means discriminates the level of the tracking error signal by comparing an amplitude of the tracking error signal with a predetermined voltage.

29. The magnetic recording and reproducing apparatus of claim 24, wherein said tension detecting means comprises:

position detecting means for detecting a position of said supply side movable pin;

a state estimator for estimating the tension of the magnetic tape by implementing an arithmetic operation of two signals including an output signal of said position detecting means and one of a driving voltage and a driving current of said supply side tape actuator means.

30. The magnetic recording and reproducing apparatus of claim 29, wherein said state estimator further comprises:

an equivalent circuit which includes an integrator simulating a characteristic of said supply side tape actuator means;

a subtractor for comparing an output of said equivalent circuit with the output of said position detecting means; and a feedback loop for feeding back an output of said subtractor of said state estimator to an input of said integrator of said equivalent circuit at a predetermined gain.

31. The magnetic recording and reproducing apparatus of claim 24, wherein a frequency component within a tension control range of the output signal of said tension detecting means is fed back to said supply reel drive means and a second frequency component of the tension control range is fed back to said supply side tape actuator means, the second frequency component being greater in frequency than the first frequency component.

* * * * *